(12) United States Patent
Terada et al.

(10) Patent No.: US 11,785,231 B2
(45) Date of Patent: Oct. 10, 2023

(54) IMAGE CODING METHOD, IMAGE DECODING METHOD, IMAGE CODING APPARATUS, RECEIVING APPARATUS, AND TRANSMITTING APPARATUS

(71) Applicant: Sun Patent Trust, New York, NY (US)

(72) Inventors: Kengo Terada, Osaka (JP); Takahiro Nishi, Nara (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 18/127,832

(22) Filed: Mar. 29, 2023

(65) Prior Publication Data
US 2023/0239484 A1 Jul. 27, 2023

Related U.S. Application Data

(63) Continuation of application No. 15/130,080, filed on Apr. 15, 2016, now Pat. No. 11,647,211, which is a
(Continued)

(51) Int. Cl.
*H04N 19/31* (2014.01)
*H04N 21/845* (2011.01)
(Continued)

(52) U.S. Cl.
CPC .............. *H04N 19/31* (2014.11); *H04N 19/46* (2014.11); *H04N 19/587* (2014.11); *H04N 19/70* (2014.11); *H04N 21/845* (2013.01)

(58) Field of Classification Search
USPC ........................................................ 375/240
See application file for complete search history.

(56) References Cited

U.S. PATENT DOCUMENTS 8,873,627 B2 10/2014 Huang et al.
2010/0189182 A1 7/2010 Hannuksela
(Continued)

FOREIGN PATENT DOCUMENTS

JP  2009-267537  11/2009
JP  2012-124896   6/2012
(Continued)

OTHER PUBLICATIONS

Benjamin Bross et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11 12th Meeting: Geneva, CH Jan. 14-23, 2013, JCTVC-L1003_v34, http://phenix.it-sudparis.eu/jct/doc_end_user/documents/12_Geneva/wg11/JCTVC-L1003-v34.zip.
(Continued)

*Primary Examiner* — Mikhail Itskovich
(74) *Attorney, Agent, or Firm* — WENDEROTH, LIND & PONACK, L.L.P.

(57) ABSTRACT

An image coding method of hierarchically coding a plurality of pictures to generate a bitstream, includes: coding each of the plurality of pictures, which belongs to any one of a plurality of hierarchical layers, with reference to a picture belonging to a hierarchical layer which is same as or lower than a hierarchical layer to which the picture belongs, and without reference to a picture belonging to a hierarchical layer which is higher than the hierarchical layer to which the picture belongs; and generating the bitstream by coding the coded pictures and time information indicating decoding times of the coded pictures. The time information indicates that the decoding times are set at equal intervals for low-layer pictures which are the plurality of pictures other than highest-layer pictures belonging to a highest layer among the plurality of hierarchical layers.

2 Claims, 71 Drawing Sheets

Related U.S. Application Data continuation of application No. PCT/JP2014/004889, filed on Sep. 24, 2014.

(60) Provisional application No. 61/892,536, filed on Oct. 18, 2013.

(51) Int. Cl.
    *H04N 19/70*    (2014.01)
    *H04N 19/46*    (2014.01)
    *H04N 19/587*   (2014.01)

(56) References Cited

U.S. PATENT DOCUMENTS

| | | |
|---|---|---|
| 2012/0140825 A1 | 6/2012 | Huang et al. |
| 2014/0328383 A1 | 11/2014 | Suzuki |
| 2015/0124884 A1 | 5/2015 | Yuzawa et al. |
| 2016/0234519 A1 | 8/2016 | Terada et al. |

FOREIGN PATENT DOCUMENTS

| | | |
|---|---|---|
| JP | 2014-220599 | 11/2014 |
| JP | 2015-46726 | 3/2015 |
| JP | 2015-65530 | 4/2015 |
| JP | 5909026 | 4/2016 |
| JP | 6377598 | 8/2018 |
| WO | 2014/002914 | 1/2014 |
| WO | 2015/053157 | 4/2015 |

OTHER PUBLICATIONS

Ye-Kui Wang et al., "AHG9: On cross-layer alignments in HEVC 3DV and scalable extensions", Apr. 21, 2013, JCTVC-M0266_v2, URL, phenix.int-evry.fr/jct/doc_end_user/documents/13_Incheon/wg11/JCTVC-M0266-v2.zip (JCTVC-M0266_v2.doc).

Heiko Schwarz et al., "Hierarchiacal B pictures", Jul. 19, 2005, p. 1-4, URL, http://wftp3.itu.int/av-arch/jvt-site/2005_07_Poznan/JVT-P014.zip (JVT-P014.doc).

Yutaka Yokoyama—Institute of Electrical and Electronics Engineers: "Adaptive GOP Structure Selection for Real-TimeMPEG-2 Video Encoding", Proceedings 2000 International Conference on Image Processing. ICIP 2000. Vancouver, Canada, Sep. 10-13, 2000 [International Conference on Image Processing], New York, NY: IEEE, US vol. Conf. 7, pp. 832-835, XP001129135Vancouver, Canada, Sep. 10-13, 2000 [International Conference on Image Processing], New York, NY: IEEE, US vol. Conf. 7, pp. 832-835, XP001129135.

R. Sjoberg et al., "Overview of HEVC high-level syntax and reference picture management", IEEE Transactions on Circuits and Systems for Video Technology, Jan. 1, 2012 (Jan. 1, 2012), pp. 1-1, XP055045360.

Schwarz H. et al., "Overview of the Scalable Extension of the H.264/MPEG-4 AVC Video Coding Standard", 21. JVT Meeting; 78, MPEG Meeting; Oct. 20, 2006-Oct. 27, 2006; Hangzhou, CN; (Joint Video Team of ISO/IEC JTC1/SC29/WG11 and ITU-T SG.16) No. JVT-U145, Oct. 20, 2006 (Oct. 20, 2006) XP030006791.

Extended European Search Report dated Jul. 7, 2016 in corresponding European Patent Application No. 14854156.8.

Office Action dated May 19, 2017 for the corresponding European Patent Application No. 14854156.8.

FIG. 10A
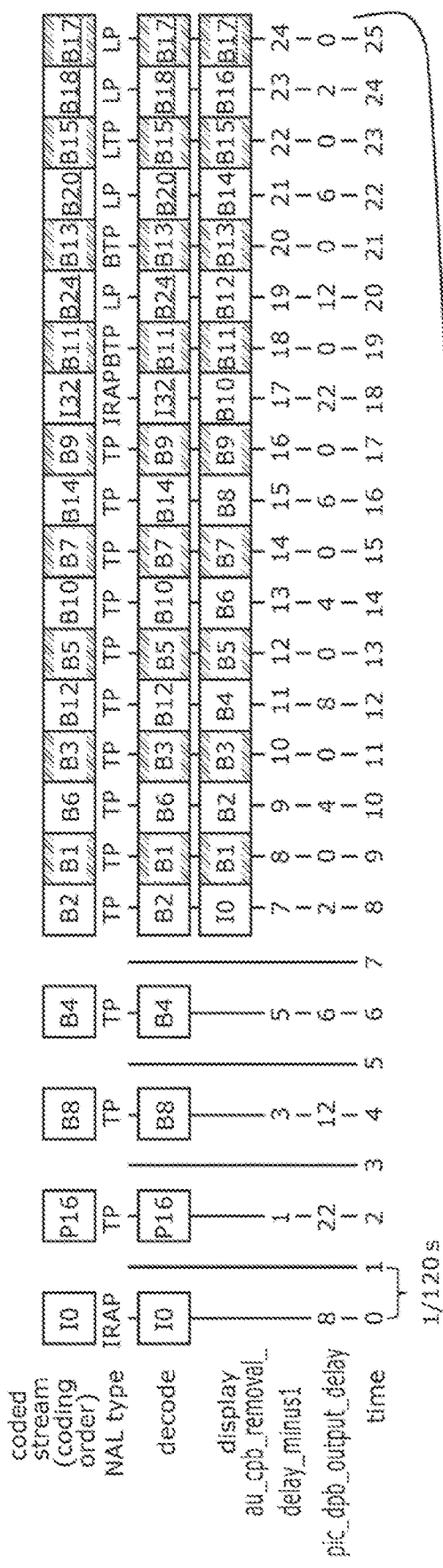
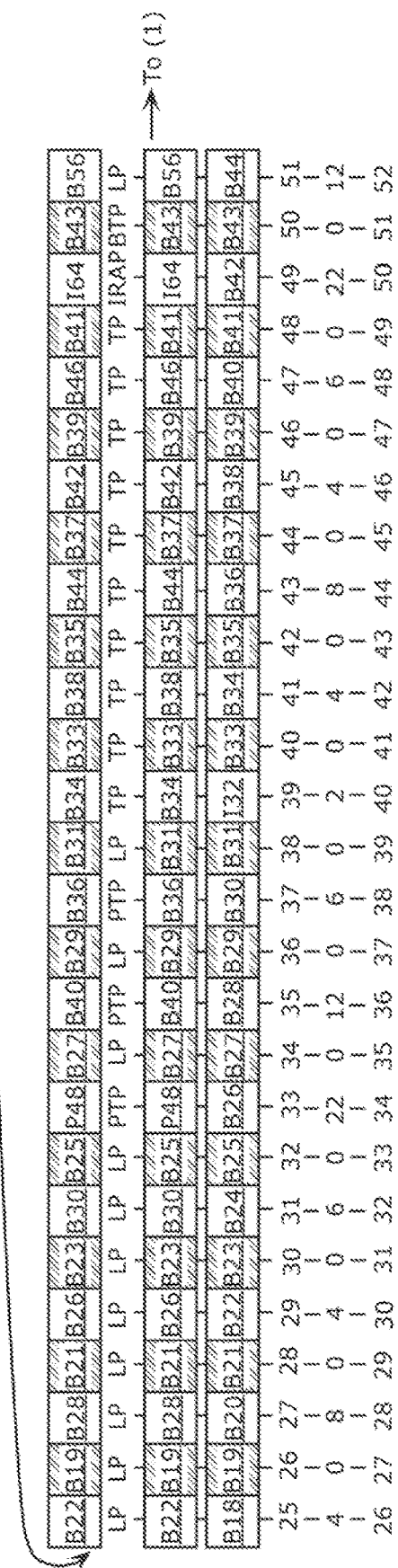

| Current picture | Reference picture set | | | | | | | | | | | | | |
|---|---|---|---|---|---|---|---|---|---|---|---|---|---|---|
| I0 | | | | | | | | | | | | | | |
| P16 | I0 | | | | | | | | | | | | | |
| B8 | I0 | P16 | | | | | | | | | | | | |
| B4 | I0 | B8 | P16 | | | | | | | | | | | |
| B2 | I0 | B4 | B8 | P16 | | | | | | | | | | |
| B1 | I0 | B2 | B4 | B8 | P16 | | | | | | | | | |
| B6 | I0 | B2 | B4 | B8 | P16 | | | | | | | | | |
| B3 | I0 | B1 | B2 | B4 | B6 | B8 | P16 | | | | | | | |
| B12 | I0 | B4 | B8 | P16 | | | | | | | | | | |
| B5 | I0 | B1 | B2 | B3 | B4 | B6 | B8 | P12 | P16 | | | | | |
| B10 | I0 | B2 | B4 | B6 | B8 | B12 | P16 | | | | | | | |
| B7 | I0 | B1 | B2 | B3 | B4 | B5 | B6 | B8 | B10 | B12 | P16 | | | |
| B14 | I0 | B2 | B4 | B6 | B8 | B10 | B12 | P16 | | | | | | |
| B9 | I0 | B1 | B2 | B3 | B4 | B5 | B6 | B7 | B8 | B10 | B12 | B14 | P16 | |
| I32 | | | | | | | | | | | | | | |
| B11 | I0 | B1 | B2 | B3 | B4 | B5 | B6 | B7 | B8 | B9 | B10 | B12 | B14 | P16 |
| B24 | P16 | I32 | | | | | | | | | | | | |
| B13 | I0 | B1 | B2 | B3 | B4 | B5 | B6 | B7 | B8 | B9 | B10 | B11 | B12 | B14 | P16 |
| B20 | P16 | B24 | I32 | | | | | | | | | | | |
| B15 | I0 | B1 | B2 | B3 | B4 | B5 | B6 | B7 | B8 | B9 | B10 | B11 | B12 | B13 | B14 | P16 |
| B18 | P16 | B20 | B24 | I32 | | | | | | | | | | |
| B17 | P16 | B18 | B20 | B24 | I32 | | | | | | | | | |
| B22 | P16 | B18 | B20 | B24 | I32 | | | | | | | | | |
| B19 | P16 | B17 | B18 | I20 | B24 | I32 | | | | | | | | |
| B28 | P16 | B20 | B24 | I32 | | | | | | | | | | |
| B21 | P16 | B17 | B18 | B19 | B20 | B22 | B24 | B28 | I32 | | | | | |
| B26 | P16 | B18 | B20 | B22 | B24 | B28 | I32 | | | | | | | |
| B23 | P16 | B17 | B18 | B19 | B20 | B21 | B22 | B24 | B26 | B28 | I32 | | | |
| B30 | P16 | B18 | B20 | B22 | B24 | B26 | B28 | I32 | | | | | | |
| B25 | P16 | B17 | B18 | B19 | B20 | B21 | B22 | B23 | B24 | B26 | B28 | B30 | I32 | |
| P48 | I32 | | | | | | | | | | | | | |
| B27 | P16 | B17 | B18 | B19 | B20 | B21 | B22 | B23 | B24 | B25 | B26 | B28 | B30 | I32 | P48 |
| B40 | I32 | P48 | | | | | | | | | | | | |
| B29 | P16 | B17 | B18 | B19 | B20 | B21 | B22 | B23 | B24 | B25 | B26 | B27 | B28 | B30 | I32 | B40 |
| | P48 | | | | | | | | | | | | | |
| B36 | I32 | B40 | P48 | | | | | | | | | | | |
| B31 | P16 | B17 | B18 | B19 | B20 | B21 | B22 | B23 | B24 | B25 | B26 | B27 | B28 | B29 | B30 | I32 |
| | B36 | B40 | P48 | | | | | | | | | | | |
| B34 | I32 | B36 | B40 | P48 | | | | | | | | | | |
| B33 | P16 | B17 | B18 | B19 | B20 | B21 | B22 | B23 | B24 | B25 | B26 | B27 | B28 | B29 | B30 | B31 |
| | I32 | B34 | B36 | B40 | P48 | | | | | | | | | |
| B38 | I32 | B34 | B36 | B40 | P48 | | | | | | | | | |
| B35 | P16 | B17 | B18 | B19 | B20 | B21 | B22 | B23 | B24 | B25 | B26 | B27 | B28 | B29 | B30 | B31 |
| | I32 | B33 | B34 | B36 | B38 | B40 | P48 | | | | | | | |

FIG. 15

| Current picture | Reference picture set | | |
|---|---|---|---|
| I0 | | | |
| P16 | I0 | | |
| B8 | I0 | P16 | |
| B4 | I0 | B8 | |
| B2 | I0 | B4 | |
| B1 | I0 | B2 | |
| B6 | B4 | B8 | |
| B3 | B2 | B4 | |
| B12 | B8 | P16 | |
| B5 | B4 | B6 | |
| B10 | B8 | B12 | |
| B7 | B6 | B8 | |
| B14 | B12 | P16 | |
| B9 | B8 | B10 | |
| I32 | | | |
| B11 | B10 | B12 | |
| B24 | I32 | | |
| B13 | B12 | B14 | |
| B20 | B24 | | |
| B15 | B14 | P16 | |
| B18 | B20 | | |
| B17 | B18 | | |
| B22 | B20 | B24 | |
| B19 | B18 | I20 | |
| B28 | B24 | I32 | |
| B21 | B20 | B22 | |
| B26 | B24 | B28 | |
| B23 | B22 | B24 | |
| B30 | B28 | I32 | |
| B25 | B24 | B26 | |
| P48 | I32 | | |
| B27 | B26 | B28 | |
| B40 | I32 | P48 | |
| B29 | B28 | B30 | |
| B36 | I32 | B40 | |
| B31 | B30 | I32 | |
| B34 | I32 | B36 | |
| B33 | I32 | B34 | |
| B38 | B36 | B40 | |
| B35 | B34 | B36 | |

FIG. 16

| Current picture | Reference picture set | | | | |
|---|---|---|---|---|---|
| I0 | | | | | |
| P16 | I0 | | | | |
| B8 | I0 | P16 | | | |
| B4 | I0 | B8 | P16 | | |
| B2 | I0 | B4 | B8 | P16 | |
| B1 | I0 | B2 | B4 | B8 | P16 |
| B6 | I0 | B4 | B8 | P16 | |
| B3 | I0 | B2 | B4 | B8 | P16 |
| B12 | I0 | B8 | P16 | | |
| B5 | I0 | B4 | B6 | B8 | P16 |
| B10 | I0 | B8 | B12 | P16 | |
| B7 | I0 | B4 | B6 | B8 | P16 |
| B14 | I0 | B8 | B12 | P16 | |
| B9 | I0 | B8 | B10 | B12 | P16 |
| I32 | | | | | |
| B11 | I0 | B8 | B10 | B12 | P16 |
| B24 | I32 | | | | |
| B13 | I0 | B8 | B12 | B14 | P16 |
| B20 | B24 | I32 | | | |
| B15 | I0 | B8 | B12 | B14 | P16 |
| B18 | B20 | B24 | I32 | | |
| B17 | B18 | B20 | B24 | I32 | |
| B22 | B20 | B24 | I32 | | |
| B19 | B18 | B20 | B24 | I32 | |
| B28 | B24 | I32 | | | |
| B21 | B20 | B22 | B24 | I32 | |
| B26 | B24 | B28 | I32 | | |
| B23 | B20 | B22 | B24 | I32 | |
| B30 | B24 | B28 | I32 | | |
| B25 | B24 | B26 | B28 | I32 | |
| P48 | I32 | | | | |
| B27 | B24 | B26 | B28 | I32 | |
| B40 | I32 | P48 | | | |
| B29 | B24 | B28 | B30 | I32 | |
| B36 | I32 | B40 | P48 | | |
| B31 | B24 | B28 | B30 | I32 | |
| B34 | I32 | B36 | B40 | P48 | |
| B33 | I32 | B34 | B36 | B40 | P48 |
| B38 | I32 | B36 | B40 | P48 | |
| B35 | I32 | B34 | B36 | B40 | P48 |

FIG. 21A
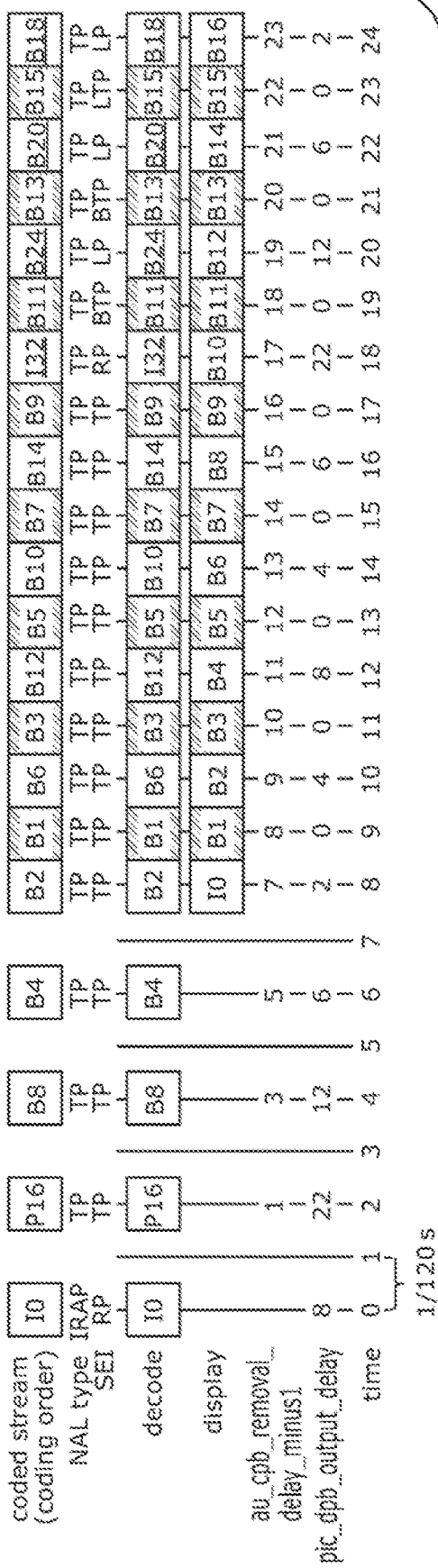
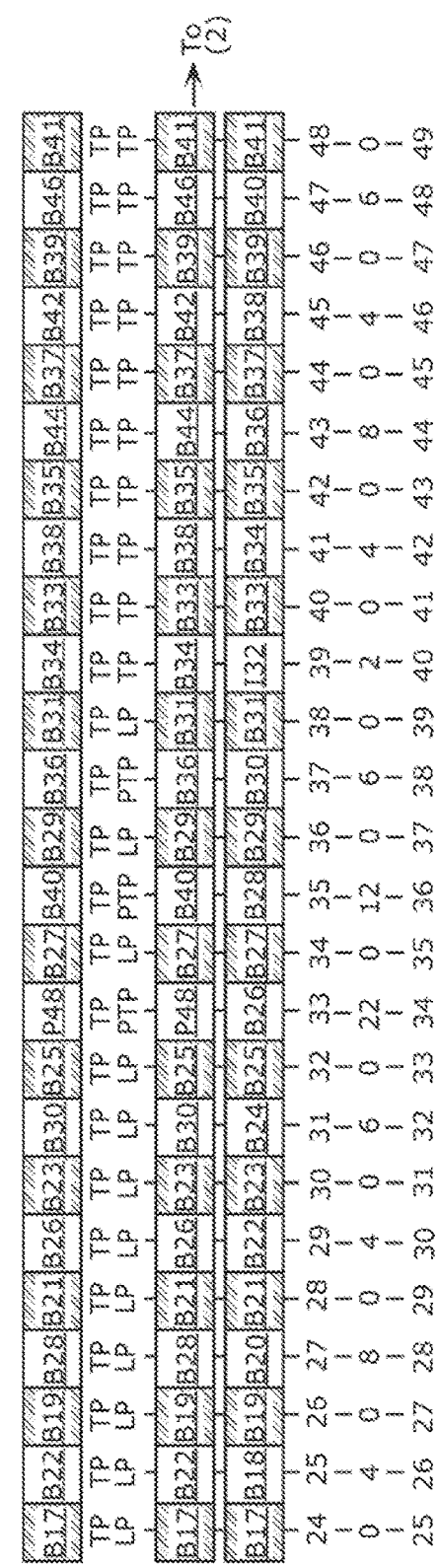

| Current picture | Reference picture set | | | | | | | | | | | | | | |
|---|---|---|---|---|---|---|---|---|---|---|---|---|---|---|---|
| I0 | | | | | | | | | | | | | | | |
| P16 | I0 | | | | | | | | | | | | | | |
| B1 | I0 | P16 | | | | | | | | | | | | | |
| B8 | I0 | P16 | | | | | | | | | | | | | |
| B3 | I0 | B1 | B8 | P16 | | | | | | | | | | | |
| B4 | I0 | B8 | P16 | | | | | | | | | | | | |
| B5 | I0 | B1 | B3 | B4 | B8 | P16 | | | | | | | | | |
| B2 | I0 | B4 | B8 | P16 | | | | | | | | | | | |
| B7 | I0 | B1 | B2 | B3 | B4 | B5 | B8 | P16 | | | | | | | |
| B6 | I0 | B2 | B4 | B8 | P16 | | | | | | | | | | |
| B9 | I0 | B1 | B2 | B3 | B4 | B5 | B6 | B7 | B8 | P16 | | | | | |
| B12 | I0 | B4 | B8 | P16 | | | | | | | | | | | |
| B11 | I0 | B1 | B2 | B3 | B4 | B5 | B6 | B7 | B8 | B9 | B12 | P16 | | | |
| B10 | I0 | B2 | B4 | B6 | B8 | B12 | P16 | | | | | | | | |
| B13 | I0 | B1 | B2 | B3 | B4 | B5 | B6 | B7 | B8 | B9 | B10 | B11 | B12 | P16 | |
| B14 | I0 | B2 | B4 | B6 | B8 | B10 | B12 | P16 | | | | | | | |
| B15 | I0 | B1 | B2 | B3 | B4 | B5 | B6 | B7 | B8 | B9 | B10 | B11 | B12 | B13 | B14 | P16 |
| I32 | | | | | | | | | | | | | | | |
| B17 | P16 | I32 | | | | | | | | | | | | | |
| B24 | P16 | I32 | | | | | | | | | | | | | |
| B19 | P16 | B17 | B24 | I32 | | | | | | | | | | | |
| B20 | P16 | B24 | I32 | | | | | | | | | | | | |
| B21 | P16 | B17 | B19 | B20 | B24 | I32 | | | | | | | | | |
| B18 | P16 | B20 | B24 | I32 | | | | | | | | | | | |
| B23 | P16 | B17 | B18 | B19 | B20 | B21 | B24 | I32 | | | | | | | |
| B22 | P16 | B18 | B20 | B24 | I32 | | | | | | | | | | |
| B25 | P16 | B17 | B18 | B19 | B20 | B21 | B22 | B23 | B24 | I32 | | | | | |
| B28 | P16 | B20 | B24 | I32 | | | | | | | | | | | |
| B27 | P16 | B17 | B18 | B19 | B20 | B21 | B22 | B23 | B24 | B25 | B28 | I32 | | | |
| B26 | P16 | B18 | B20 | B22 | B24 | B28 | I32 | | | | | | | | |
| B29 | P16 | B17 | B18 | B19 | B20 | B21 | B22 | B23 | B24 | B25 | B26 | B27 | B28 | I32 | |
| B30 | P16 | B18 | B20 | B22 | B24 | B26 | B28 | I32 | | | | | | | |
| B31 | P16 | B17 | B18 | B19 | B20 | B21 | B22 | B23 | B24 | B25 | B26 | B27 | B28 | B29 | B30 | I32 |
| P48 | I32 | | | | | | | | | | | | | | |
| B33 | B17 | B18 | B19 | B20 | B21 | B22 | B23 | B24 | B25 | B26 | B27 | B28 | B29 | B30 | B31 | I32 |
| | B34 | P48 | | | | | | | | | | | | | |
| B40 | I32 | P48 | | | | | | | | | | | | | |
| B35 | B17 | B18 | B19 | B20 | B21 | B22 | B23 | B24 | B25 | B26 | B27 | B28 | B29 | B30 | B31 | I32 |
| | B33 | B34 | B40 | P48 | | | | | | | | | | | |
| B36 | I32 | B40 | P48 | | | | | | | | | | | | |

FIG. 30

| Current picture | Reference picture set | |
|---|---|---|
| I0 | | |
| P16 | I0 | |
| B1 | I0 | P16 |
| B8 | I0 | P16 |
| B3 | I0 | B8 |
| B4 | I0 | B8 |
| B5 | B4 | B8 |
| B2 | I0 | B4 |
| B7 | B4 | B8 |
| B6 | B4 | B8 |
| B9 | B8 | P16 |
| B12 | B8 | P16 |
| B11 | B8 | B12 |
| B10 | B8 | B12 |
| B13 | B12 | P16 |
| B14 | B12 | P16 |
| B15 | B14 | P16 |
| I32 | | |
| B17 | I32 | |
| B24 | I32 | |
| B19 | B24 | |
| B20 | B24 | |
| B21 | B20 | B24 |
| B18 | B20 | |
| B23 | B20 | B24 |
| B22 | B20 | B24 |
| B25 | B24 | I32 |
| B28 | B24 | I32 |
| B27 | B24 | B28 |
| B26 | B24 | B28 |
| B29 | B28 | I32 |
| B30 | B28 | I32 |
| B31 | B30 | I32 |
| P48 | I32 | |
| B33 | I32 | P48 |
| B40 | I32 | P48 |
| B35 | I32 | B40 |
| B36 | I32 | B40 |

FIG. 31

| Current picture | Reference picture set | | | | |
|---|---|---|---|---|---|
| I0 | | | | | |
| P16 | I0 | | | | |
| B1 | I0 | P16 | | | |
| B8 | I0 | P16 | | | |
| B3 | I0 | B8 | P16 | | |
| B4 | I0 | B8 | P16 | | |
| B5 | I0 | B4 | B8 | P16 | |
| B2 | I0 | B4 | B8 | P16 | |
| B7 | I0 | B4 | B8 | P16 | |
| B6 | I0 | B4 | B8 | P16 | |
| B9 | I0 | B8 | P16 | | |
| B12 | I0 | B8 | P16 | | |
| B11 | I0 | B8 | B12 | P16 | |
| B10 | I0 | B8 | B12 | P16 | |
| B13 | I0 | B8 | B12 | P16 | |
| B14 | I0 | B8 | B12 | P16 | |
| B15 | I0 | B8 | B12 | B14 | P16 |
| I32 | | | | | |
| B17 | I32 | | | | |
| B24 | I32 | | | | |
| B19 | B24 | I32 | | | |
| B20 | B24 | I32 | | | |
| B21 | B20 | B24 | I32 | | |
| B18 | B20 | B24 | I32 | | |
| B23 | B20 | B24 | I32 | | |
| B22 | B20 | B24 | I32 | | |
| B25 | B24 | I32 | | | |
| B28 | B24 | I32 | | | |
| B27 | B24 | B28 | I32 | | |
| B26 | B24 | B28 | I32 | | |
| B29 | B24 | B28 | I32 | | |
| B30 | B24 | B28 | I32 | | |
| B31 | B24 | B28 | B30 | I32 | |
| P48 | I32 | | | | |
| B33 | I32 | P48 | | | |
| B40 | I32 | P48 | | | |
| B35 | I32 | B40 | P48 | | |
| B36 | I32 | B40 | P48 | | |

| Current picture | Reference picture set | | | | | | | | | | | | |
|---|---|---|---|---|---|---|---|---|---|---|---|---|---|
| I0 | | | | | | | | | | | | | |
| B1 | I0 | | | | | | | | | | | | |
| P16 | I0 | | | | | | | | | | | | |
| B3 | I0 | B1 | P16 | | | | | | | | | | |
| B8 | I0 | P16 | | | | | | | | | | | |
| B5 | I0 | B1 | B3 | B8 | P16 | | | | | | | | |
| B4 | I0 | B8 | P16 | | | | | | | | | | |
| B7 | I0 | B1 | B3 | B4 | B5 | B8 | P16 | | | | | | |
| B2 | I0 | B4 | B8 | P16 | | | | | | | | | |
| B9 | I0 | B1 | B2 | B3 | B4 | B5 | B7 | B8 | P16 | | | | |
| B6 | I0 | B2 | B4 | B8 | P16 | | | | | | | | |
| B11 | I0 | B1 | B2 | B3 | B4 | B5 | B6 | B7 | B8 | B9 | P16 | | |
| B12 | I0 | B4 | B8 | P16 | | | | | | | | | |
| B13 | I0 | B1 | B2 | B3 | B4 | B5 | B6 | B7 | B8 | B9 | B11 | B12 | P16 |
| B10 | I0 | B2 | B4 | B6 | B8 | B12 | P16 | | | | | | |
| B15 | I0 | B1 | B2 | B3 | B4 | B5 | B6 | B7 | B8 | B9 | B10 | B11 | B12 | B13 | P16 |
| B14 | I0 | B2 | B4 | B6 | B8 | B10 | B12 | P16 | | | | | |
| B17 | P16 | | | | | | | | | | | | |
| I32 | | | | | | | | | | | | | |
| B19 | P16 | B17 | I32 | | | | | | | | | | |
| B24 | P16 | I32 | | | | | | | | | | | |
| B21 | P16 | B17 | B19 | B24 | I32 | | | | | | | | |
| B20 | P16 | B24 | I32 | | | | | | | | | | |
| B23 | P16 | B17 | B19 | B20 | B21 | B24 | I32 | | | | | | |
| B18 | P16 | B20 | B24 | I32 | | | | | | | | | |
| B25 | P16 | B17 | B18 | B19 | B20 | B21 | B23 | B24 | I32 | | | | |
| B22 | P16 | B18 | B20 | B24 | I32 | | | | | | | | |
| B27 | P16 | B17 | B18 | B19 | B20 | B21 | B22 | B23 | B24 | B25 | I32 | | |
| B28 | P16 | B20 | B24 | I32 | | | | | | | | | |
| B29 | P16 | B17 | B18 | B19 | B20 | B21 | B22 | B23 | B24 | B25 | B27 | B28 | I32 |
| B26 | P16 | B18 | B20 | B22 | B24 | B28 | I32 | | | | | | |
| B31 | P16 | B17 | B18 | B19 | B20 | B21 | B22 | B23 | B24 | B25 | B26 | B27 | B28 | B29 | I32 |
| B30 | P16 | B18 | B20 | B22 | B24 | B26 | B28 | I32 | | | | | |
| B33 | B17 | B18 | B19 | B20 | B21 | B22 | B23 | B24 | B25 | B26 | B27 | B28 | B29 | B30 | B31 |
| | I32 | B34 | | | | | | | | | | | |
| P48 | I32 | | | | | | | | | | | | |
| B35 | B17 | B18 | B19 | B20 | B21 | B22 | B23 | B24 | B25 | B26 | B27 | B28 | B29 | B30 | B31 |
| | I32 | B33 | B34 | P48 | | | | | | | | | |
| B40 | I32 | P48 | | | | | | | | | | | |

FIG. 38

| Current picture | Reference picture set | |
|---|---|---|
| I0 | | |
| B1 | I0 | |
| P16 | I0 | |
| B3 | I0 | P16 |
| B8 | I0 | P16 |
| B5 | I0 | B8 |
| B4 | I0 | B8 |
| B7 | B4 | B8 |
| B2 | I0 | B4 |
| B9 | B8 | P16 |
| B6 | B4 | B8 |
| B11 | B8 | P16 |
| B12 | B8 | P16 |
| B13 | B12 | P16 |
| B10 | B8 | B12 |
| B15 | B10 | P16 |
| B14 | B12 | P16 |
| B17 | I0 | |
| I32 | | |
| B19 | I32 | |
| B24 | I32 | |
| B21 | | B24 |
| B20 | B24 | |
| B23 | B20 | B24 |
| B18 | B20 | |
| B25 | B24 | I32 |
| B22 | B20 | B24 |
| B27 | B24 | I32 |
| B28 | B24 | I32 |
| B29 | B28 | I32 |
| B26 | B24 | B28 |
| B31 | B28 | I32 |
| B30 | B28 | I32 |
| B33 | I32 | |
| P48 | I32 | |
| B35 | I32 | P48 |
| B40 | I32 | P48 |

FIG. 39

| Current picture | Reference picture set | | | |
|---|---|---|---|---|
| I0 | | | | |
| B1 | I0 | | | |
| P16 | I0 | | | |
| B3 | I0 | P16 | | |
| B8 | I0 | P16 | | |
| B5 | I0 | B8 | P16 | |
| B4 | I0 | B8 | P16 | |
| B7 | I0 | B4 | B8 | P16 |
| B2 | I0 | B4 | B8 | P16 |
| B9 | I0 | B8 | P16 | |
| B6 | I0 | B4 | B8 | P16 |
| B11 | I0 | B8 | P16 | |
| B12 | I0 | B8 | P16 | |
| B13 | I0 | B8 | B12 | P16 |
| B10 | I0 | B8 | B12 | P16 |
| B15 | I0 | B8 | B12 | P16 |
| B14 | I0 | B8 | B12 | P16 |
| B17 | I0 | | | |
| I32 | | | | |
| B19 | I32 | | | |
| B24 | I32 | | | |
| B21 | B24 | I32 | | |
| B20 | B24 | I32 | | |
| B23 | B20 | B24 | I32 | |
| B18 | B20 | B24 | I32 | |
| B25 | B24 | I32 | | |
| B22 | B20 | B24 | I32 | |
| B27 | B24 | I32 | | |
| B28 | B24 | I32 | | |
| B29 | B24 | B28 | I32 | |
| B26 | B24 | B28 | I32 | |
| B31 | B24 | B28 | I32 | |
| B30 | B24 | B28 | I32 | |
| B33 | I32 | | | |
| P48 | I32 | | | |
| B35 | I32 | P48 | | |
| B40 | I32 | P48 | | |

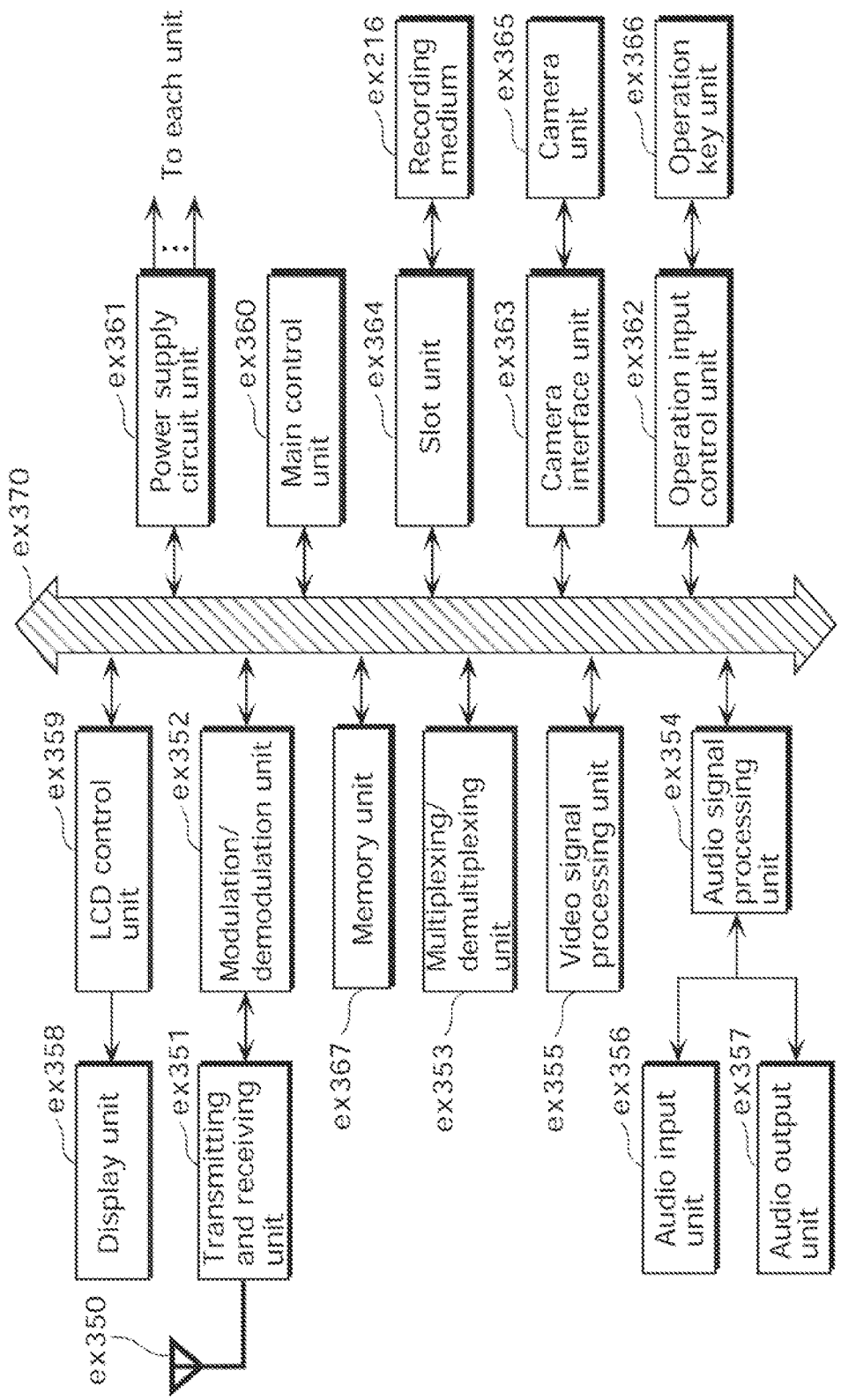

FIG. 54

| Video stream (PID=0x1011, Primary video) | Audio stream (PID=0x1100) | Audio stream (PID=0x1101) | Presentation graphics stream (PID=0x1200) | Presentation graphics stream (PID=0x1201) | Interactive graphics stream (PID=0x1400) | Video stream (PID=0x1B00, Secondary video) | Video stream (PID=0x1B01, Secondary video) |

FIG. 57
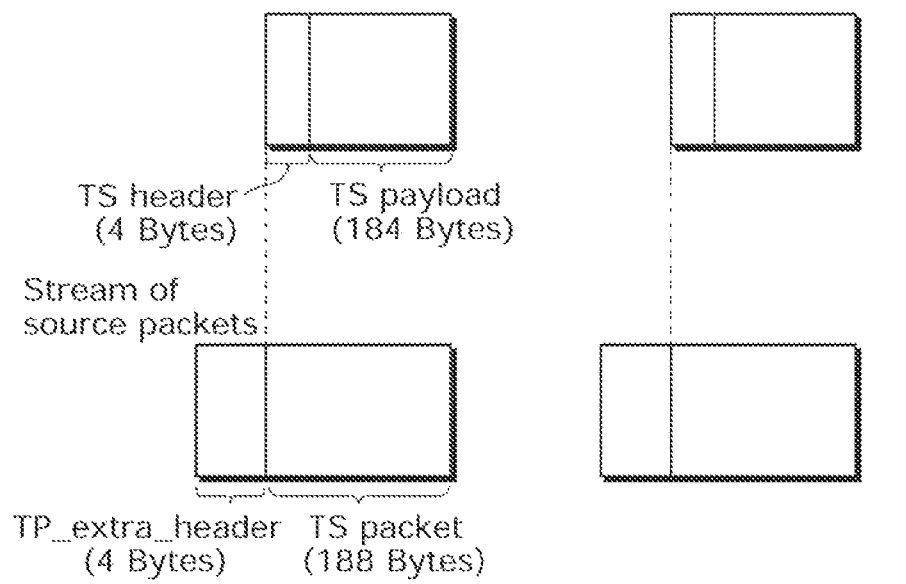
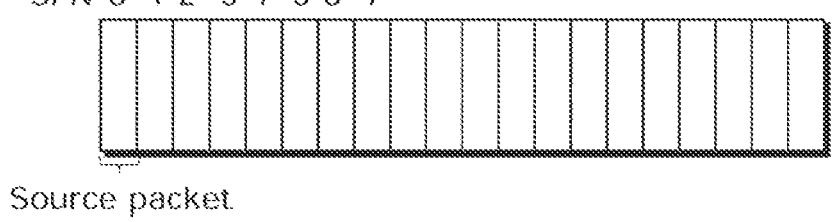

FIG. 65

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, RECEIVING APPARATUS, AND TRANSMITTING APPARATUS

CROSS REFERENCE TO RELATED APPLICATION

This is a continuation application of U.S. application Ser. No. 15/130,080 filed on Apr. 15, 2016 which is a continuation application of PCT International Application No. PCT/JP2014/004889 filed on Sep. 24, 2014, designating the United States of America, which is based on and claims priority of U.S. Provisional Patent Application No. 61/892,536 filed on Oct. 18, 2013. The entire disclosures of the above-identified applications, including the specifications, drawings and claims are incorporated herein by reference in their entirety.

FIELD

The present disclosure relates to an image coding method and an image decoding method.

BACKGROUND

As a technique regarding an image coding method for coding images (including video) or an image decoding method for decoding images, there is the technique disclosed in Non Patent Literature (NPL) 1.

CITATION LIST

Non Patent Literature

[NPL 1] Joint Collaborative Team on Video Coding (JCT-VC) of ITU-T SG16 WP3 and ISO/IEC JTC1/SC29/WG11 12th Meeting: Geneva, CH, 14-23 Jan. 2013 JCTVC-L1003_v34.doc, High Efficiency Video Coding (HEVC) text specification draft 10 (for FDIS & Last Call) http://phenix.it-sudparis.eu/jct/doc_end_user/documents/12_Gene va/wg11/JCTVC-L1003-v34.zip

Summary

However, in the image coding method and image decoding method according to the conventional technique, there are cases where inefficient processing is used.

In view of this, the present disclosure provides an image coding method capable of generating a coded bitstream that can be efficiently decoded by an image decoding apparatus, or an image coding decoding method capable of efficiently decoding an image.

An image coding method according to an aspect of the present disclosure is an image coding method of hierarchically coding a plurality of pictures to generate a bitstream, the image coding method including: coding each picture of the plurality of pictures, which belongs to any one of a plurality of hierarchical layers, with reference to a picture belonging to a hierarchical layer which is same as or lower than a hierarchical layer to which the each picture belongs, and without reference to a picture belonging to a hierarchical layer which is higher than the hierarchical layer to which the each picture belongs; and generating the bitstream by coding the coded pictures and time information indicating decoding times of the coded pictures, wherein the time information indicates that the decoding times are set at equal intervals for low-layer pictures which are the plurality of pictures other than highest-layer pictures belonging to a highest layer among the plurality of hierarchical layers.

Furthermore, an image coding method according to an aspect of the present disclosure is an image decoding method of decoding a bitstream generated by hierarchically coding a plurality of pictures each belonging to any one of a plurality of hierarchical layers, the image decoding method including: decoding time information indicating decoding times of the plurality of pictures, from the bitstream; and decoding each picture of the plurality of pictures according to the time information, with reference to a picture belonging to a hierarchical layer which is same as or lower than a hierarchical layer to which the each picture belongs, and without reference to a picture belonging to a hierarchical layer which is higher than the hierarchical layer to which the each picture belongs, wherein the time information indicates that the decoding times are set at equal intervals for low-layer pictures which are the plurality of pictures other than highest-layer pictures belonging to a highest layer among the plurality of hierarchical layers.

It should be noted that these general and specific aspects described above may be implemented using a system, a method, an integrated circuit, a computer program, or a computer-readable recording medium such as a CD-ROM, or any arbitrary combination of systems, methods, integrated circuits, computer programs, or computer-readable recording media.

The present disclosure can provide an image coding method capable of generating a coded bitstream that can be efficiently decoded by an image decoding apparatus, or an image coding decoding method capable of efficiently decoding an image.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 10A is a diagram illustrating an example of a coded stream according to Embodiment 1.

FIG. 10B is a diagram illustrating an example of a coded stream according to Embodiment 1.

FIG. 14 is a diagram illustrating an example of reference picture sets according to Embodiment 1.

FIG. 15 is a diagram illustrating an example of reference picture sets according to Embodiment 1.

FIG. 16 is a diagram illustrating an example of reference picture sets according to Embodiment 1.

FIG. 21A is a diagram illustrating an example of a coded stream according to Embodiment 2.

FIG. 21B is a diagram illustrating an example of a coded stream according to Embodiment 2.

FIG. 25B is a diagram illustrating an example of a coded stream according to Embodiment 3.

FIG. 29 is a diagram illustrating an example of reference picture sets according to Embodiment 3.

FIG. 30 is a diagram illustrating an example of reference picture sets according to Embodiment 3.

FIG. 31 is a diagram illustrating an example of reference picture sets according to Embodiment 3.

FIG. 34A is a diagram illustrating an example of a coded stream according to Embodiment 4.

FIG. 34B is a diagram illustrating an example of a coded stream according to Embodiment 4.

FIG. 35 is a diagram illustrating an example of a coded stream according to Embodiment 4.

FIG. 37 is a diagram illustrating an example of reference picture sets according to Embodiment 4.

FIG. 38 is a diagram illustrating an example of reference picture sets according to Embodiment 4.

FIG. 39 is a diagram illustrating an example of reference picture sets according to Embodiment 4.

FIG. 53B is a block diagram illustrating an example of a configuration of a cellular phone.

FIG. 54 is a diagram illustrating a structure of multiplexed data.

FIG. 57 is a diagram illustrating a structure of TS packets and source packets in multiplexed data.

FIG. 65 is a diagram illustrating an example of a look-up table in which video data standards are associated with driving frequencies.

DETAILED DESCRIPTION

In recent years, the progress of digital video device technology has been remarkable, and opportunities for compression-coding a video signal (a plurality of pictures arranged in chronological order) inputted from a video camera or a television tuner, and recording the resulting data on a recording medium such as a DVD or a hard disk has been increasing Although H.264/AVC (MPEG-4 AVC) exists as an image coding standard, the High Efficiency Video Coding (HEVC) standard (NPL 1) is being considered as a next generation standard.

In the HEVC standard (NPL 1), a hierarchical structure can be used in order to realize temporal scalability. With this, for example, the coding structures illustrated in FIG. 1, FIG. 2, and FIG. 3 can be realized.

Figure 1:
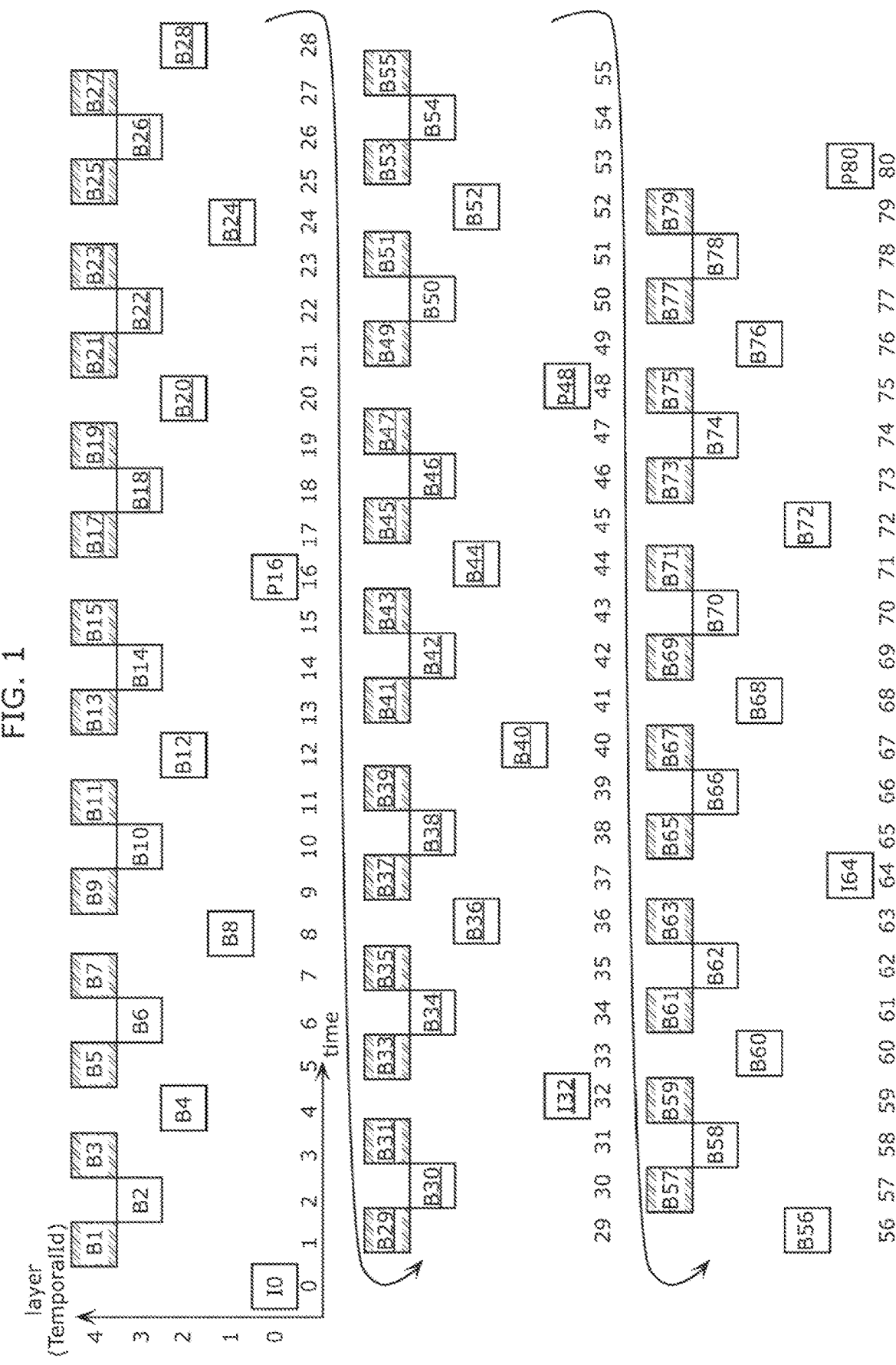
FIG. 1 is a diagram illustrating an example of a coding structure.
Figure 2:
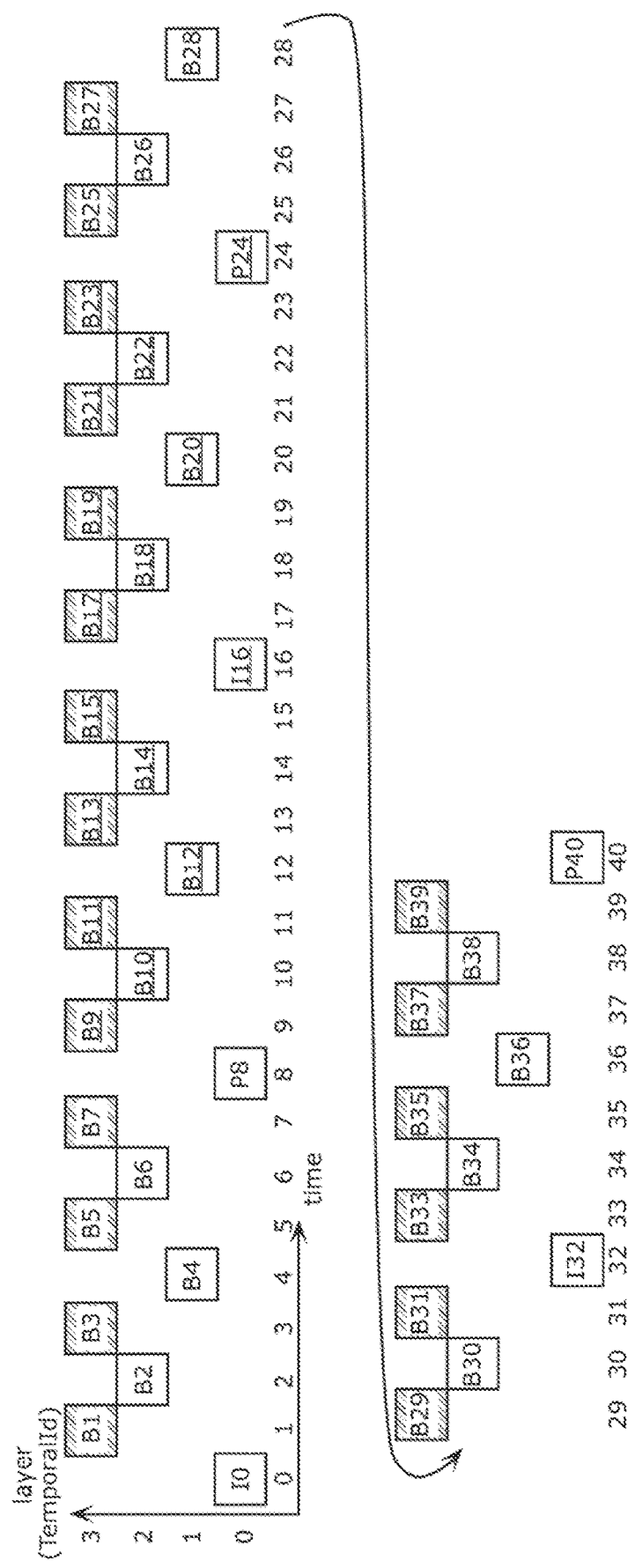
FIG. 2 is a diagram illustrating an example of a coding structure.
Figure 3:
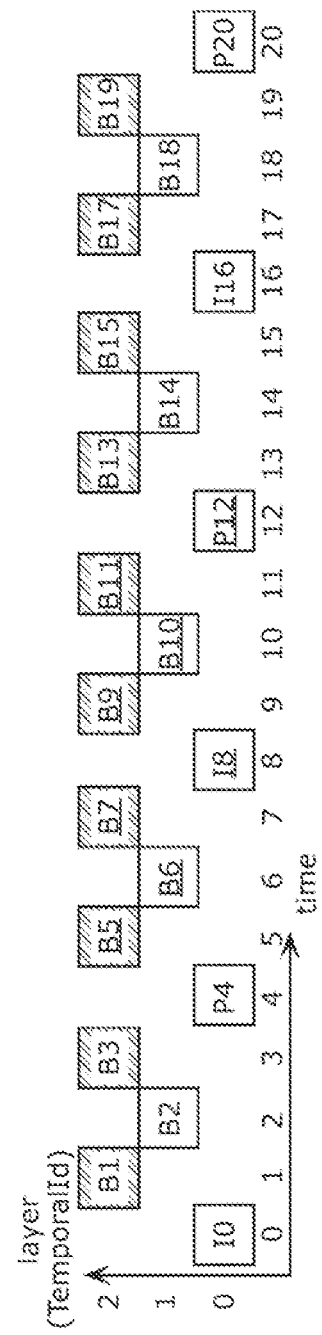
FIG. 3 is a diagram illustrating an example of a coding structure.

In FIG. 1, FIG. 2, and FIG. 3, TemporalId is an identifier of a layer in the coding structure. A larger TemporalId indicates a deeper (lower) layer. A single square block represents a picture, and Ix in a block indicates an I-picture (intra-prediction picture), Px indicates a P-picture (forward predicted picture), and Bx indicates a B-picture (bi-directional predicted picture). The x in Ix, Px, and Bx indicates the order in which the picture is displayed. Pictures having an underlined Ix, Px, or Bx represent pictures belonging to the same group of pictures (GOP). Pictures with diagonal line shading represent pictures with the largest TemporalId.

Furthermore, FIG. 1 illustrates an example of a case where the largest TemporalId is 4, FIG. 2 illustrates an example of a case where the largest TemporalId is 3, and FIG. 3 illustrates an example of a case where the largest TemporalId is 2.

Temporal scalability is realized by prohibiting the use of a picture with a larger TemporalId as a reference picture. For example, the video illustrated in FIG. 1 is a 120-fps (frame per second) video. When a 60-fps video is to be obtained from the 120-fps video, the image decoding apparatus decodes only pictures with a TemporalId of 0 to a TemporalId of 3. Here, since pictures with a TemporalId of 0 To a TemporalId of 3 are prohibited from referring to a picture with a TemporalId of 4, the image decoding apparatus can decode the pictures with a TemporalId of 0 to a TemporalId of 3 without having to decode pictures with a TemporalId of 4. In this manner, the image decoding apparatus can obtain a 60-fps video by decoding only the pictures with a TemporalId of 0 to a TemporalId of 3.

Figure 4:
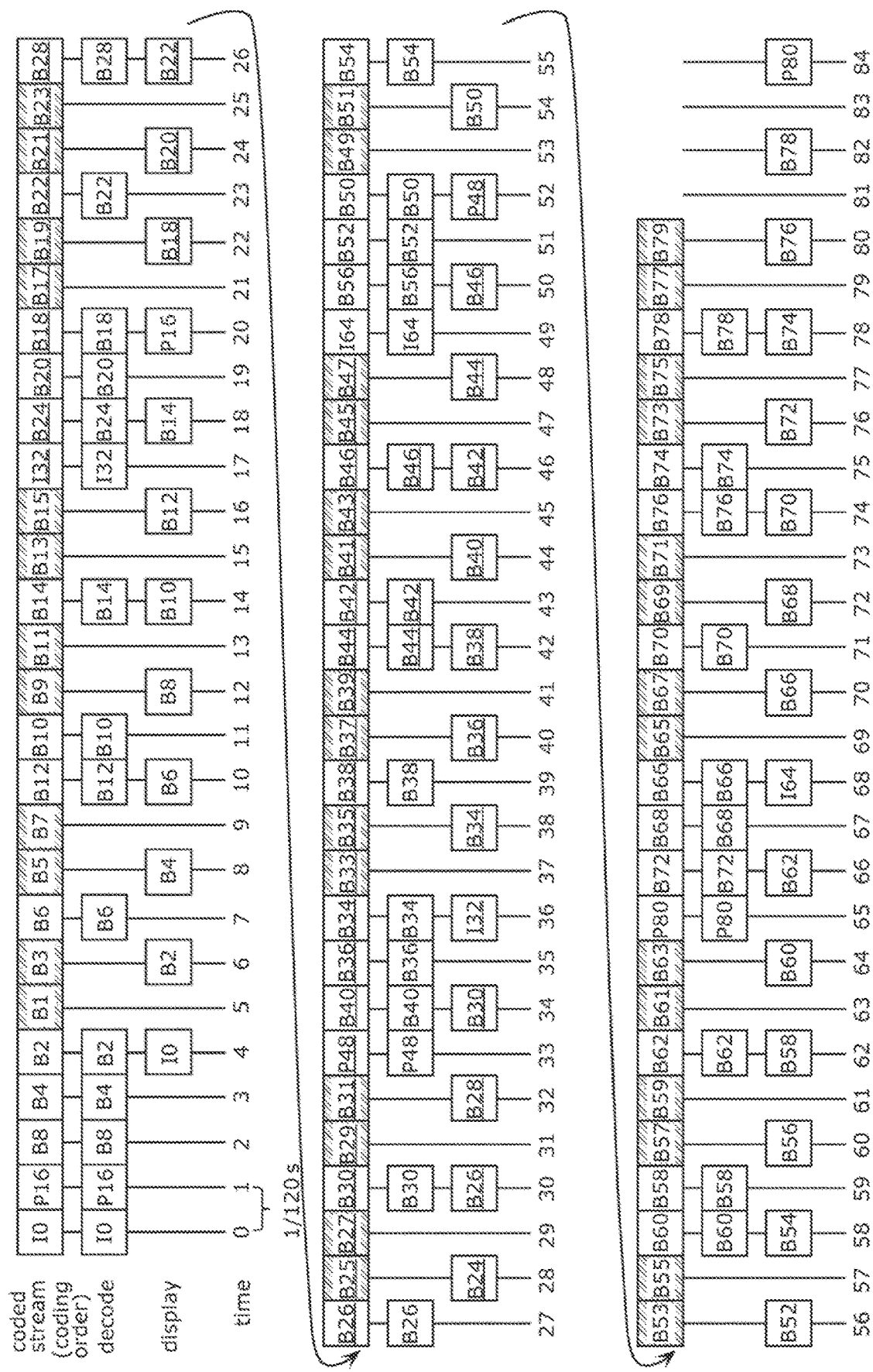
FIG. 4 is a diagram illustrating an example of a coded stream.
Figure 5:
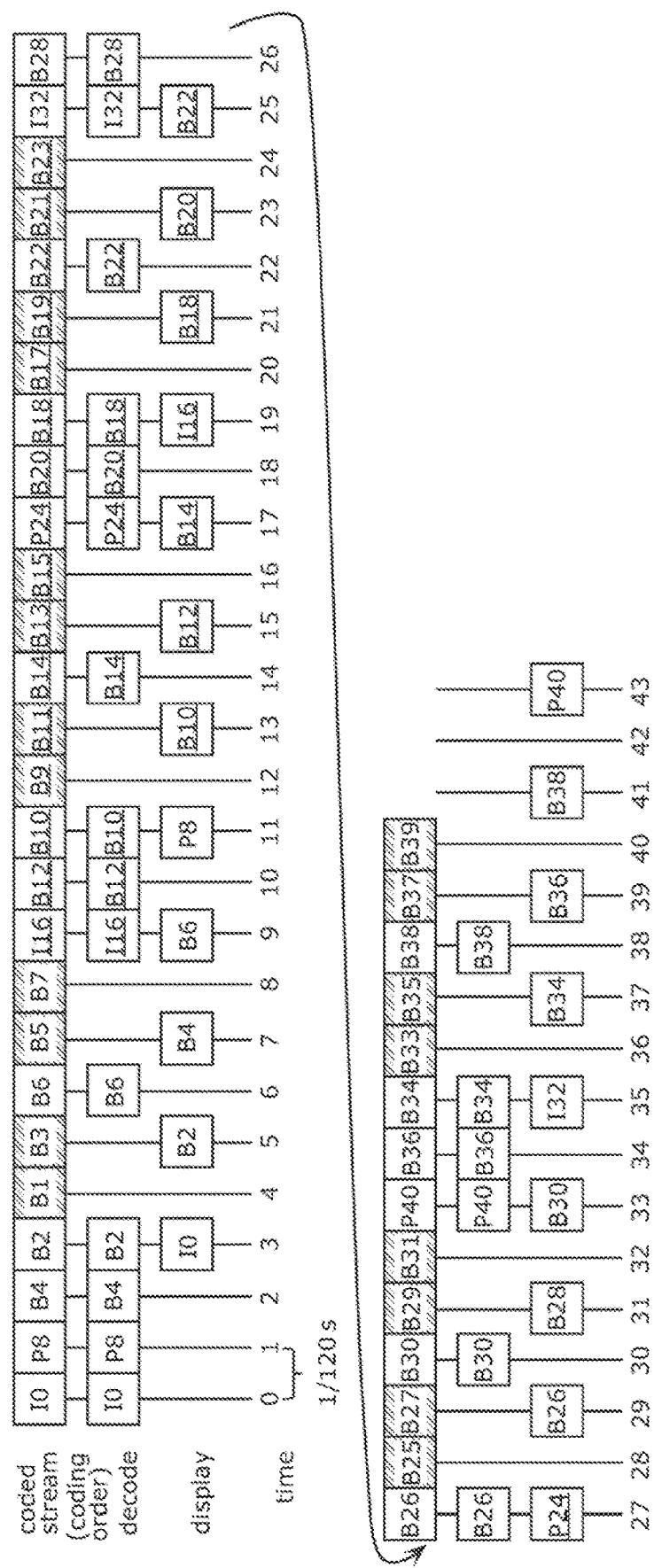
FIG. 5 is a diagram illustrating an example of a coded stream.
Figure 6:
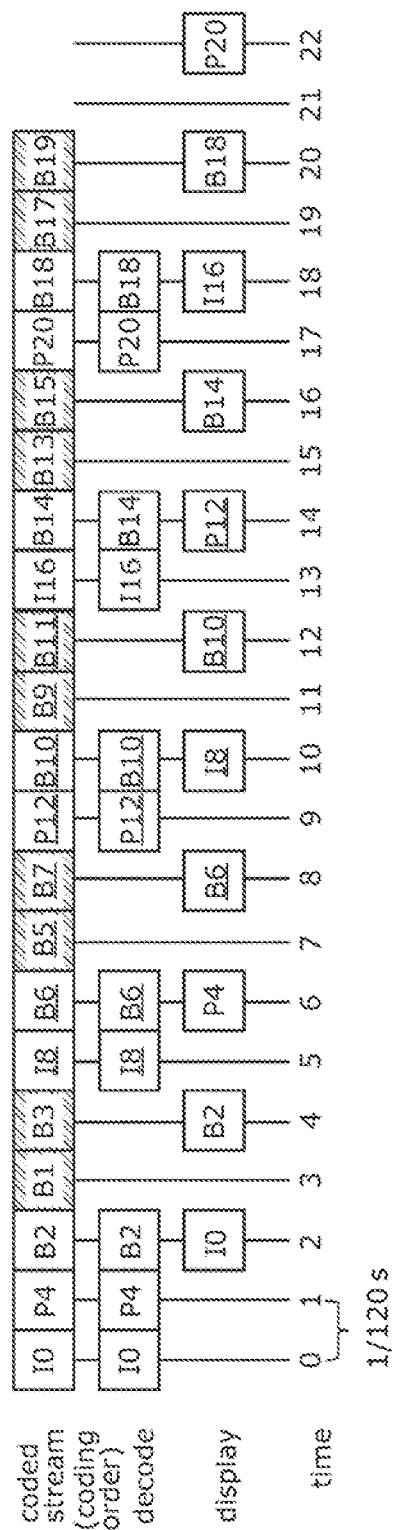
FIG. 6 is a diagram illustrating an example of a coded stream.

Furthermore, only a picture with a temporalId that is smaller than or equal to the TemporalId of the current picture to be processed can be used as a reference picture of the current picture. With this, the coded streams (coding order) of the pictures illustrated in FIG. 1, FIG. 2, and FIG. 3 become as illustrated in FIG. 4, FIG. 5, and FIG. 6, respectively. FIG. 4 illustrates an example of when the largest TemporalId is 4, FIG. 5 illustrates an example of when the largest TemporalId is 3, and FIG. 6 illustrates an example of when the largest TemporalId is 2. Specifically, the image coding apparatus codes pictures with a small TemporalId first, and subsequently codes pictures with a large TemporalId which use the pictures with a small TemporalId as reference pictures.

However, even in the case of reproducing video at a lowered frame rate using temporal scalability, the buffer model of a coded picture buffer (CPB) would fail if picture decoding is not performed at the frame rate prior to the lowering.

For example, in the case of the 120-fps coded stream illustrated in FIG. 4, the image decoding apparatus only decodes the pictures without the diagonal line shading when reproducing video at 60 fps. However, since I0, P16, B8, B4, and B2 are located consecutively in the coded stream, the coded stream gradually builds up in the CPB if 1 picture is not decoded in $1/120$ seconds. This causes an overflow. However, reproducing at 60 fps is desired mostly in cases where the system only has a 1-picture decoding capacity of $1/60$ seconds. In addition, in such a system, video cannot be displayed at 60 fps because an overflow will occur. In this manner, the video cannot be displayed at 60 fps if the image decoding apparatus does not have a $1/120$ sec. picture decoding capacity.

An image coding method according to an aspect of the present disclosure is an image coding method of hierarchically coding a plurality of pictures to generate a bitstream, including: coding each picture of the plurality of pictures, which belongs to any one of a plurality of hierarchical layers, with reference to a picture belonging to a hierarchical layer which is same as or lower than a hierarchical layer to which the each picture belongs, and without reference to a picture belonging to a hierarchical layer which is higher than the hierarchical layer to which the each picture belongs; and generating the bitstream by coding the coded pictures and time information indicating decoding times of the coded pictures, wherein the time information indicates that the decoding times are set at equal intervals for low-layer pictures which are the plurality of pictures other than highest-layer pictures belonging to a highest layer among the plurality of hierarchical layers.

Accordingly, the image coding method can generate a coded bitstream in which the decoding times of the low-layer pictures other than highest-layer pictures belonging to the highest hierarchical layer are set at equal intervals. Therefore, when the frame rate of the pictures in all layers is 120 fps and the frame rate of low-layer pictures is 60 fps for example, the low-layer pictures can be decoded by an image decoding apparatus having a 60-fps decoding capacity. In this manner, the image coding method can generate a coded bitstream that can be decoded efficiently by the image decoding apparatus.

For example, the time information may indicate that a decoding time of a picture preceding a random-accessible I-picture in display order precedes a decoding time of a picture following the random-accessible I-picture in display order.

Accordingly, the image coding method enables reduction of the capacity of the reference frame memory of the image decoding apparatus.

For example, the plurality of pictures may each belong to any one of a plurality of picture groups each including at least one I-picture and a plurality of pictures located consecutively in display order, and the decoding times may be set so that the pictures included in each of the plurality of picture groups are decoded consecutively without intervention of decoding of a picture belonging to another one of the plurality of picture groups.

Accordingly, the image coding method can generate a coded bitstream that can be decoded by the image decoding apparatus without performing a special process.

For example, in the coding of each of the plurality of pictures, the highest-layer pictures and the low-layer pictures may be coded alternately.

For example, the low-layer pictures may have a frame rate that is half a frame rate of the plurality of pictures.

For example, each of the highest-layer pictures may be coded without reference to a picture immediately following in display order and belonging to an immediately-lower hierarchical layer.

Furthermore, an image coding method according to an aspect of the present disclosure is an image decoding method of decoding a bitstream generated by hierarchically coding a plurality of pictures each belonging to any one of a plurality of hierarchical layers, the image decoding method including: decoding time information indicating decoding times of the plurality of pictures, from the bitstream; and decoding each picture of the plurality of pictures according to the time information, with reference to a picture belonging to a hierarchical layer which is same as or lower than a hierarchical layer to which the each picture belongs, and without reference to a picture belonging to a hierarchical layer which is higher than the hierarchical layer to which the each picture belongs, wherein the time information indicates that the decoding times are set at equal intervals for low-layer pictures which are the plurality of pictures other than highest-layer pictures belonging to a highest layer among the plurality of hierarchical layers.

Accordingly, when the frame rate of the pictures in all layers is 120 fps and the frame rate of low-layer pictures is 60 fps for example, the low-layer pictures can be decoded by an image decoding apparatus having a 60-fps decoding capacity. In this manner, the image decoding method is capable of decoding images efficiently.

For example, the time information may indicate that a decoding time of a picture preceding a random-accessible I-picture in display order precedes a decoding time of a picture following the random-accessible I-picture in display order.

Accordingly, the image decoding method enables reduction of reference frame memory capacity.

For example, the plurality of pictures may each belong to any one of a plurality of picture groups each including at least one I-picture and a plurality of pictures located consecutively in display order, and the decoding times may be set so that the pictures included in each of the plurality of picture groups are decoded consecutively without intervention of decoding of a picture belonging to another one of the plurality of picture groups.

Accordingly, the image decoding method can decode images without having to perform a special process.

For example, the low-layer pictures may have a frame rate that is half a frame rate of the plurality of pictures.

For example, each of the highest-layer pictures may be coded without reference to a picture immediately following in display order and belonging to an immediately-lower hierarchical layer.

An image coding apparatus according to an aspect of the present disclosure is an image coding apparatus that hierarchically codes a plurality of pictures to generate a bitstream, the image coding apparatus including: a coding unit configured to code each picture of the plurality of pictures, which belongs to any one of a plurality of hierarchical layers, with reference to a picture belonging to a hierarchical layer which is same as or lower than a hierarchical layer to which the each picture belongs, and without reference to a picture belonging to a hierarchical layer which is higher than the hierarchical layer to which the each picture belongs; and a generating unit configured to generate the bitstream by coding the coded pictures and time information indicating decoding times of the coded pictures, wherein the time information indicates that the decoding times are set at equal intervals for low-layer pictures which are the plurality of pictures other than highest-layer pictures belonging to a highest layer among the plurality of hierarchical layers.

Accordingly, the image coding apparatus can generate a coded bitstream in which the decoding times of the low-layer pictures other than highest-layer pictures belonging to the highest hierarchical layer are set at equal intervals. Therefore, when the frame rate of the pictures in all layers is 120 fps and the frame rate of low-layer pictures is 60 fps for example, the low-layer pictures can be decoded by an image decoding apparatus having a 60-fps decoding capac-ity. In this manner, the image coding apparatus can generate a coded bitstream that can be decoded efficiently by the image decoding apparatus.

Furthermore, a receiving apparatus according to an aspect of the present disclosure is a receiving apparatus that receives a bitstream generated by hierarchically coding a plurality of pictures each belonging to any one of a plurality of hierarchical layers, the receiving apparatus including: a first decoding unit configured to decode time information indicating decoding times of the plurality of pictures, from the bitstream; and a second decoding unit configured to decode each picture of the plurality of pictures according to the time information, with reference to a picture belonging to a hierarchical layer which is same as or lower than a hierarchical layer to which the each picture belongs, and without reference to a picture belonging to a hierarchical layer which is higher than the hierarchical layer to which the each picture belongs, wherein the time information indicates that the decoding times are set at equal intervals for low-layer pictures which are the plurality of pictures other than highest-layer pictures belonging to a highest layer among the plurality of hierarchical layers.

Accordingly, when the frame rate of the pictures in all layers is 120 fps and the frame rate of low-layer pictures is 60 fps for example, the low-layer pictures can be decoded by an image decoding apparatus having a 60-fps decoding capacity. In this manner, the receiving apparatus is capable of decoding images efficiently.

Furthermore, a transmitting apparatus according to an aspect of the present disclosure is a transmitting apparatus that transmits to the outside a bitstream generated by hierarchical coding of a plurality of pictures, wherein the hierarchical coding is executed by: coding each picture of the plurality of pictures, which belongs to any one of a plurality of hierarchical layers, with reference to a picture belonging to a hierarchical layer which is same as or lower than a hierarchical layer to which the each picture belongs, and without reference to a picture belonging to a hierarchical layer which is higher than the hierarchical layer to which the each picture belongs; and generating the bitstream by coding the coded pictures and time information indicating decoding times of the coded pictures, and the time information indicates that the decoding times are set at equal intervals for low-layer pictures which are the plurality of pictures other than highest-layer pictures belonging to a highest layer among the plurality of hierarchical layers.

Accordingly, the transmitting apparatus can transmit a coded bitstream in which the decoding times of the low-layer pictures other than highest-layer pictures belonging to the highest hierarchical layer are set at equal intervals. Therefore, when the frame rate of the pictures in all layers is 120 fps and the frame rate of low-layer pictures is 60 fps for example, the low-layer pictures can be decoded by an image decoding apparatus having a 60-fps decoding capacity. In this manner, the transmitting apparatus can transmit a coded bitstream that can be decoded efficiently by the image decoding apparatus.

Furthermore, an image coding and decoding apparatus according to an aspect of the present disclosure includes the image coding apparatus and the image decoding apparatus.

It should be noted that general and specific aspects described above may be implemented using a system, a method, an integrated circuit, a computer program, or a computer-readable recording medium such as a CD-ROM, or any arbitrary combination of systems, methods, integrated circuits, computer programs, or computer-readable recording media.

Hereinafter, embodiments of the present disclosure will be described with reference to the drawings.

It should be noted that each of the embodiments described below shows a general or specific example. The numerical values, shapes, materials, structural elements, the arrangement and connection of the structural elements, steps, the processing order of the steps etc. shown in the following embodiments are mere examples, and are not intended to limit the scope of the present disclosure. Furthermore, among the structural elements in the following embodiments, structural elements not recited in any one of the independent claims defining the most generic concept are described as arbitrary structural elements.

Embodiment 1

<Overall Configuration>

Figure 7:
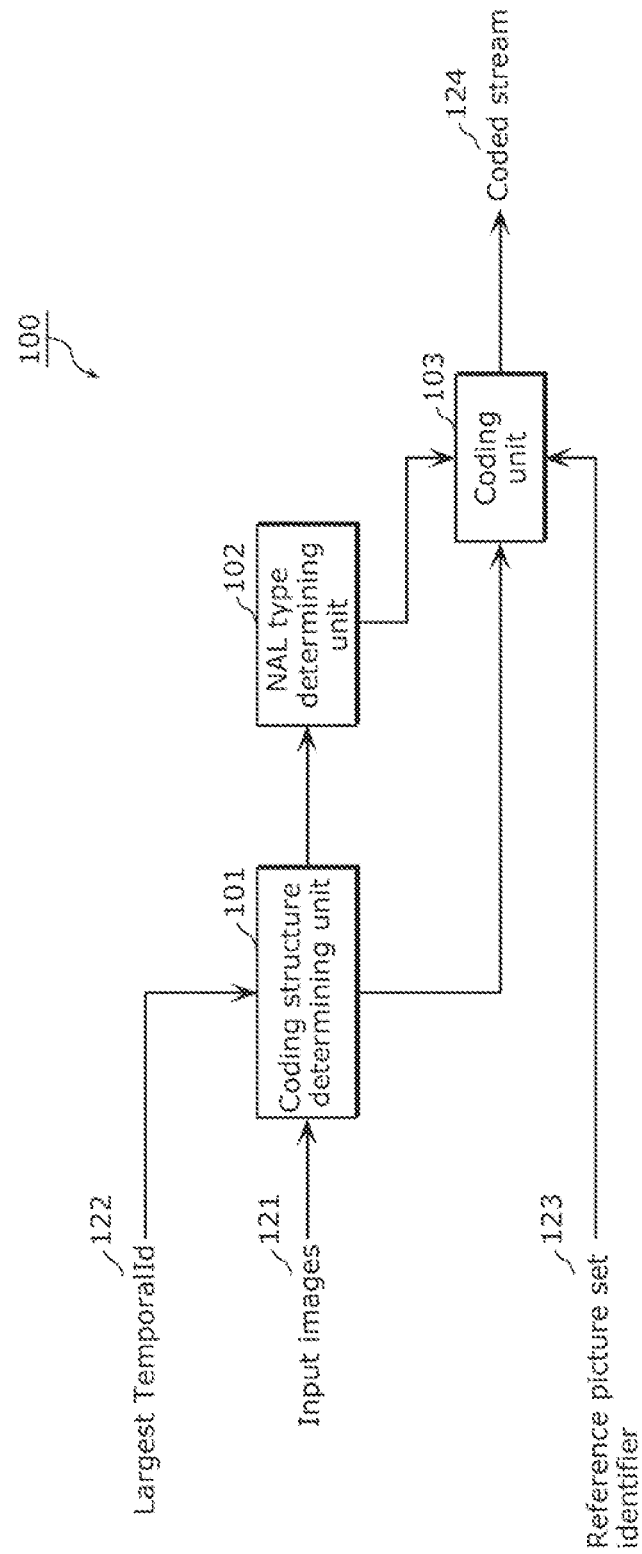
FIG. 7 is a block diagram of an image coding apparatus according to Embodiment 1.

FIG. 7 is a block diagram of an image coding apparatus 100 according to this embodiment. The image coding apparatus 100 illustrated in FIG. 7 codes input images 121 to generate a coded stream 124. The image coding apparatus 100 includes a coding structure determining unit 101, a NAL type determining unit 102, and a coding unit 103.

<Operation (as a Whole)>

Figure 8:
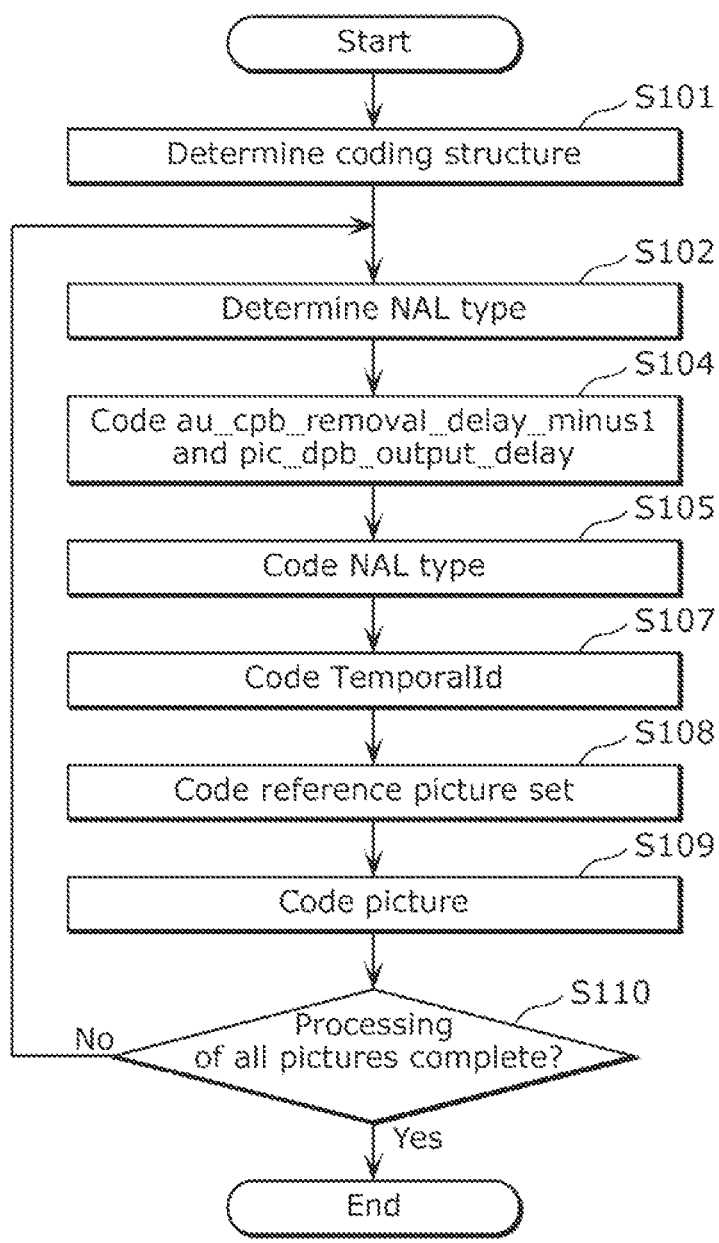
FIG. 8 is a flowchart of an image coding process according to Embodiment 1.

Next, the flow of the coding process as a whole will be described with reference to FIG. 8. FIG. 8 is a flowchart of an image coding process according to this embodiment.

First, the coding structure determining unit 101 determines the coding structure based on the input images 121 and TemporalId 122 which are inputted from the outside (S101). Specifically, the coding structure determining unit 101 determines the TemporalId of each picture.

Next, the NAL type determining unit 102 determines the NAL type of the current picture (S102)

Next, the coding unit 103 codes au_cpb_removal_delay_minus1 and pic_dpb_output_delay (S104), codes the NAL type (S105), codes the TemoporalId (S107), codes the reference picture set (S108), and codes the current picture (S109), to generate the coded stream 124. Specifically, the coding unit 103 codes the reference picture set identified by a reference picture set identifier 123 which is inputted from the outside, from among a plurality of sets. Furthermore, the coding unit 103 codes the current picture by using intra prediction when the current picture is an I-picture, using unidirectional inter prediction when the current picture is a P-picture, and using bi-directional inter prediction when the current picture is a B-picture. Furthermore, the coding unit 103 codes the current picture using frequency transformation and variable-length coding.

It should be noted that au_cpb_removal_delay_minus1, pic_dpb_output_delay, and the NAL types will be described later.

Then, image coding apparatus 100 repeats the process from step S102 to S109 until processing of all pictures is completed (S110).

<Operation (Coding Structure Determining)>

Figure 9:
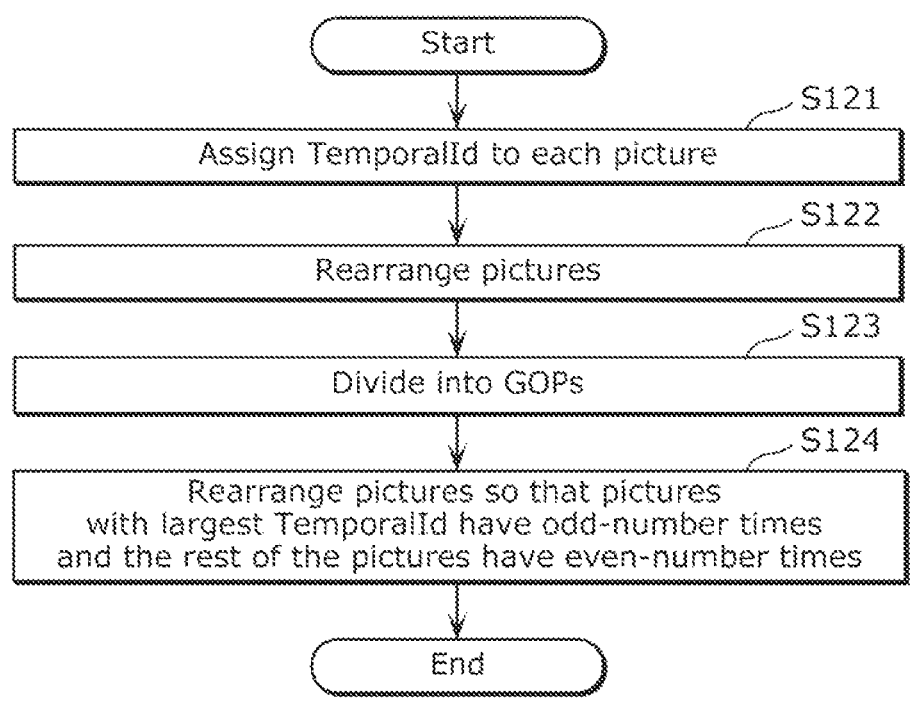
FIG. 9 is a flowchart of a coding structure determining process according to Embodiment 1.

Next, the flow of the coding structure determining process (step S101 in FIG. 8) will be described with reference to FIG. 9. FIG. 9 is a flowchart of a coding structure determining process according to this embodiment.

First, the coding structure determining unit 101 assigns a TemporalId to each picture as illustrated in FIG. 1, FIG. 2, and FIG. 3, according to the largest TemporalId 122 which is inputted from the outside (S121). For example, when the largest TemporalId is 4, the coding structure determining unit 101 assigns TemporalId0 to a picture whose display order is 0 or a multiple of 16, assigns TemporalId1 to every 16th picture starting from the picture with the display order of 8, assigns TemporalId2 to every 8th picture starting from the picture with the display order of 4, assigns TemporalId3 to every 4th picture starting from the picture with the display order of 2, and assigns TemporalId4 to pictures with an odd number display order.

Next, the coding structure determining unit 101 rearranges the pictures according to the determined TemporalId, and sets a coding order such as that illustrated in FIG. 4, FIG. 5, and FIG. 6 (S122).

Next, the coding structure determining unit 101 divides the plurality of pictures into groups so that the pictures from a random access point to the next random access point are included in the same GOP (S123) At this time, the coding structure determining unit 101 determines the I/P/B picture type according to the reference relationship. Specifically, the coding structure determining unit 101 sets an I-picture as the picture at a random access point. Here, a random access point indicates a picture which can be specified when decoding or reproduction is desired midway through a coded video, and indicates that reproduction can be performed from such picture.

Figure 10B:
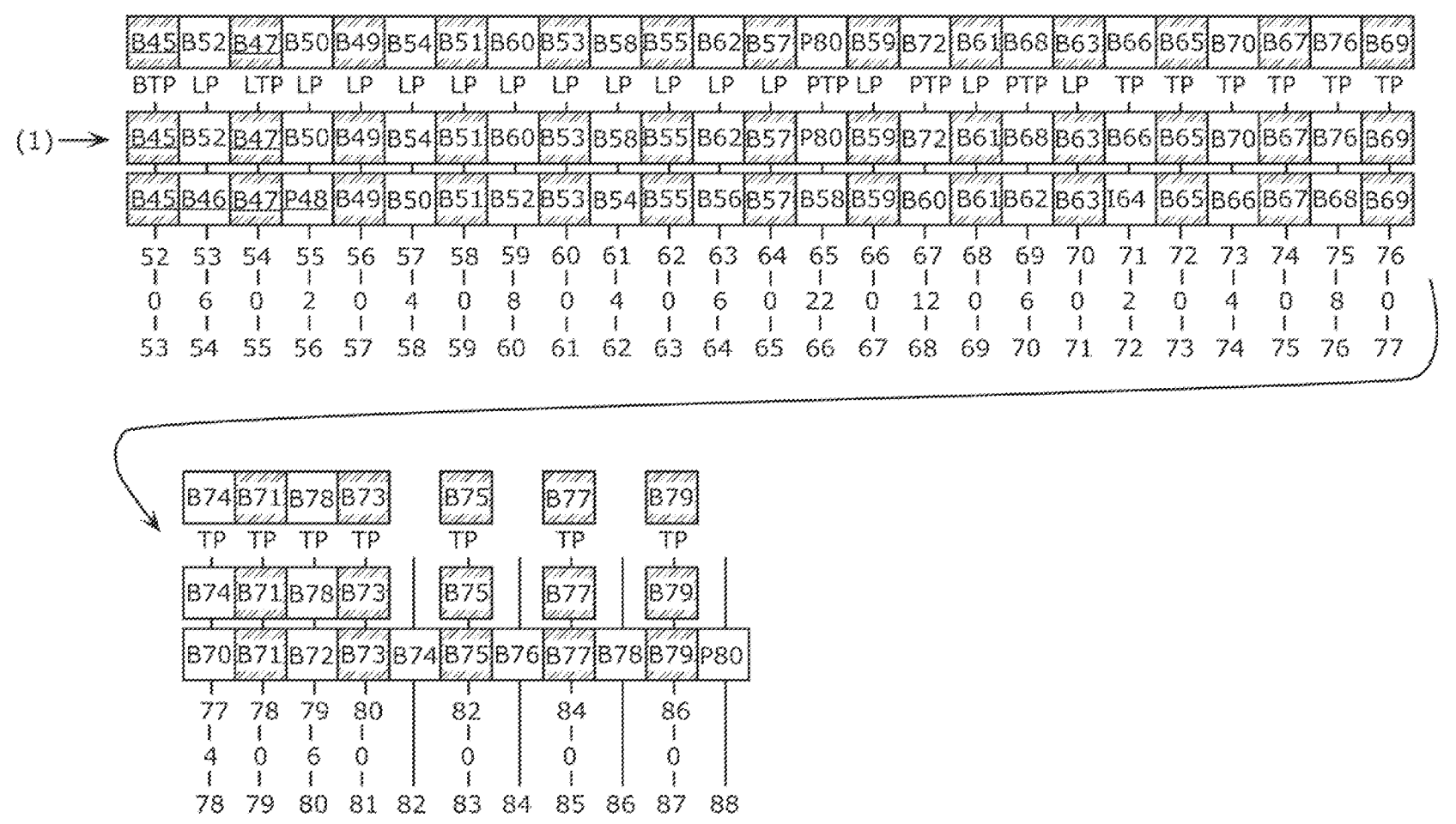
Figure 11:
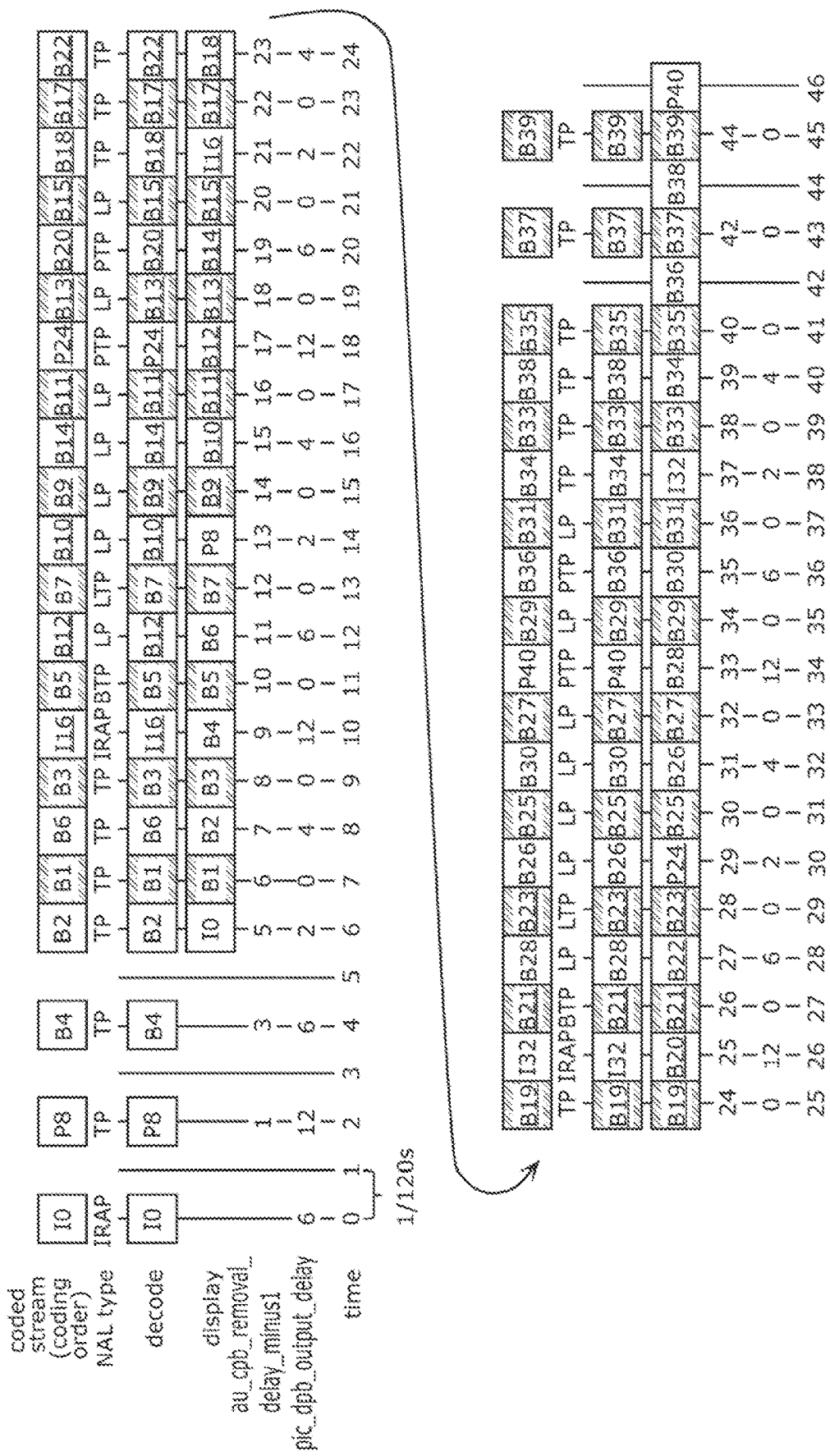
FIG. 11 is a diagram illustrating an example of a coded stream according to Embodiment 1.
Figure 12:
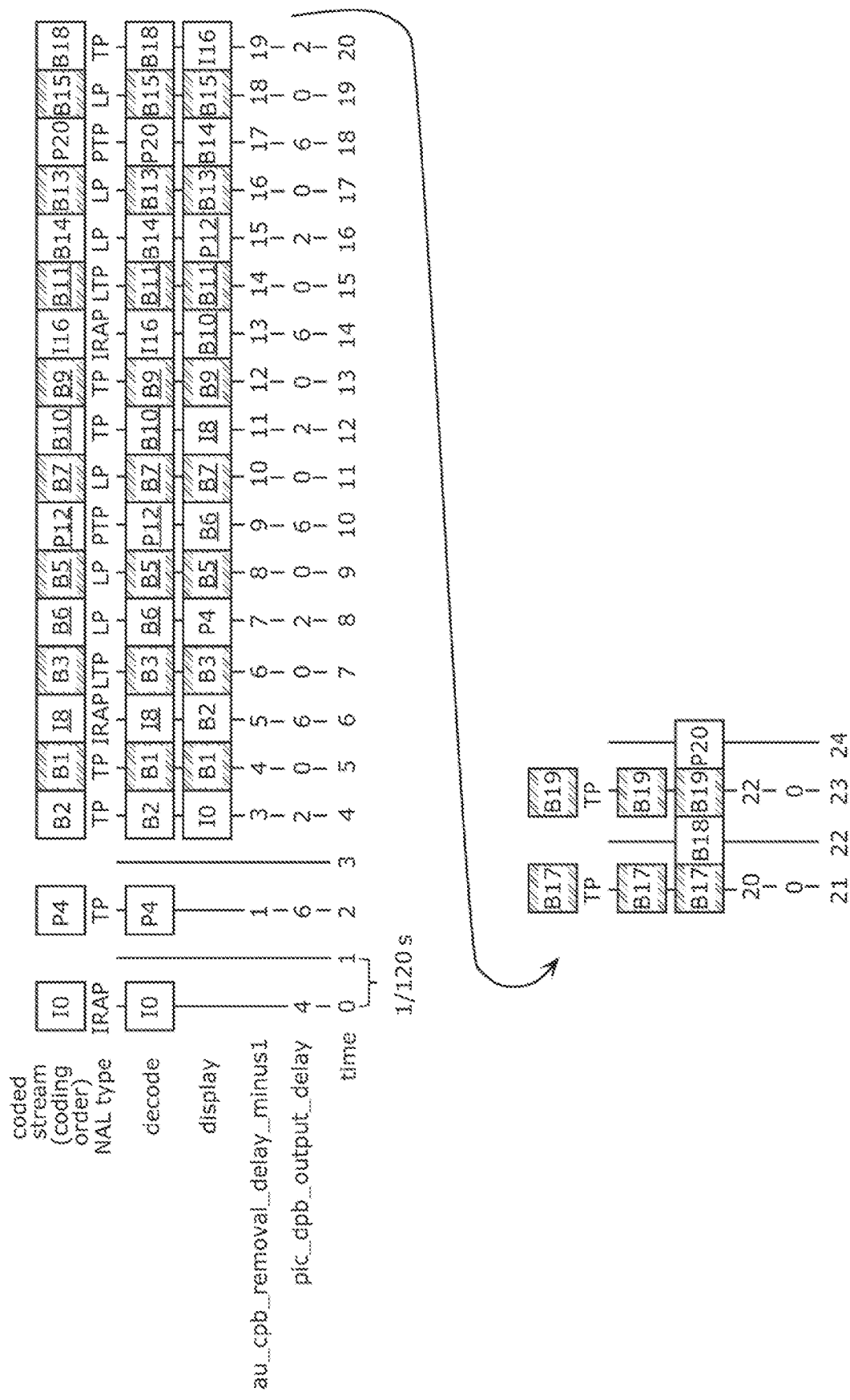
FIG. 12 is a diagram illustrating an example of a coded stream according to Embodiment 1.

Next, the coding structure determining unit 101 rearranges the pictures so that pictures with the largest TemporalId have an odd-number time, and the rest of the pictures have an even-number time (S124). For example, the coding structure determining unit 101 rearranges the pictures as illustrated in FIG. 10A and FIG. 10B, FIG. 11, or FIG. 12. FIG. 10A and FIG. 10B illustrate an example of a case where the largest TemporalId is 4, FIG. 11 illustrates an example of a case where the largest TemporalId is 3, and FIG. 12 illustrates an example of a case where the largest TemporalId is 2. As illustrated in the figure, the coding structure determining unit 101 rearranges the pictures so that pictures with the largest TemporalId, indicated by diagonal line shading, and pictures without the largest TemporalId are coded in an alternating manner.

<Operation (NAL Type Determining>

Figure 13:
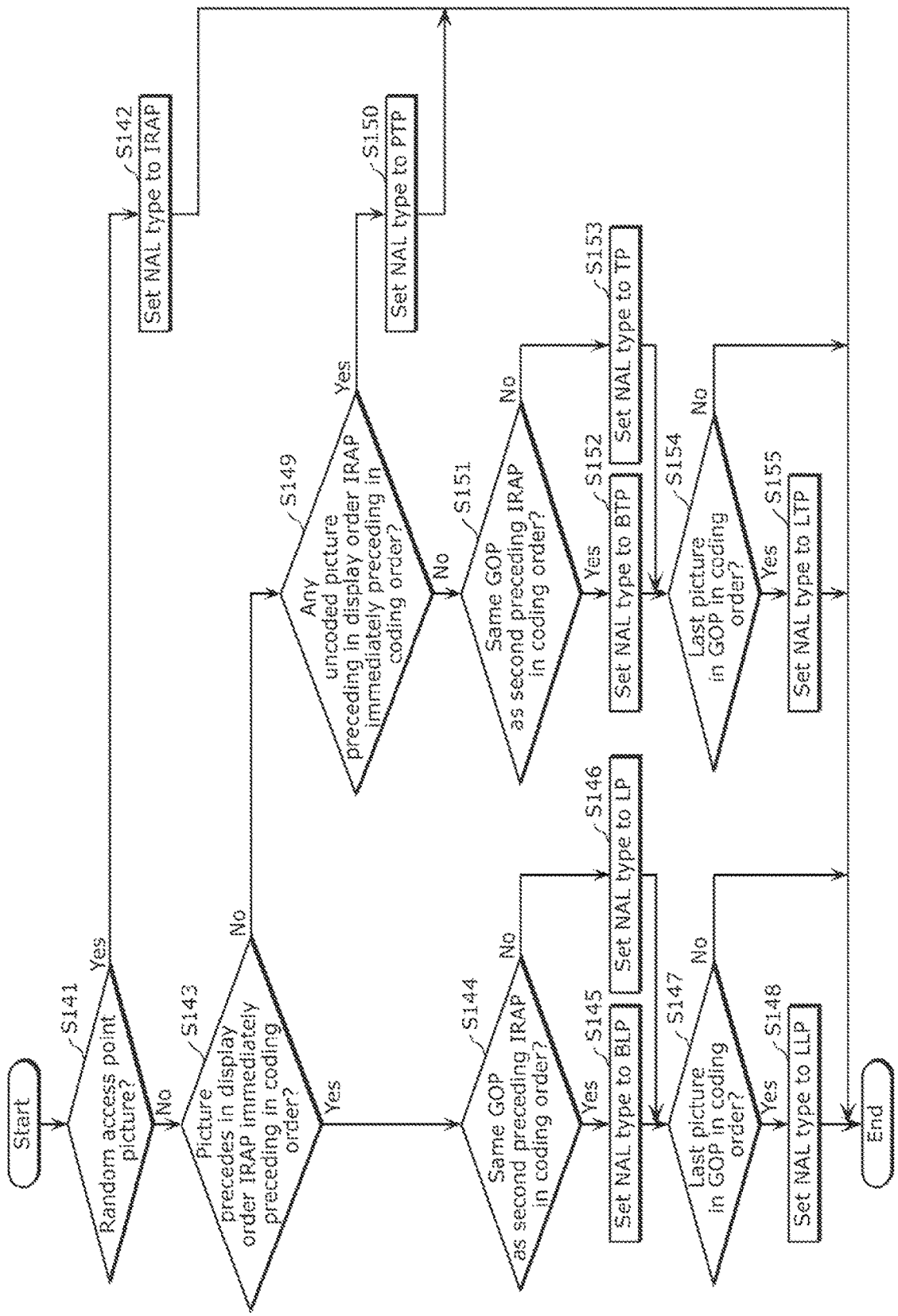
FIG. 13 is a flowchart of a NAL type determining process according to Embodiment 1.

Next, the flow of the NAL type determining process (step S102 in FIG. 8) will be described with reference to FIG. 13. FIG. 13 is a flowchart of a NAL type determining process according to this embodiment.

First, the NAL type determining unit 102 determines whether the current picture is a random access point picture (S141). When the current picture is a random access point picture (Yes in S141), the NAL type determining unit 102 sets the NAL type of the current picture to IRAP (S142), and the process ends.

When the current picture is not a random access point picture (No in S141), the NAL type determining unit 102 determines whether the current picture precedes in display order the IRAP immediately preceding in coding order (S143).

When the current picture precedes in display order the IRAP immediately preceding in coding order (Yes in S143), the NAL type determining unit 102 determines whether the current picture is included in the same GOP as the second preceding IRAP in coding order (S144). When the current picture is included in the same GOP as the second preceding IRAP in coding order (Yes in S144), the NAL type determining unit 102 sets the NAL type of the current picture to BLP (S145).

On the other hand, when the current picture is included in a GOP different from the GOP including the second preceding IRAP in coding order (No in S144), the NAL type determining unit 102 sets the NAL type of the current picture to LP (S146).

Next, the NAL type determining unit 102 determines whether the current picture is the last picture in the GOP in coding order (S147). When the current picture is the last picture in the GOP in coding order (Yes in S147), the NAL type determining unit 102 sets the NAL type of the current picture to LLP (S148), and the process ends.

Furthermore, when the current picture follows in display order the IRAP immediately preceding in coding order (No in S143), the NAL type determining unit 102 determines whether there is an uncoded picture preceding in display order the IRAP immediately preceding in coding order (S149). When there is an uncoded picture preceding the IRAP immediately preceding in coding order (Yes in S149), the NAL type determining unit 102 sets the NAL type of the current picture to PTP (S150), and the process ends.

When there is no uncoded picture preceding in display order the IRAP immediately preceding in coding order (No in S149), the NAL type determining unit 102 determines whether the current picture is included in the same GOP as the second preceding IRAP in coding order (S151). When the current picture is included in the same GOP as the second preceding IRAP in coding order (Yes in S151), the NAL type determining unit 102 sets the NAL type of the current picture to BTP (S152).

When the current picture is included in a GOP different from the GOP including the second preceding IRAP in coding order (No in S151), the NAL type determining unit 102 sets the NAL type of the current picture to TP (S153).

Next, the NAL type determining unit 102 determines whether the current picture is the last picture in the GOP in coding order (S154). When the current picture is the last picture in the GOP in coding order (Yes in S154), the NAL type determining unit 102 sets the NAL type of the current picture to LTP (S155), and the process ends.

With the process described above, coded streams such as those illustrated in FIG. 10A and FIG. 10B, FIG. 11, and FIG. 12 are generated. The meaning of each NAL type is as described below. IRAP means a picture that only contains random accessible I-slices. LP means a picture preceding an IRAP in display order. TP means a picture following an IRAP in display order. BLP means an LP picture included in the same GOP as the second preceding IRAP in coding order. BTP means a TP picture included in the same GOP as the second preceding IRAP in coding order. LLP means an LP picture that is the last picture in a GOP in coding order. LTP means a TP picture that is the last picture in a GOP in coding order. PTP means a TP picture that is still followed by an LP picture in coding order.

Furthermore, au_cpb_removal_delay_minus1 is a parameter indicating the timing for starting decoding, and indicates that decoding should be started at a time au_cpb_removal_delay_minus1+1. Furthermore, pic_dpb_output_delay is a parameter indicating the timing for displaying a decoded picture, and indicates that the decoded picture should be displayed at a time au_cpb_removal_delay_minus1+1+pic_dpb_output_delay. To describe using P16 illustrated in FIG. 10A and FIG. 10B as an example, decoding is started at time 2 which is au_cpb_removal_delay_minus1+1, and P16 is displayed at time 24 which is au_cpb_removal_delay_minus1+1+pic_dpb_output_delay.

Furthermore, the information indicating these decoding times is included in coded stream 124, and transmitted to the image decoding apparatus. The image decoding apparatus decodes the pictures at the decoding times indicated in the information. In other words, the times (coding times) illustrated in FIG. 10A, FIG. 10B, FIG. 11, and FIG. 12 indicate the decoding times in the image decoding apparatus. Furthermore, the aforementioned coding order indicates the decoding order in the image decoding apparatus.

Furthermore, the information indicating the decoding times and the display times is not limited to the aforementioned au_cpb_removal_delay_minus1 and pic_dpb_output_delay, and arbitrary information may be used.

The reference picture set indicates pictures to be used as reference pictures. The reference picture set may be set freely as long as the following constraints are satisfied: (1) a picture cannot refer to a picture with a larger TemporalId; and (2) a TP picture cannot refer to an LP picture.

Examples of reference picture sets according to this embodiment are illustrated in FIG. 14, FIG. 15, and FIG. 16. FIG. 14 illustrates a set that prioritizes compression rate, and is a set in which coded pictures are referred to whenever possible. FIG. 15 illustrates a set that enables reduction in the frame memory size to be used, and is a set in which preceding and subsequent pictures near the current picture in display order are referred to. Furthermore, in order to facilitate random access, this set is set so that only a picture included in the same GOP as the current picture is referred to.

FIG. 16 illustrates a set that has balance between compression ratio and memory size, and is a set in which a picture with TemporalId0 having small coding error is referred to, or a preceding or subsequent picture near the current picture in display order is referred to. Furthermore, in order to facilitate random accessing, this set is set so that only a picture included in the same GOP as the current picture is referred to. Furthermore, in this set, referring to a picture with the same TemporalId is prohibited, in the same manner as a TSA picture in HEVC (NPL 1), to allow switching of the reproduction frame rate midway through a coded stream.

As described earlier, in this embodiment, image coding apparatus 100 selects one from among the three sets according to the reference picture set identifier 123 inputted from the outside, and codes the selected set.

It should be noted that the examples illustrated in FIG. 14, FIG. 15, and FIG. 16 are examples for the case where the largest TemporalId is 4. Even when the largest TemporalId is other than 4, the reference picture set can be set freely as long as the following constraints are satisfied: (1) a picture cannot refer to a picture with a larger TemporalId; and (2) a TP picture cannot refer to an LP picture.

Furthermore, although a gap is provided between pictures (for example, I0 and P16) near the beginning of the coded stream in order to describe the temporal relationship, in an actual coded stream the pictures are continuous. Furthermore, the decoding start time interval is set according to au_cpb_removal_delay_minus1.

Advantageous Effect

As described above, according to this embodiment, it is possible to lower the display frame rate and display video even in a system that does not have the capacity to allow decoding at the maximum frame rate of a coded stream. For example, assume that the coded stream in FIG. 10A and FIG. 10B is a 120-fps coded stream. When the displaying of a 120-fps video is desired, the image decoding apparatus can display the 120-fps video by performing decoding as indicated by "decode" and "display" in FIG. 10A and FIG. 10B. Furthermore, when displaying of video at 60 fps is desired, the image decoding apparatus need only decode and display the pictures without diagonal line shading among the pictures indicated in "decode" and "display".

In this case, the pictures are coded at 2-picture intervals. Therefore, by decoding pictures once in 1/60 seconds, the image decoding apparatus can decode and display the coded stream without causing the buffer to fail. In other words, even without a 1/120 second picture decoding capacity, as long the image decoding apparatus has a 60 fps picture decoding capacity, video can be displayed at 60 fps.

Furthermore, since a TP is prohibited from referring to an LP, and an LP is not coded until the next IRAP after the coding of a TP, the image coding apparatus 100 or the image decoding apparatus can delete an LP picture from the reference frame memory at the time of coding or decoding. By doing so, the size of the reference frame memory can be reduced. Furthermore, by using the NAL type called PTP which indicates that there is still an LP picture following in coding order (decoding order), the image coding apparatus 100 or the image decoding apparatus can code or decode, ahead of the LP, a picture following the IRAP in display order. Accordingly, both frame memory size reduction and decoding at a lower frame rate can be achieved.

Furthermore, by using BLP and BTP which indicate that a picture belongs to the preceding GOP in coding order, and LLP and LTP which indicates the last picture in a GOP in coding order, it becomes easy for the image decoding apparatus to determine, in a coded stream in which pictures of two GOPs are intermixed, which GOP each of the pictures belongs to. Accordingly, in the case of trick play, and so on, the image decoding apparatus can easily extract a GOP from a coded stream.

In this manner, the image coding apparatus 100 according to the present embodiment hierarchically codes the plurality of pictures to generate a bitstream (coded stream 124). The image coding apparatus 100 codes each picture of the plurality of pictures, which belongs to any one of a plurality of layers, with reference to a picture belonging to a layer that is the same as or lower than the layer to which the picture belongs, and without reference to a picture belonging to a layer that is higher than the layer to which the picture belongs. The image coding apparatus 100 codes the coded pictures and time information (au_cpb_removal_delay_minus1) indicating the decoding times of the coded pictures, to generate a bitstream (coded stream 124). The time information indicates that the decoding times of low-layer pictures other than highest-layer pictures belonging to the highest hierarchical layer, among the plurality of pictures, are set at equal intervals. Stated differently, the image coding apparatus 100 codes highest-layer pictures and low-layer pictures in an alternating manner.

For example, the frame rate of the low-layer pictures is half the frame rate of the plurality of pictures. For example, the frame rate of the low-layer pictures is 60 fps, and the frame rate of the plurality of pictures is 120 fps.

Accordingly, the image coding apparatus 100 can generate a coded bitstream in which the decoding times of the low-layer pictures other than highest-layer pictures belonging to the highest hierarchical layer are set at equal intervals. Therefore, when the frame rate of the pictures in all layers is 120 fps and the frame rate of low-layer pictures is 60 fps for example, the low-layer pictures can be decoded by an image decoding apparatus having a 60-fps decoding capacity. In this manner, the image coding apparatus 100 can generate a coded bitstream that can be decoded efficiently by the image decoding apparatus.

It should be noted that although in the foregoing description the image coding apparatus 100 determines the coding structure based on the largest TemporalId 122 inputted from the outside, the largest TemporalId need not be inputted from the outside. For example, the image coding apparatus 100 may use a fixed value as the largest TemporalId. Alternatively, the image coding apparatus 100 may determine the largest TemporalId based on the frame rate of the input images 121, or may determine the largest TemporalId based on the motion information or complexity of the input images 121.

Furthermore, although in the foregoing description the image coding apparatus 100 selects the reference picture set to be used from among the three types of reference picture sets using the reference picture set identifier 123 inputted from the outside, the reference picture set identifier 123 need not be inputted from the outside. For example, the image coding apparatus 100 may use a fixed reference picture set. Alternatively, the image coding apparatus 100 may switch the reference picture set to be used in accordance with the amount of deficiency in the reference frame memory, or may switch the reference picture set to be used based on the motion information or complexity of the input images 121.

Furthermore, although three types are indicated for the reference picture set in the foregoing description, the reference picture set is not limited to these and may be set freely as long as the following constraints are satisfied: (1) a picture cannot refer to a picture with a larger TemporalId; and (2) a TP picture cannot refer to an LP picture.

Furthermore, although the unit of time is set at 1/120 seconds in FIG. 10A, FIG. 10B, FIG. 11, and FIG. 12, the unit of time is not limited to such and may be 1/60 seconds or 1/30 seconds. The unit of time may be determined based on the frame rate of the input images 121 or the frame rate of the picture to be coded.

Furthermore, although the forgoing description describes an example in which pictures with TemporalId0 other than I-pictures are P-pictures, these pictures may be B-pictures coded by forward prediction. Furthermore, the interval between I-pictures (random access points) need not be as illustrated in FIG. 10A, FIG. 10B, FIG. 11, and FIG. 12. For example, the interval between I-pictures may be longer or shorter than that illustrated in FIG. 10A, FIG. 10B, FIG. 11, and FIG. 12.

Furthermore, in the foregoing description, as illustrated in FIG. 9, after setting a coding order such as that illustrated in FIG. 4, FIG. 5, and FIG. 6, rearranging to a coding order such as that in FIG. 10A, FIG. 10B, FIG. 11, and FIG. 12 is performed in step S124. However, a coding order such as that illustrated in FIG. 4, FIG. 5, and FIG. 6 need not be set temporarily as long as a coding order such as that in FIG. 10A, FIG. 10B, FIG. 11, and FIG. 12 is eventually set.

In addition, the process according to this embodiment may be implemented using software. Then, this software may be distributed by being downloaded, etc. Furthermore, this software may be circulated by being recorded on a recording medium such as a CD-ROM.

Furthermore, various modifications such as those described above are also applicable to the other embodiments in the present Description.

Embodiment 2

<Overall Configuration>

Figure 17:
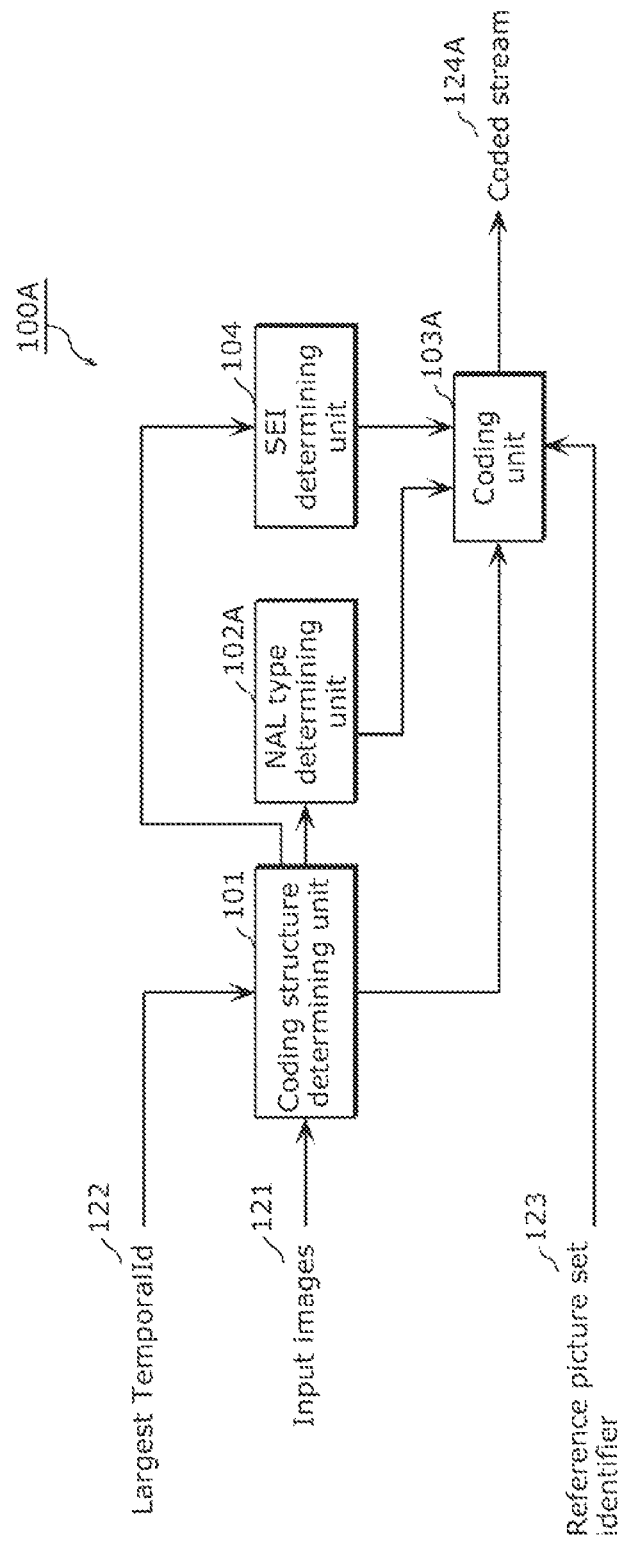
FIG. 17 is a block diagram of an image coding apparatus according to Embodiment 2.

FIG. 17 is a block diagram illustrating a configuration of an image coding apparatus 100A according to this embodiment. The image coding apparatus 100A illustrated in FIG. 17 codes the input images 121 to generate coded stream 124A. The image coding apparatus 100A includes an SEI determining unit 104 in addition to the configuration of the image coding apparatus 100 illustrated in FIG. 7. Furthermore, the functions of a NAL type determining unit 102A and a coding unit 103A are different from those of the NAL type determining unit 102 and the coding unit 103.

It should be noted that the subsequent description omits points that overlap with Embodiment 1, and focuses mainly on the points of difference.

<Operation (as a Whole)>

Figure 18:
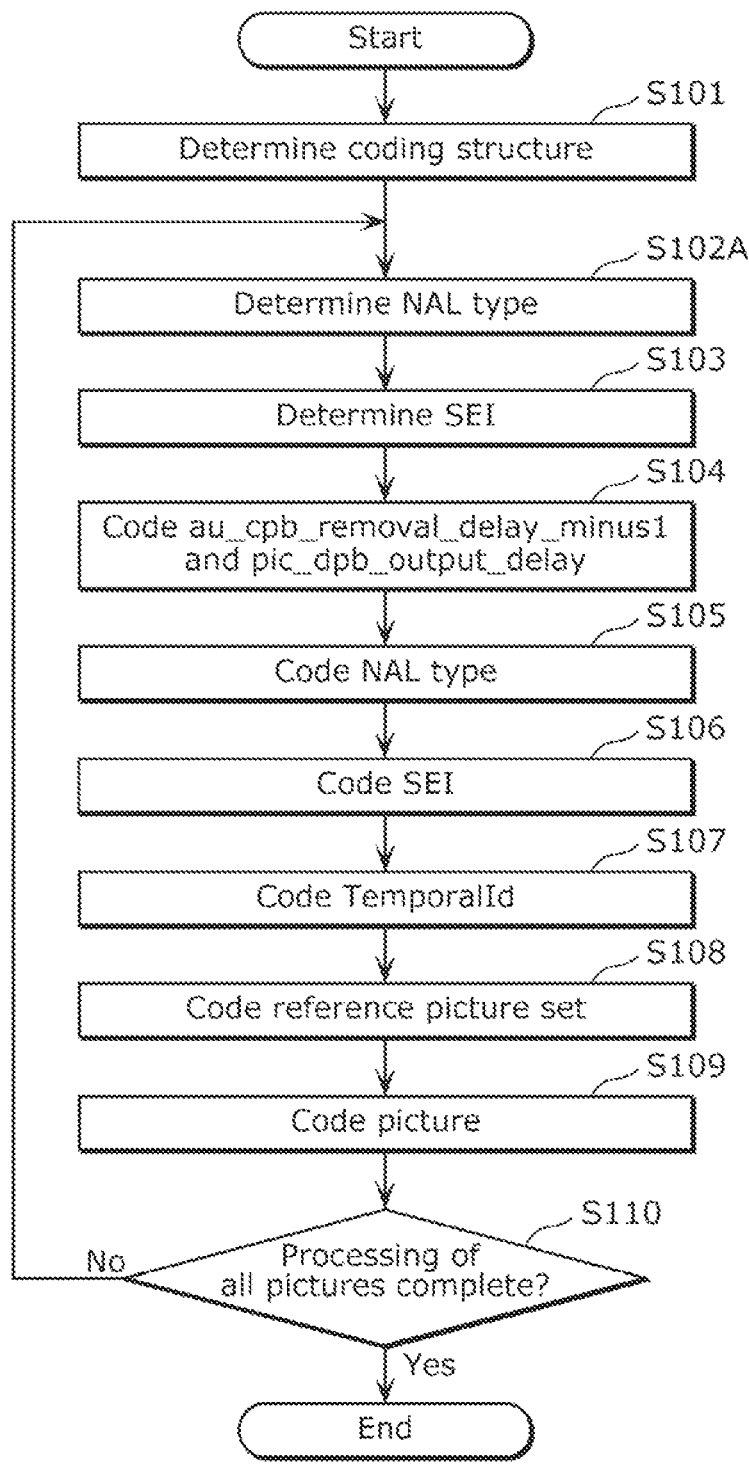
FIG. 18 is a flowchart of an image coding process according to Embodiment 2.

Next, the flow of the coding process as a whole will be described with reference to FIG. 18. FIG. 18 is a flowchart of the image coding process according to this embodiment.

The process illustrated in FIG. 18 adds steps S103 and S106 to the process illustrated in FIG. 8. Furthermore, the NAL type determining process (S102A) is different from that in FIG. 8.

First, the coding structure determining unit 101 determines the coding structure (S101).

Next, the NAL type determining unit 102A determines the NAL type of the current picture (S102A).

Next, the SEI determining unit 104 determines the SEI (S103).

Next, the coding unit 103A codes au_cpb_removal_delay_minus1 and pic_dpb_output_delay (S104), codes the NAL type (S105), codes the SEI (S106), codes the TemporalId (S107), codes the reference picture set (S108), and codes the current picture (S109), to generate the coded stream 124.

Then, the image coding apparatus 100A repeats the processes in steps S102A to S109 until the processing of all the pictures is completed (S110).

<Operation (Coding Structure Determining)>

The flow of the coding structure determining process is the same as in Embodiment 1 (FIG. 9), and thus description is omitted.

<Operation (NAL Type Determining>

Figure 19:
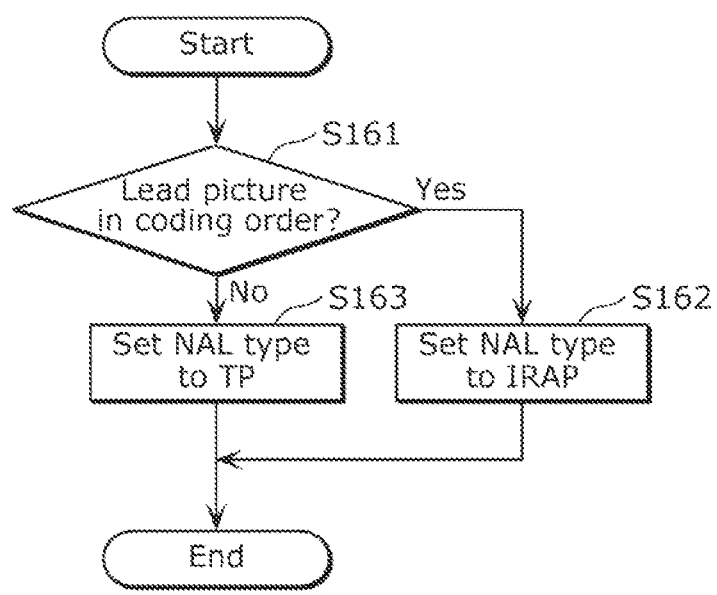
FIG. 19 is a flowchart of a NAL type determining process according to Embodiment 2.

Next, the flow of the NAL type determining process (step S102A in FIG. 18) will be described with reference to FIG. 19. FIG. 19 is a flowchart of a NAL type determining process according to this embodiment.

First, the NAL type determining unit 102A determines whether the current picture is the lead picture in coding order (S161). When the current picture is the lead picture in coding order (Yes in S161), the NAL type determining unit 102A sets the NAL type of the current picture to IRAP (S162). Otherwise (No in S161), the NAL type determining unit 102A sets the NAL type of the current picture to TP (S163).

<Operation (SEI Determining>

Figure 20:
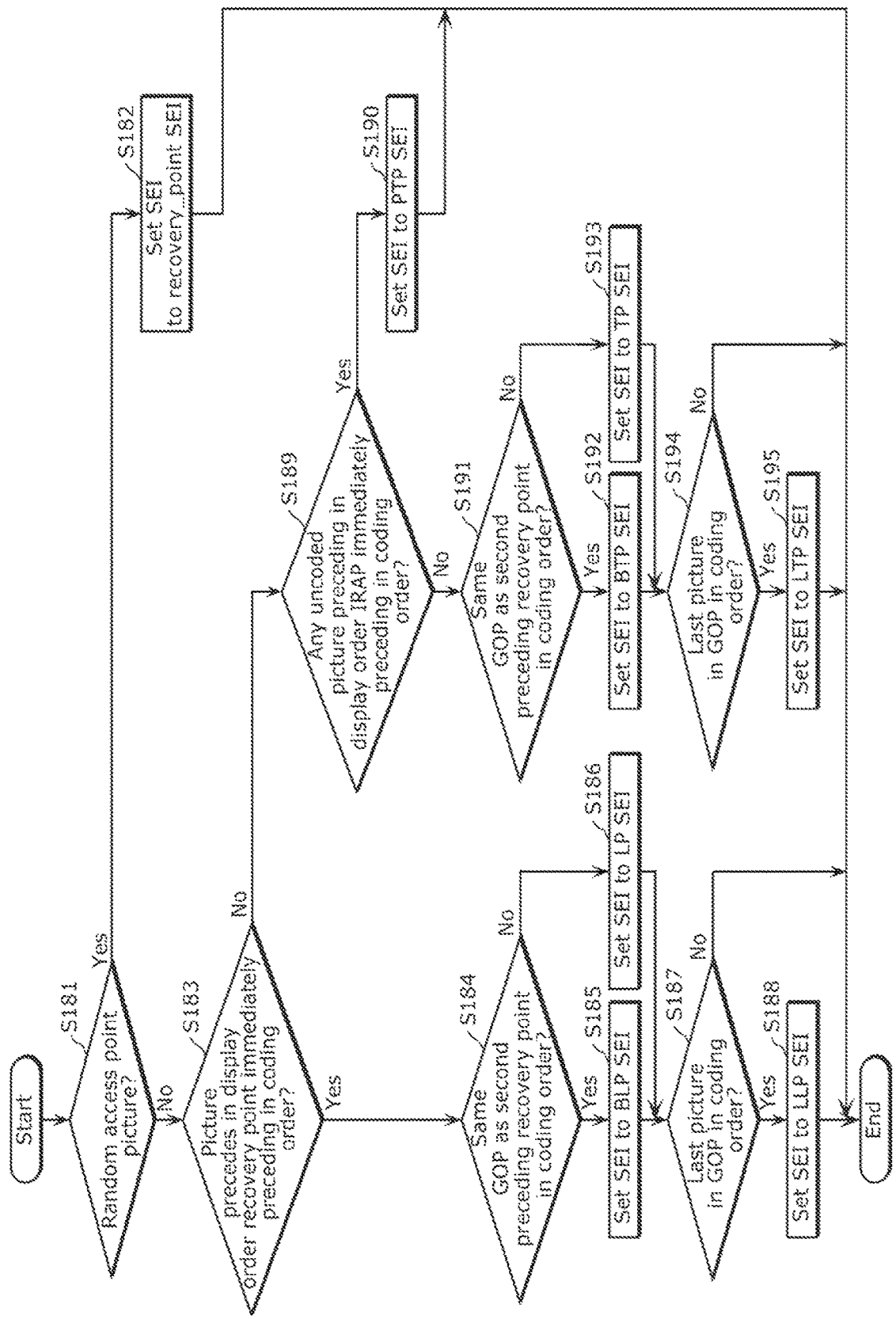
FIG. 20 is a flowchart of an SEI determining process according to Embodiment 2.

Next, the flow of the SEI determining process (step S103 in FIG. 18) will be described with reference to FIG. 20.

First, the SEI determining unit 104 determines whether the current picture is a random access point picture (S181). When the current picture is a random access point picture (Yes in S181), the SEI determining unit 104 sets the SEI of the current picture to recovery_point SEI (S182), and the process ends.

When the current picture is not a random access point picture (No in S181), the SEI determining unit 104 determines whether the current picture precedes in display order the recovery point immediately preceding in coding order (S183).

When the current picture precedes in display order the recovery point immediately preceding in coding order (Yes in S183), the SEI determining unit 104 determines whether the current picture is included in the same GOP as the second preceding recovery point in coding order (S184). When the current picture is included in the same GOP as the second preceding recovery point in coding order (Yes in S184), the SEI determining unit 104 sets the SEI of the current picture to BLP SEI (S185).

On the other hand, when the current picture is included in a GOP that is different from the GOP including the second preceding recovery point in coding order (No in S184), the SEI determining unit 104 sets the SEI of the current picture to LP SEI (S186).

Next, the SEI determining unit 104 determines whether the current picture is the last picture in the GOP in coding order (S187). When the current picture is the last picture in the GOP in coding order (Yes in S187), the SEI determining unit 104 sets the SEI of the current picture to LLP SEI (S188), and the process ends.

Furthermore, when the current picture follows in display order the recovery point immediately preceding in coding order (No in S183), the SEI determining unit 104 determines whether there is an uncoded picture preceding the IRAP immediately preceding in coding order (S189). When there is an uncoded picture preceding the IRAP immediately preceding in coding order (Yes in S189), the SEI determining unit 104 sets the SEI of the current picture to PTP SEI (S190), and the process ends.

When there is no uncoded picture preceding the IRAP immediately preceding in coding order (NO in S189), the SEI determining unit 104 determines whether the current picture is included in the same GOP as the second preceding recovery point in coding order (S191). When the current picture is included in the same GOP as the second preceding recovery point in coding order (Yes in S191), the SEI determining unit 104 sets the SEI of the current picture to BTP SEI (S192). When the current picture is included in a GOP that is different from the GOP including the second preceding recovery point in coding order (No in S191), the SEI determining unit 104 sets the SEI of the current picture to TP SEI Next, the SEI determining unit 104 determines whether the current picture is the last picture in the GOP in coding order (S194). When the current picture is the last picture in the GOP in coding order (Yes in S194), the SEI determining unit 104 sets the SEI of the current picture to LTP SEI (S195), and the process ends.

Figure 21B:
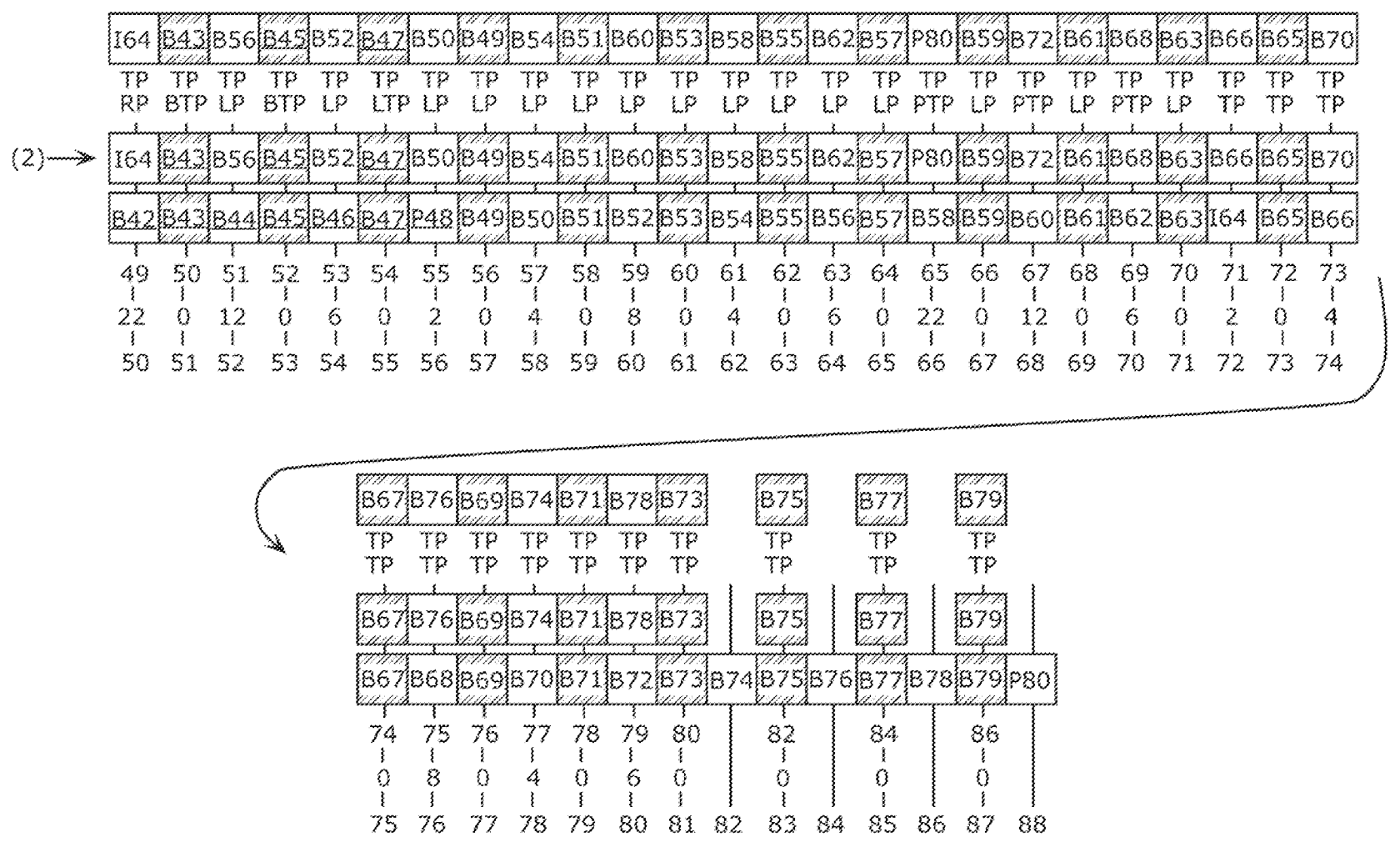
Figure 22:
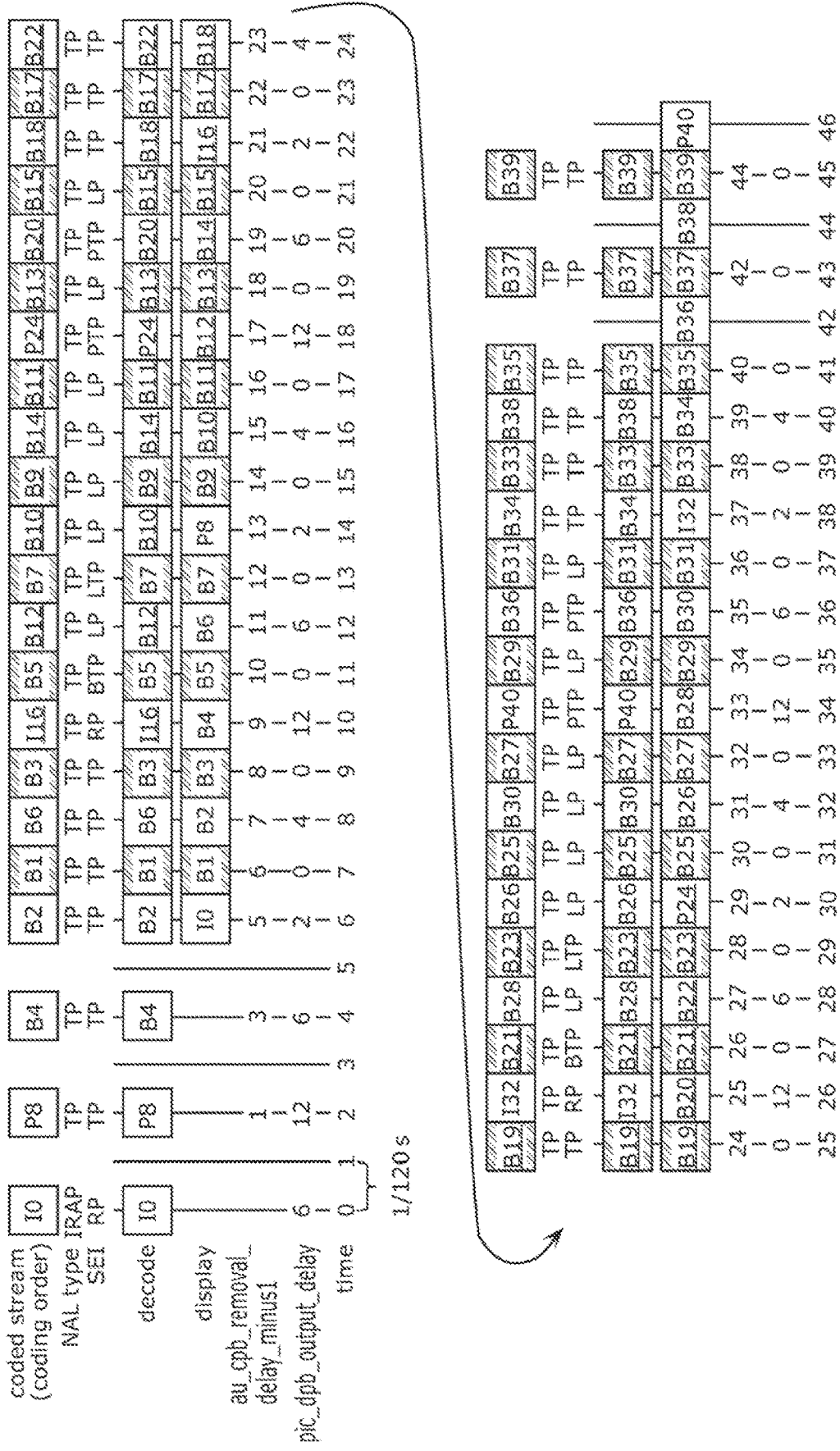
FIG. 22 is a diagram illustrating an example of a coded stream according to Embodiment 2.
Figure 23:
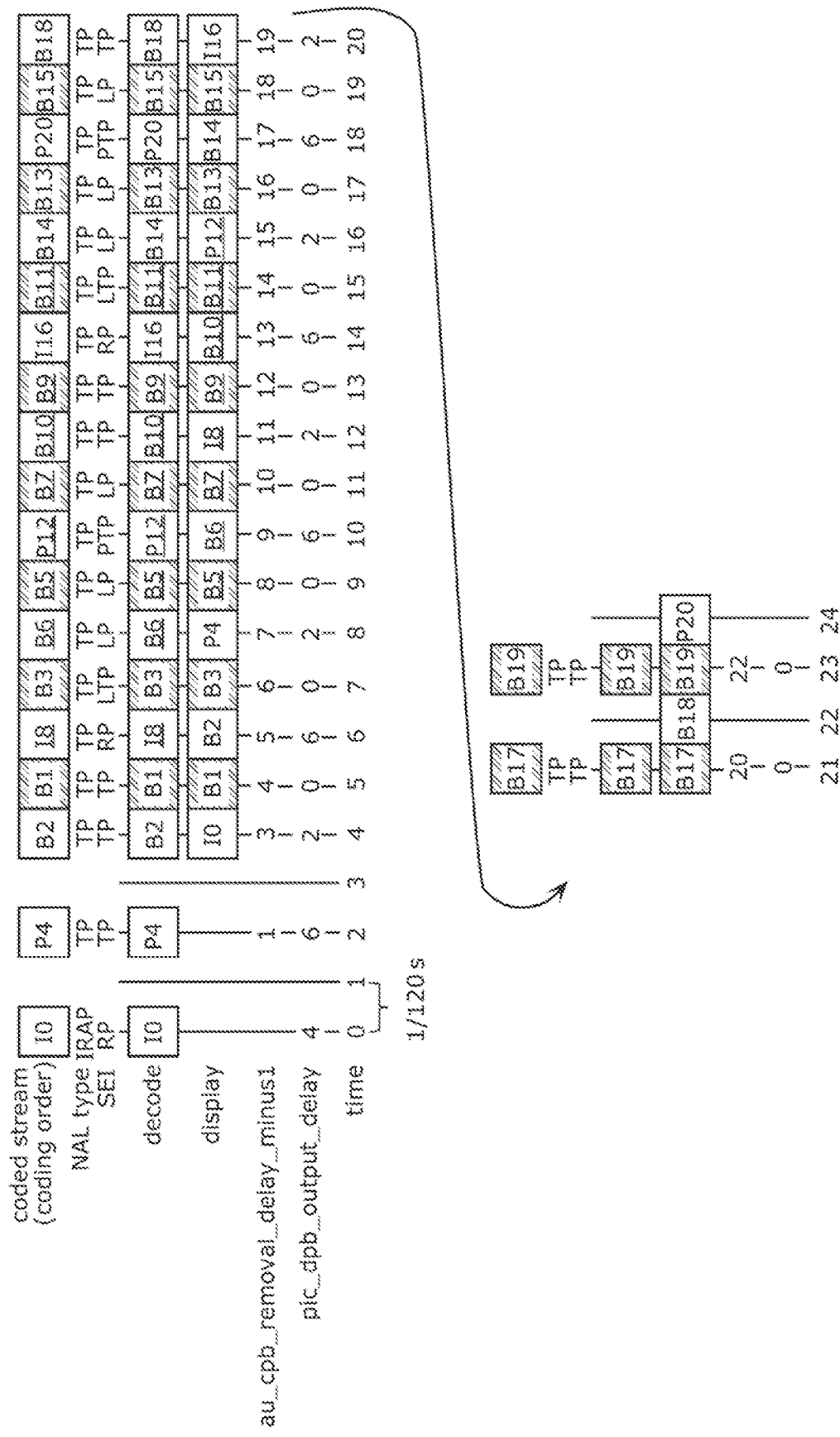
FIG. 23 is a diagram illustrating an example of a coded stream according to Embodiment 2.

With the process described above, coded streams such as those illustrated in FIG. 21A, FIG. 21B, FIG. 22, and FIG. 23 are generated. FIG. 21A and FIG. 21B illustrate an example of a case where the largest TemporalId is 4, FIG. 22 illustrates an example of a case where the largest TemporalId is 3, and FIG. 23 illustrates an example of a case where the largest TemporalId is 2.

The meaning of each SEI is as described below. RP SEI means a picture that only contains random accessible I-slices. LP SEI means a picture preceding an RP in display order. TP SEI means a picture following an RP in display order. BLP SEI means an LP picture included in the same GOP as the second preceding RP in coding order. BTP SEI means a TP picture included in the same GOP as the second preceding RP in coding order. LLP SEI means an LP picture which is the last picture in a GOP in coding order. LTP SEI means a TP picture which is the last picture in a GOP in coding order. PTP SEI means a TP picture that is still followed by an LP picture in coding order.

Furthermore, specific examples of the reference picture set is the same as in Embodiment 1 (FIG. 14, FIG. 15, and FIG. 16), and thus description is omitted.

Advantageous Effect

As described above, according to this embodiment, it is possible to lower the display frame rate and display video even in a system that does not have the capacity to allow decoding at the maximum frame rate of a coded stream.

Furthermore, in the HEVC standard (NPL 1), it is prohibited for a TP to be coded ahead of an LP. In this embodiment, an IRAP is not present midway through the stream of pictures, and thus a situation in which a TP is coded ahead of an LP does not arise. Furthermore, since Recovery_point SEI is used instead of an IRAP in midstream, random access can be realized. In other words, random access and temporal scalability are realized while conforming to the HEVC standard.

In this manner, the image coding apparatus 100A according to this embodiment can realize the same advantageous effect as the image coding apparatus 100 according to Embodiment 1.

Embodiment 3

<Overall Configuration>

The configuration of the image coding apparatus 100 according to this embodiment is the same as in Embodiment 1 (FIG. 7), and thus description is omitted.

<Operation (as a Whole)>

The flow of the coding process as a whole is the same as in Embodiment 1 (FIG. 8), and thus description is omitted.

<Operation (Coding Structure Determining)>

Figure 24:
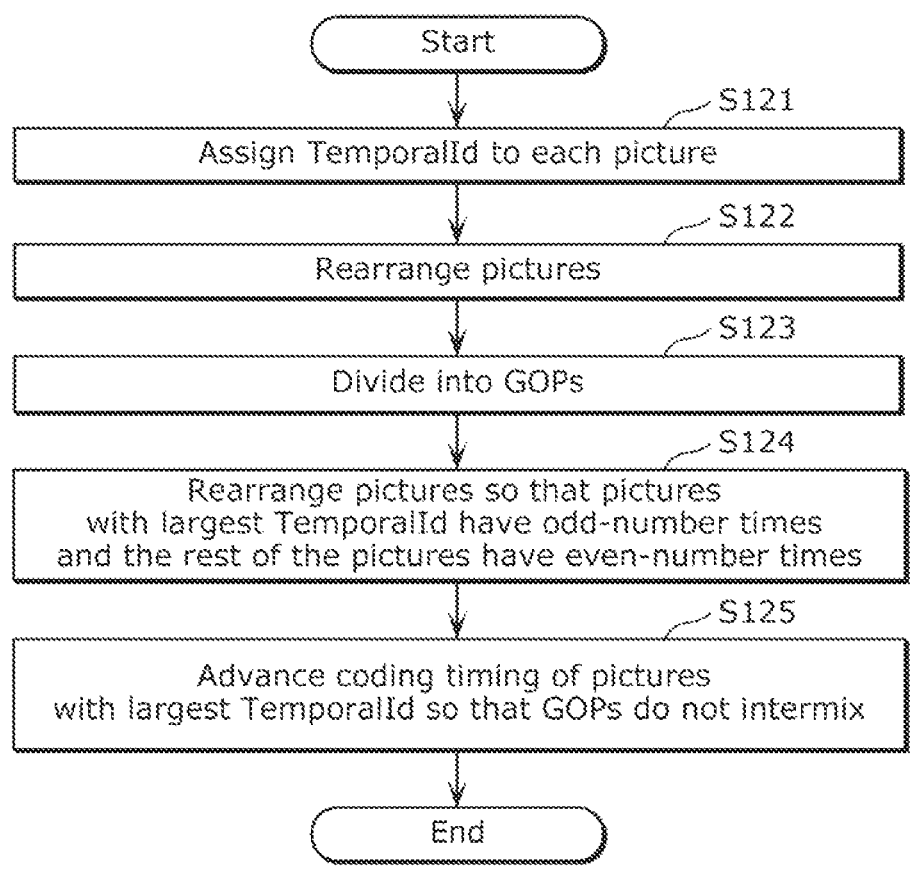
FIG. 24 is a flowchart of a coding structure determining process according to Embodiment 3.

Next, the flow of the coding structure determining process (step S101 in FIG. 8) will be described with reference to FIG. 24. FIG. 24 is a flowchart of a coding structure determining process according to this embodiment.

The process illustrated in FIG. 24 adds step S125 to the process illustrated in FIG. 9 described in Embodiment 1. Furthermore, steps S121 to S124 are the same as in Embodiment 1, and thus description is omitted.

Figure 25A:
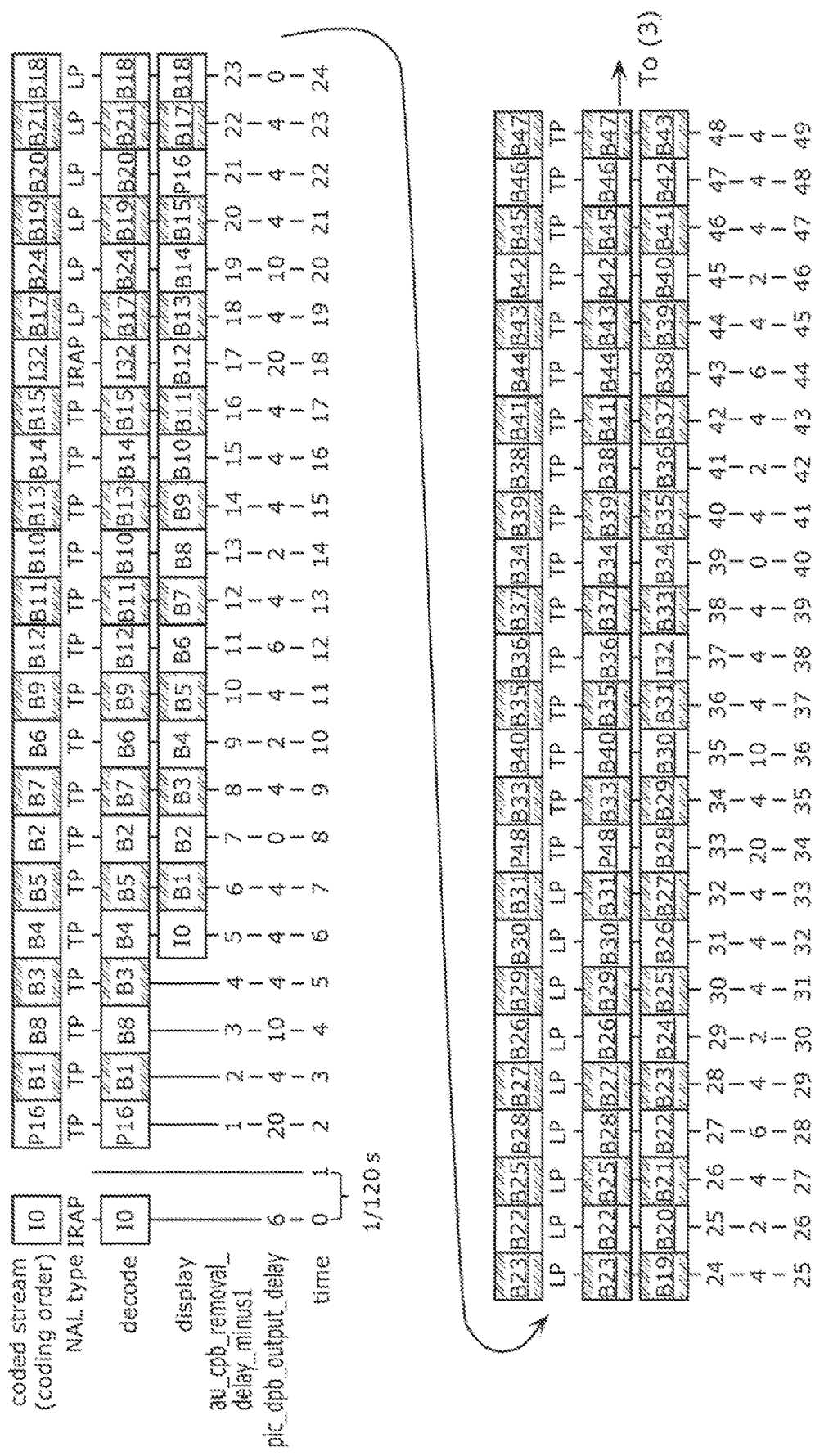
FIG. 25A is a diagram illustrating an example of a coded stream according to Embodiment 3.
Figure 25B:
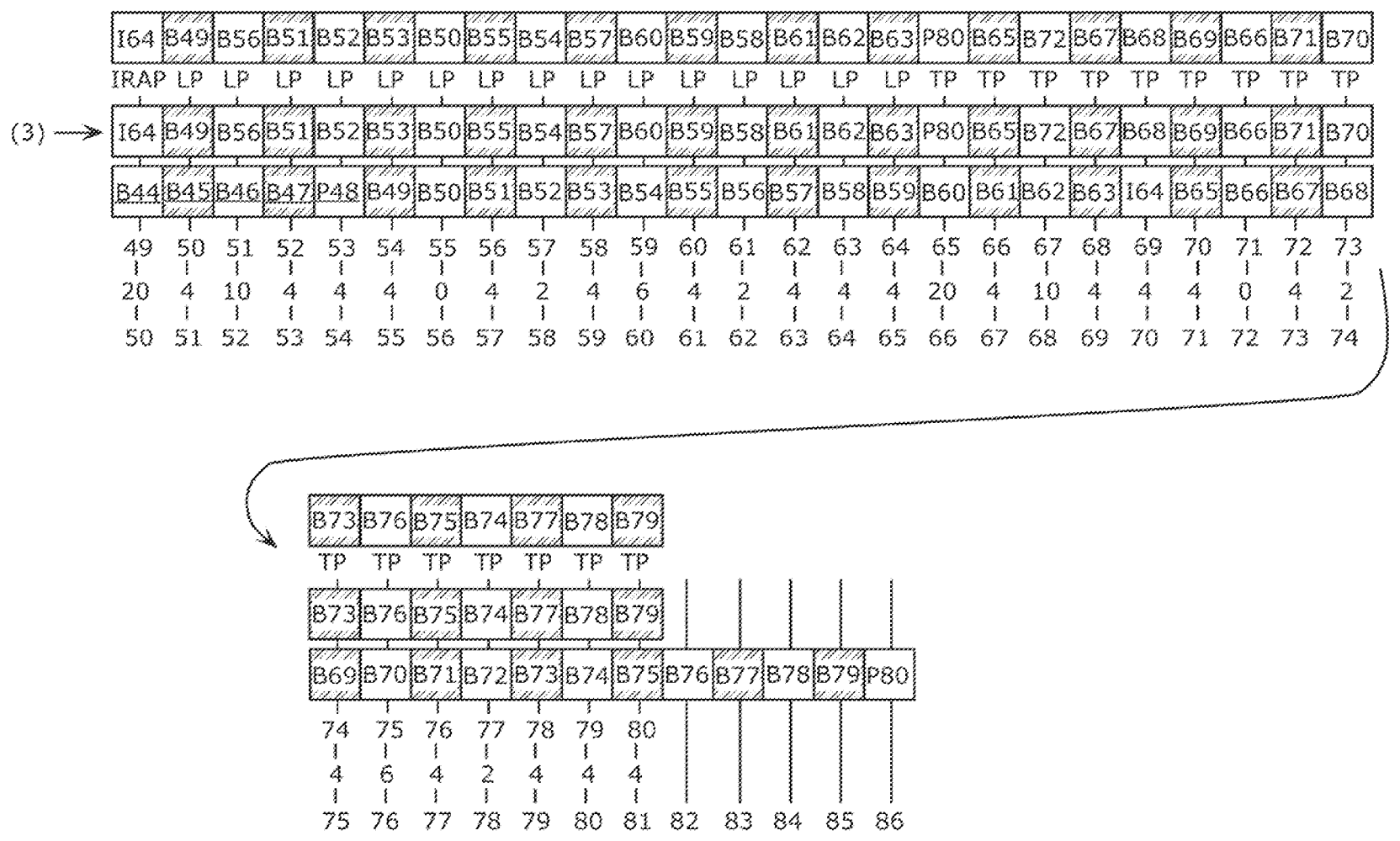
Figure 26:
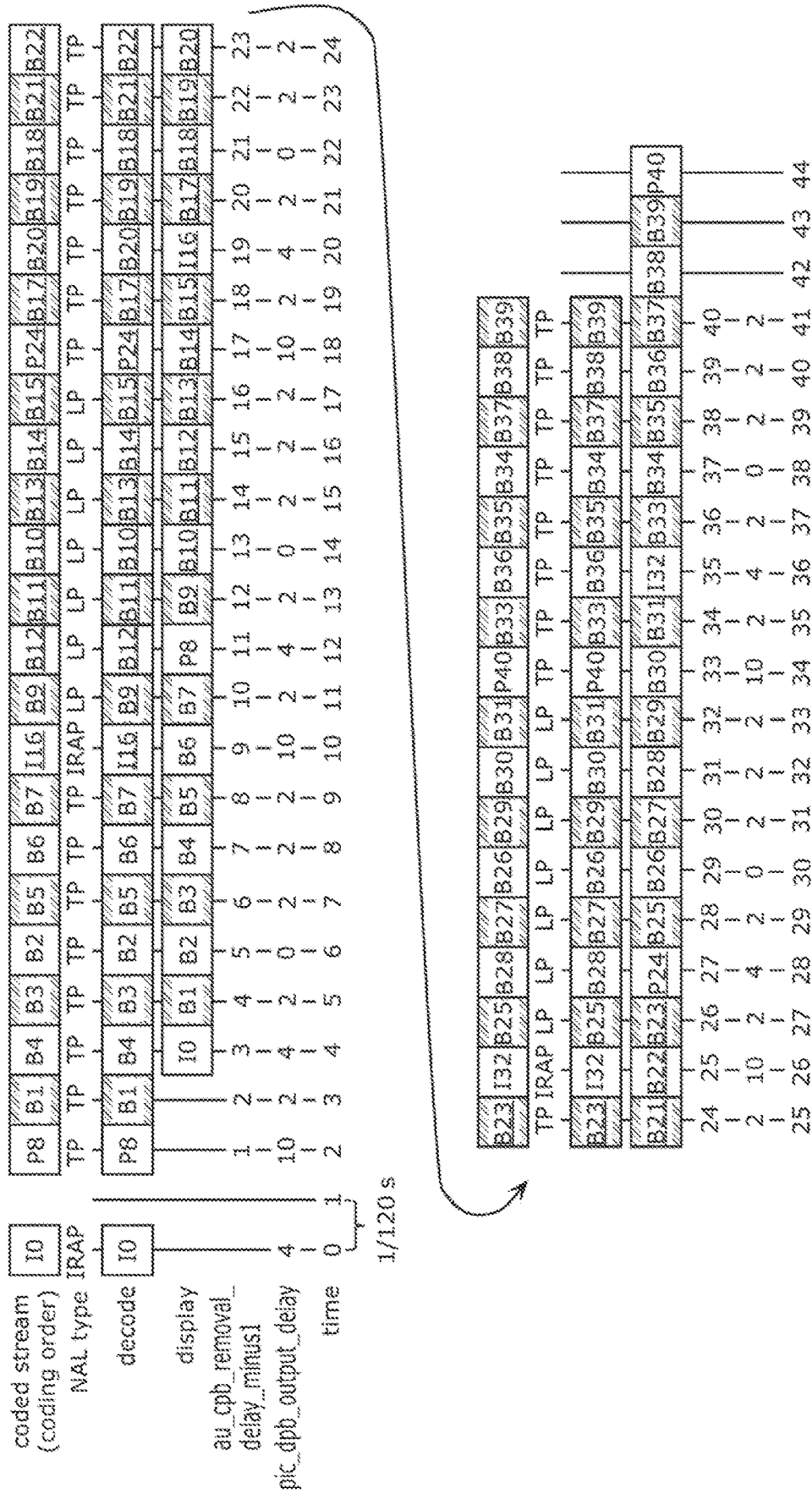
FIG. 26 is a diagram illustrating an example of a coded stream according to Embodiment 3.
Figure 27:
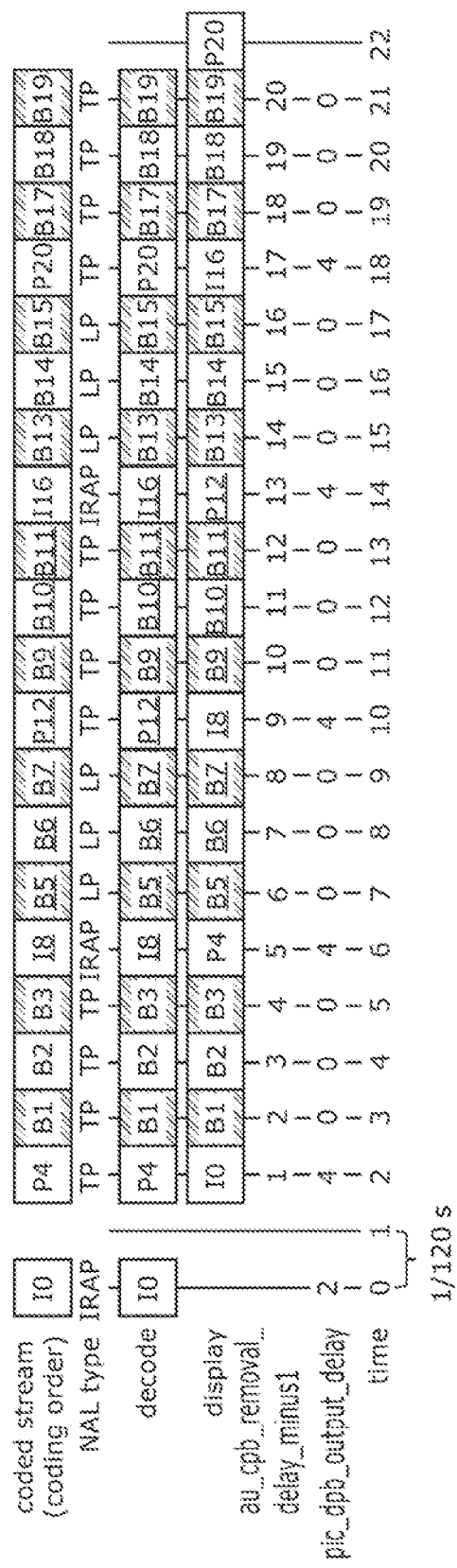
FIG. 27 is a diagram illustrating an example of a coded stream according to Embodiment 3.

After the coding structure determining unit 101 rearranges the pictures so that pictures with the largest TemporalId have odd-number times and the rest of the pictures have even-number times (after S124), the coding structure determining unit 101 advances the timing for coding the pictures with the largest TemporalId, as illustrated in FIG. 25A, FIG. 25B, FIG. 26, and FIG. 27 so that pictures of different GOPs do not intermix (S125). FIG. 25A and FIG. 25B illustrate an example of a case where the largest TemporalId is 4, FIG. 26 illustrates an example of a case where the largest TemporalId is 3, and FIG. 27 illustrates an example of a case where the largest TemporalId is 2.

For example, in the example illustrated in FIG. 25A and FIG. 25B, the pictures with diagonal line shading have been moved forward by six time units compared to FIG. 10A and FIG. 10B. By doing so, the pictures from an IRAP to the next IRAP are arranged in one cluster. In other words, the pictures are arranged consecutively on a GOP basis. Stated differently, pictures included in different GOPs do not intermix.

<Operation (NAL Type Determining>

Figure 28:
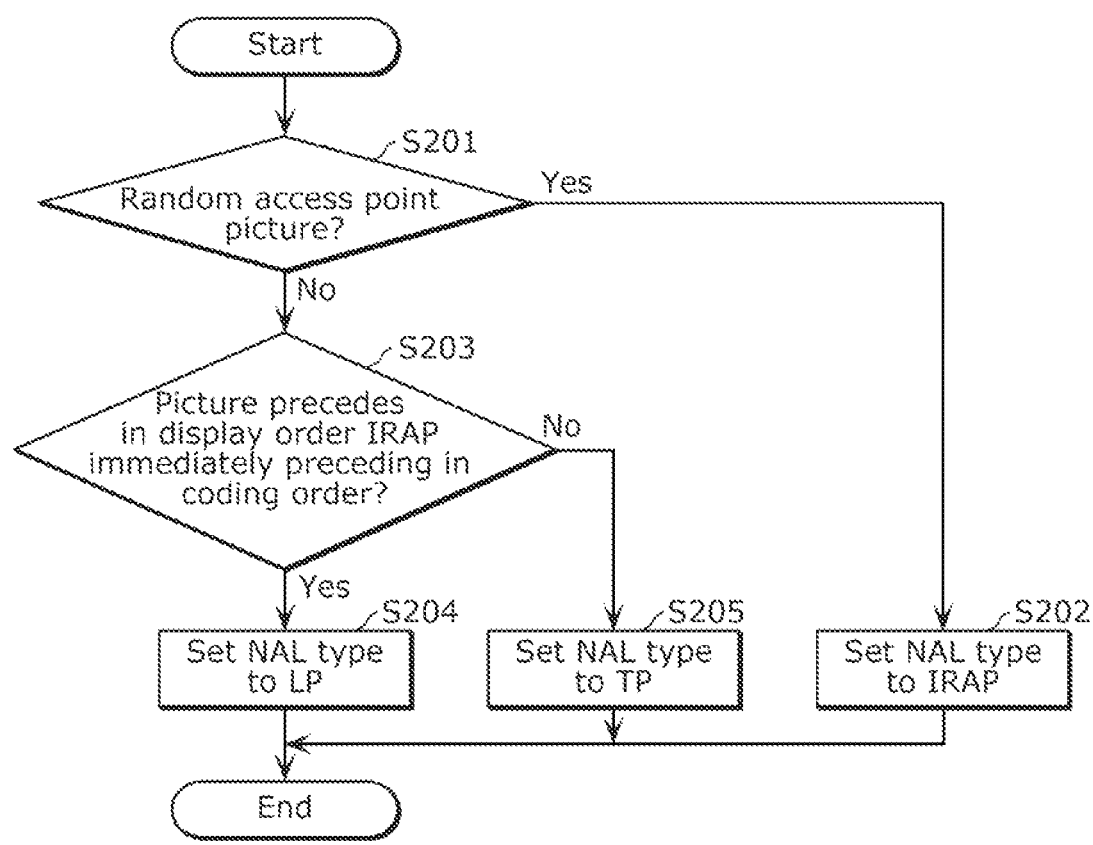
FIG. 28 is a flowchart of a NAL type determining process according to Embodiment 3.

Next, the flow of the NAL type determining process (S102 in FIG. 8) will be described with reference to FIG. 28. FIG. 28 is a flowchart of a NAL type determining process according to this embodiment.

First, the NAL type determining unit 102 determines whether the current picture is a random access point picture (S201). When the current picture is a random access point picture (Yes in S201), the NAL type determining unit 102 sets the NAL type of the current picture to IRAP (S202).

When the current picture is not a random access point picture (No in S201), the NAL type determining unit 102 determines whether the current picture precedes in display order the IRAP immediately preceding in coding order (S203). When the current picture precedes in display order the IRAP immediately preceding in coding order (Yes in S203), the NAL type determining unit 102 sets the NAL type of the current picture to LP (S204). Otherwise (No in S203), the NAL type determining unit 102 sets the NAL type of the current picture to TP (S205).

With the process described above, coded streams such as those illustrated in FIG. 25A, FIG. 25B, FIG. 26, and FIG. 27 are generated.

Examples of reference picture sets according to this embodiment are illustrated in FIG. 29, FIG. 30, and FIG. 31. It should be noted that the examples illustrated in FIG. 29, FIG. 30, and FIG. 31 are examples for the case where the largest TemporalId is 4.

FIG. 29 illustrates a set that prioritizes compression rate, and is a set in which coded pictures are referred to whenever possible. FIG. 30 illustrates a set that enables reduction in the frame memory size to be used, and is a set in which preceding and subsequent pictures near the current picture in display order are referred to. Furthermore, in order to facilitate random accessing, this set is set so that only a picture included in the same GOP as the current picture is referred to.

FIG. 31 illustrates a set that has balance between compression ratio and memory size, and is a set in which a picture with TemporalId0 having small coding error is referred to, or a preceding or subsequent picture near the current picture in display order is referred to. Furthermore, in order to facilitate random access, this set is set so that only a picture included in the same GOP as the current picture is referred to. Furthermore, in this set, referring to a picture with the same TemporalId is prohibited, in the same manner as a TSA picture in HEVC (NPL 1), to allow switching of the reproduction frame rate midway through a coded stream.

Figure 32:
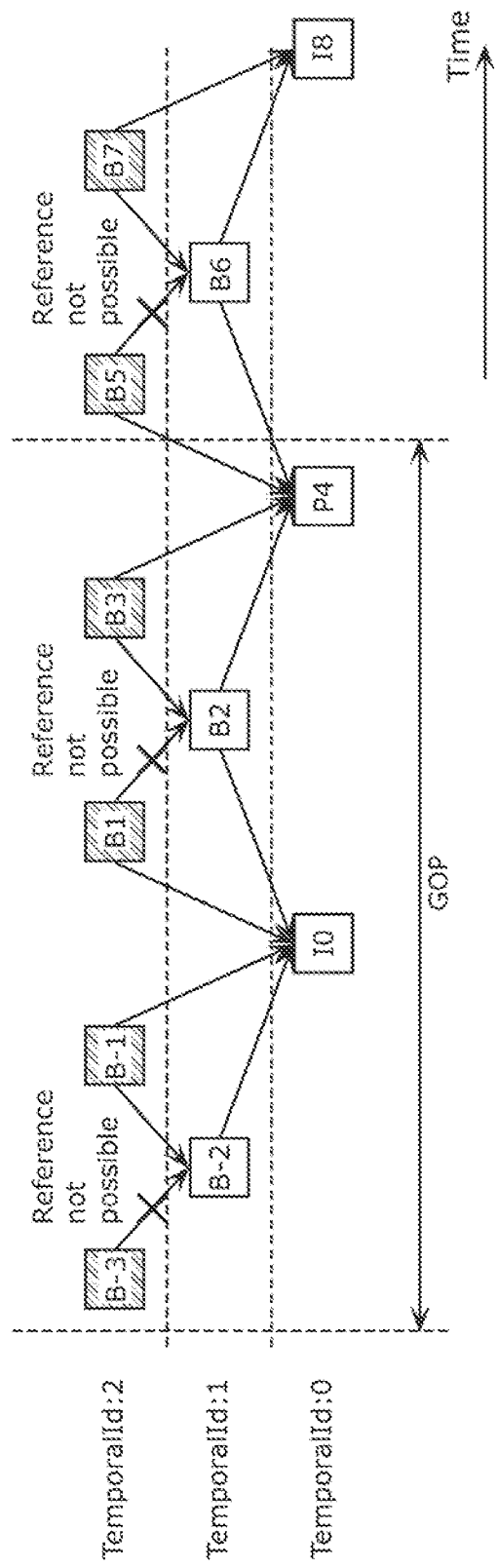
FIG. 32 is a diagram illustrating an example of a coding structure according to Embodiment 3.

FIG. 32 is a diagram illustrating an example of a coding structure according to this embodiment. It should be noted that FIG. 32 illustrates an example for the case where the largest TemporalId is 2. Furthermore, the time in the figure indicates the display order. In this embodiment, the timing for coding the pictures with the largest TemporalId is accelerated, and thus the pictures with the largest TemporalId are prohibited from referring to some pictures. Specifically, a highest-layer picture with the largest TemporalId is coded without reference to a picture which is immediately following in display order and is one layer lower. For example, as illustrated in FIG. 32, B1 is prohibited from referring to B2.

Furthermore, as illustrated in FIG. 32, a highest-layer picture (for example, B7) immediately preceding in display order a picture belonging to the lowest layer can refer to a picture (for example, B6) which is immediately preceding in display order and is one layer lower. Stated differently, a picture (for example, B5) which does not immediately precede in display order a picture belonging to the lowest layer is coded without reference to a picture which is immediately preceding in display order and is one layer lower.

As described earlier, in this embodiment, image coding apparatus 100 selects one from among the three sets according to the reference picture set identifier 123 inputted from the outside, and codes the selected set. Furthermore, in this embodiment, the timing for coding (timing for decoding) pictures with the largest TemporalId is accelerated. As such, there are fewer coded (decoded) pictures at the time of the coding (decoding) of the pictures with the largest TemporalId, and thus there are fewer reference pictures that can be used by the pictures with the largest TemporalId.

Advantageous Effect

As described above, according to this embodiment, it is possible to lower the display frame rate and display video even in a system that does not have the capacity to allow decoding at the maximum frame rate of a coded stream.

Furthermore, since a TP is prohibited from referring to an LP, and an LP is not coded until the next IRAP after the coding of a TP, the image coding apparatus 100 or the image decoding apparatus can delete an LP picture from the reference frame memory at the time of coding or decoding. By doing so, the size of the reference frame memory can be reduced.

Furthermore, since pictures included in different GOPs do not intermix, the image decoding apparatus can easily extract the GOPs from the coded stream when performing trick play, etc.

Furthermore, accelerating the timing for coding the pictures with the largest TemporalId reduces delay from the start of decoding to displaying. Description will be carried out by comparing FIG. 10A and FIG. 10B with FIG. 25A and FIG. 25B. The displaying of I0 starts from time 8 in FIG. 10A and FIG. 10B, whereas displaying is started at time 6 in FIG. 25A and FIG. 25B (this embodiment). In this manner, in this embodiment, the display start time is accelerated. Accordingly, since the time from when decoding is instructed by the user to when displaying is started can be shortened, a system having a fast response can be constructed.

In this manner, by accelerating the timing for coding the pictures with the highest TemporalId, avoidance of GOP intermixing and reduction of delays can be realized. On the other hand, because the timing for coding the pictures with the largest TemporalId is accelerated, there are fewer reference pictures that can be used by the pictures with the largest TemporalId. Accordingly, there is concern over the deterioration of coding efficiency. However, a picture with a TemporalId other than the largest TemporalId does not refer to a picture with the largest TemporalId. In other words, the frequency at which a picture with the largest TemporalId is referred to by another pictures is low. Therefore, even if the picture quality of pictures with the largest TemporalId deteriorates, the error does not spread to other pictures. As such, even if there are fewer reference pictures with the largest TemporalId, there is little deterioration in overall coding efficiency. In other words, in this embodiment, intermixing of GOPs can be avoided while suppressing coding efficiency deterioration.

In this manner, the image coding apparatus 100 according to the present embodiment hierarchically codes the plurality of pictures to generate a bitstream (coded stream 124). The image coding apparatus 100 codes each picture of the plurality of pictures, which belongs to any one of a plurality of layers, with reference to a picture belonging to a layer that is the same as or lower than the layer to which the picture belongs, and without reference to a picture belonging to a layer that is higher than the layer to which the picture belongs. The image coding apparatus 100 codes the coded pictures and time information (au_cpb_removal_delay_minus1) indicating the decoding times of the coded pictures, to generate a bitstream (coded stream 124). The time information indicates that the decoding times of low-layer pictures other than highest-layer pictures belonging to the highest hierarchical layer, among the plurality of pictures, are set at equal intervals. Stated differently, the image coding apparatus 100 codes highest-layer pictures and low-layer pictures in an alternating manner.

For example, the frame rate of the low-layer pictures is half the frame rate of the plurality of pictures. For example, the frame rate of the low-layer pictures is 60 fps, and the frame rate of the plurality of pictures is 120 fps.

Accordingly, the image coding apparatus 100 can generate a coded bitstream in which the decoding times of the low-layer pictures other than highest-layer pictures belonging to the highest hierarchical layer are set at equal intervals. Therefore, when the frame rate of the pictures in all layers is 120 fps and the frame rate of low-layer pictures is 60 fps for example, the low-layer pictures can be decoded by an image decoding apparatus having a 60-fps decoding capacity. In this manner, the image coding apparatus 100 can generate a coded bitstream that can be decoded efficiently by the image decoding apparatus.

In addition, time information (au_cpb_removal_delay_minus1) indicates that the decoding time of a picture preceding a random accessible I-picture in display order is ahead of the decoding time of a picture following the I-picture in display order. With this, the capacity of the reference frame memory of the image decoding apparatus can be reduced.

Furthermore, the plurality of pictures are included in any one of a plurality of groups of pictures (GOPs) each of which includes at least one I-picture and pictures which are consecutive in display order. The decoding times of the plurality of pictures are set so that pictures included in each group of pictures are decoded consecutively, without the intervention of the decoding of a picture included in another group of pictures. With this, the image coding apparatus 100 can generate a coded bitstream that can be coded by an image decoding apparatus without performing a special process.

Embodiment 4

<Overall Configuration>

The configuration of the image coding apparatus 100 according to this embodiment is the same as in Embodiment 1 (FIG. 7), and thus description is omitted.

<Operation (as a Whole)>

The flow of the coding process as a whole is the same as in Embodiment 1 (FIG. 8), and thus description is omitted.

<Operation (Coding Structure Determining)>

Figure 33:
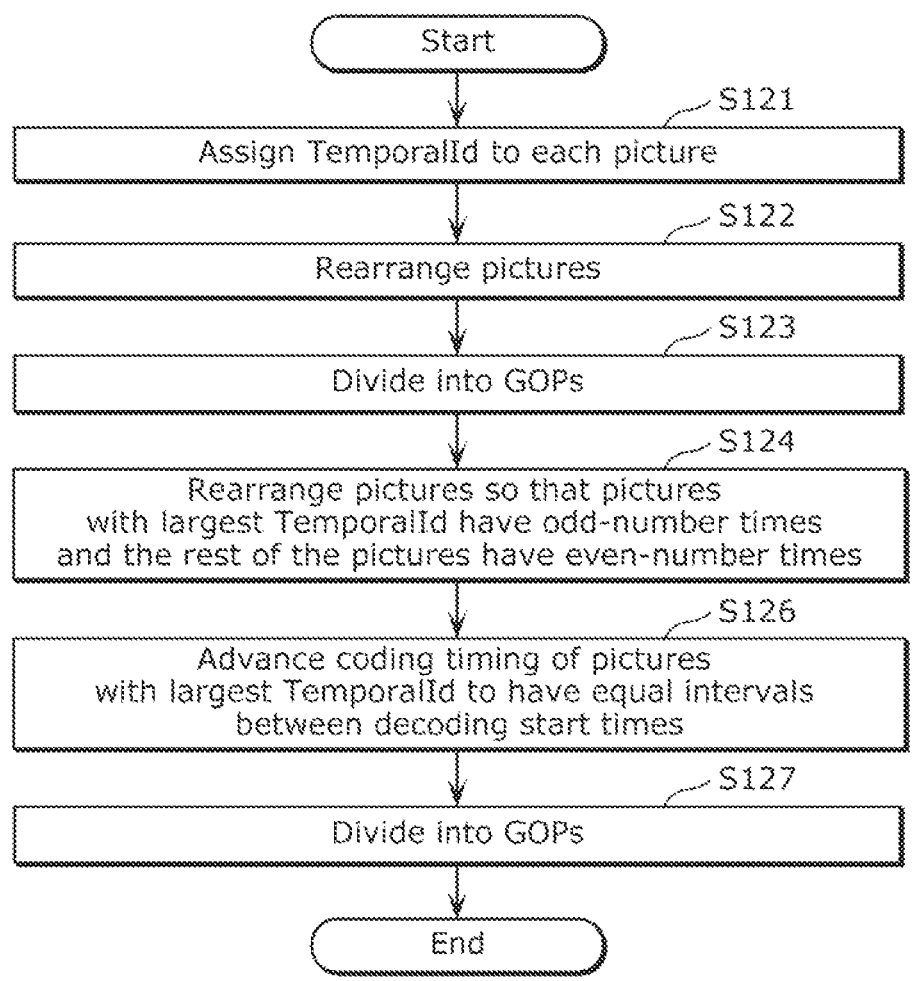
FIG. 33 is a flowchart of a coding structure determining process according to Embodiment 4.

Next, the flow of the coding structure determining process (step S101 in FIG. 8) will be described with reference to FIG. 33. FIG. 33 is a flowchart of a coding structure determining process according to this embodiment.

The process illustrated in FIG. 33 adds step S126 and S127 to the process illustrated in FIG. 9 described in Embodiment 1. Furthermore, steps S121 to S124 are the same as in Embodiment 1, and thus description is omitted.

Figure 34A:
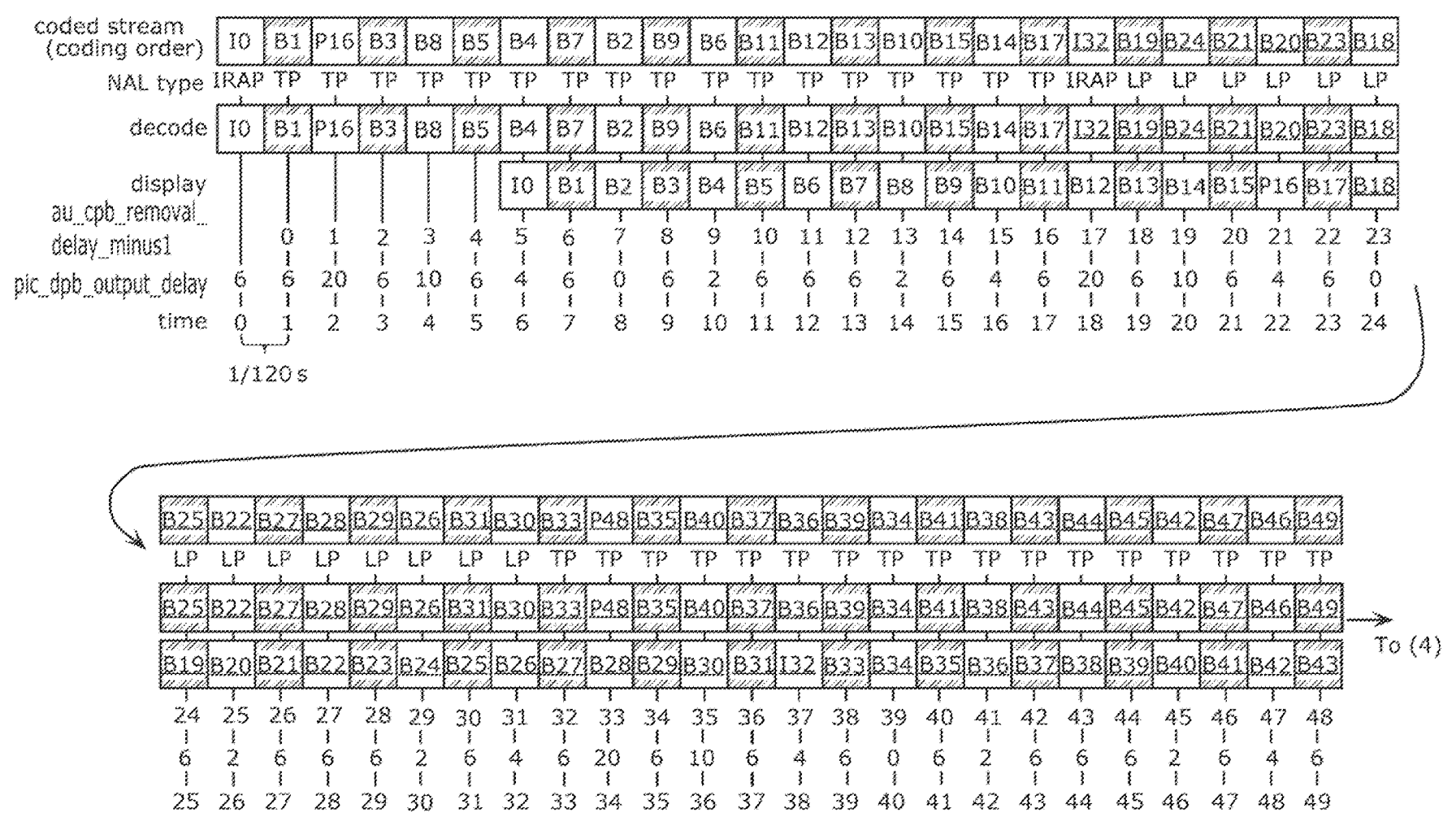
Figure 34B:
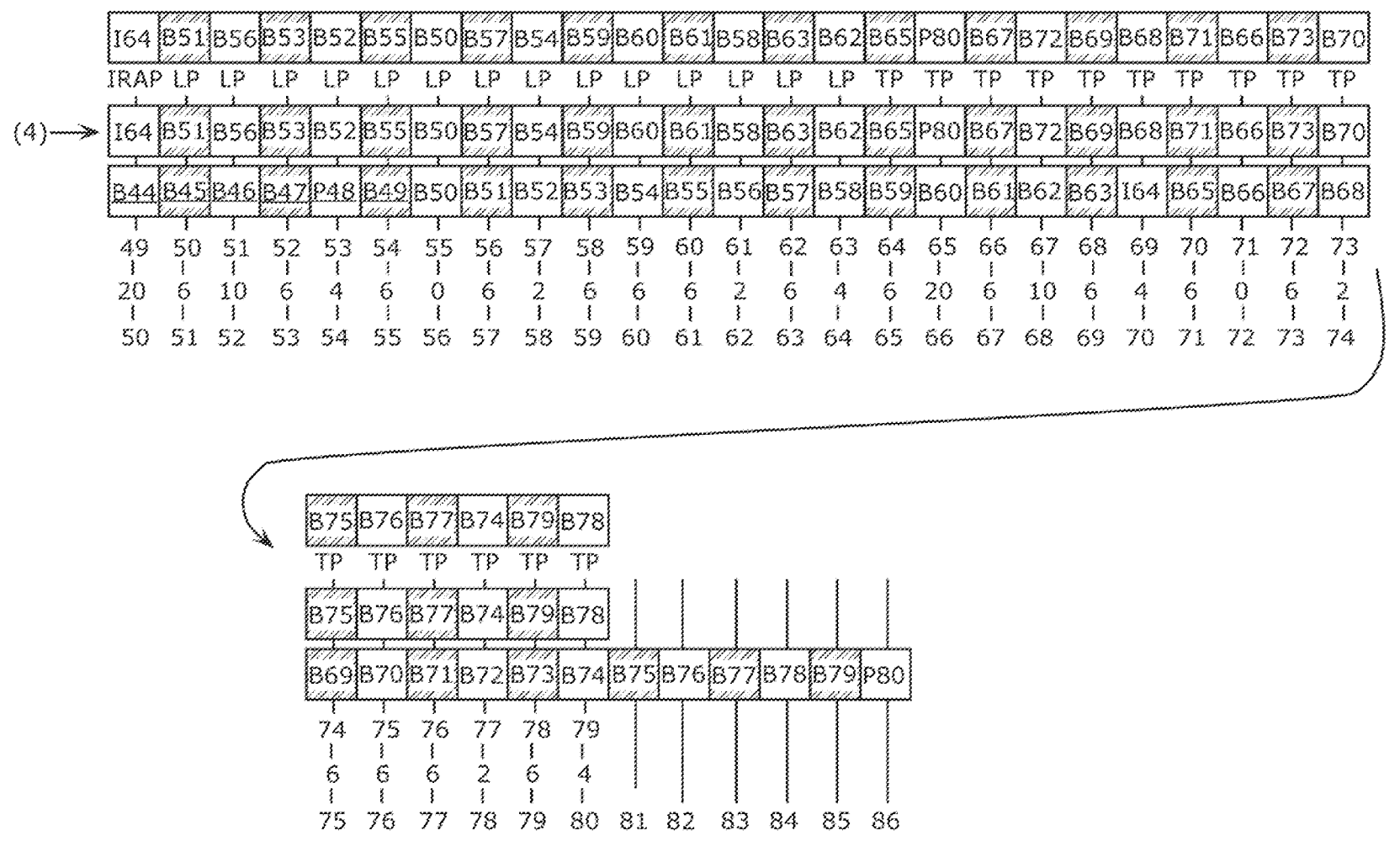
Figure 35:
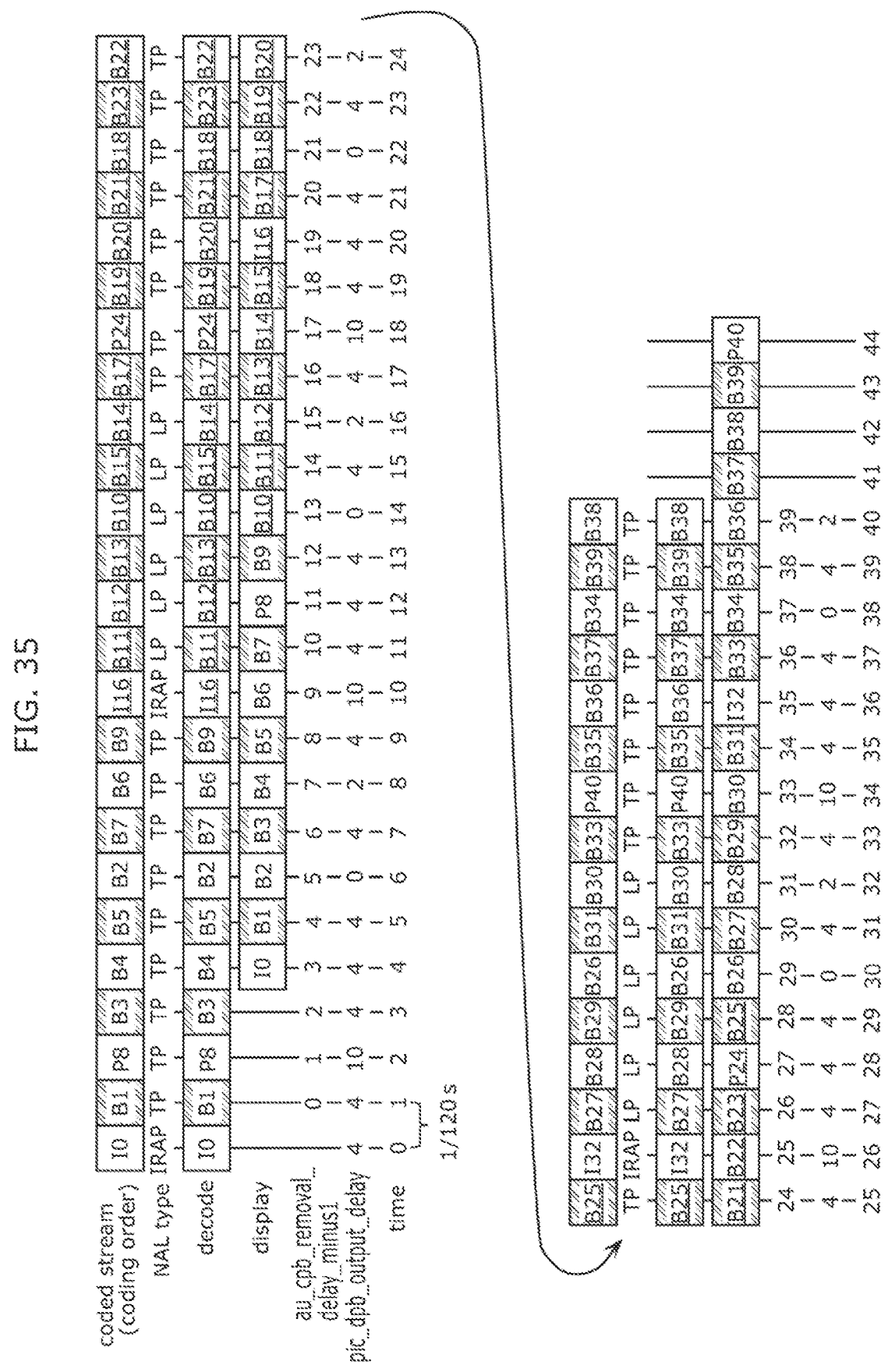
Figure 36:
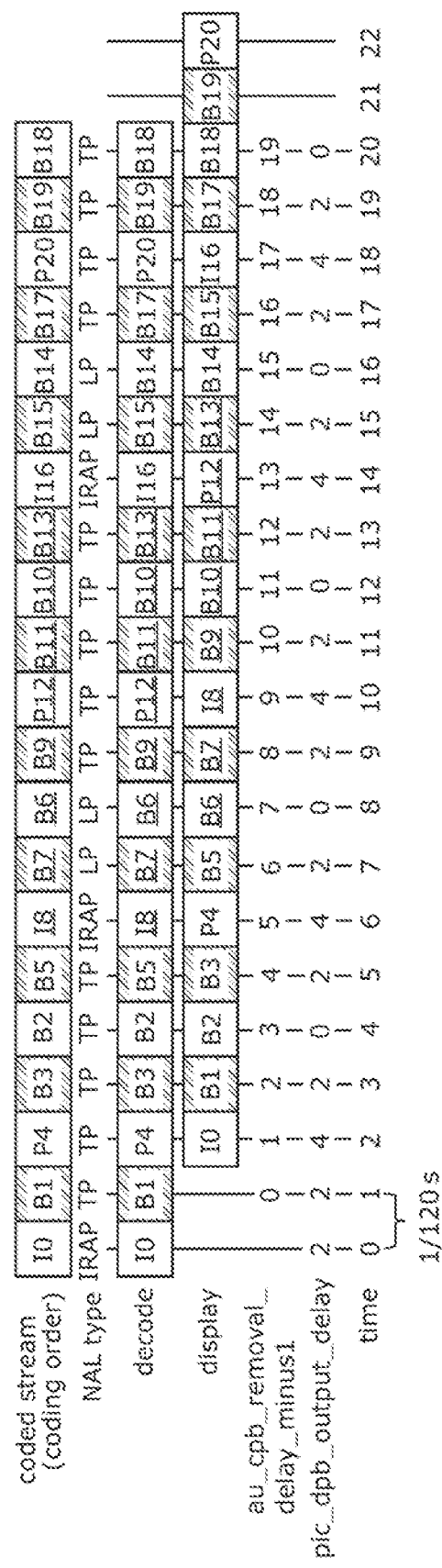
FIG. 36 is a diagram illustrating an example of a coded stream according to Embodiment 4.

After the coding structure determining unit 101 rearranges the pictures so that pictures with the largest TemporalId have odd-number times and the rest of the pictures have even-number times (after S124), the coding structure determining unit 101 advances the timing for coding the pictures with the largest TemporalId, as illustrated in FIG. 34A, FIG. 34B, FIG. 35, and FIG. 36, to have equal intervals between decoding start times (S126). FIG. 34A and FIG. 34B illustrate an example of a case where the largest TemporalId is 4, FIG. 35 illustrates an example of a case where the largest TemporalId is 3, and FIG. 36 illustrates an example of a case where the largest TemporalId is 2.

For example, in the example illustrated in FIG. 34A and FIG. 34B, the pictures with diagonal line shading have been moved forward by eight time units compared to FIG. 10A and FIG. 10B. Accordingly, the gap between pictures is eliminated, and when the image decoding apparatus reproduces the coded stream at the maximum frame rate, one picture is decoded in one time unit.

Next, the coding structure determining unit 101 divides the plurality of pictures into groups so that the pictures from a random access point to the next random access point are included in the same GOP, in the same manner as in step S123 (S127). For example, in the example illustrated in FIG. 34A and FIG. 34B, B17, which is included in the same GOP as I32 in Embodiment 1, is included in the same GOP as I0 due to this process.

<Operation (NAL Type Determining)>

The flow of the NAL type determining process is the same as in Embodiment 3 (FIG. 28), and thus description is omitted.

With the process described above, coded streams such as those illustrated in FIG. 34A, FIG. 34B, FIG. 35, and FIG. 36 are generated.

Examples of reference picture sets according to this embodiment are illustrated in FIG. 37, FIG. 38, and FIG. 39. It should be noted that the examples illustrated in FIG. 37, FIG. 38, and FIG. 39 are examples for the case where the largest TemporalId is 4.

FIG. 37 illustrates a set that prioritizes compression rate, and is a set in which coded pictures are referred to whenever possible. FIG. 38 illustrates a set that enables reduction in the frame memory size to be used, and is a set in which preceding and subsequent pictures near the current picture in display order are referred to. Furthermore, in order to facilitate random accessing, this set is set so that only a picture included in the same GOP as the current picture is referred to.

FIG. 39 illustrates a set that has balance between compression ratio and memory size, and is a set in which a picture with TemporalId0 having small coding error is referred to, or a preceding or subsequent picture near the current picture in display order is referred to. Furthermore, in order to facilitate random access, this set is set so that only a picture included in the same GOP as the current picture is referred to. Furthermore, in this set, referring to a picture with the same TemporalId is prohibited, in the same manner as a TSA picture in HEVC (NPL 1), to allow switching of the reproduction frame rate midway through a coded stream.

As described earlier, in this embodiment, image coding apparatus 100 selects one from among the three sets according to the reference picture set identifier 123 inputted from the outside, and codes the selected set. Furthermore, the timing for coding (timing for decoding) pictures with the largest TemporalId is accelerated further than in the examples in Embodiment 1 and Embodiment 3. As such, there are fewer coded (decoded) pictures at the time of the coding (decoding) of the pictures with the largest TemporalId, and thus there are fewer reference pictures that can be used by the pictures with the largest TemporalId.

Advantageous Effect

As described above, according to this embodiment, it is possible to lower the display frame rate and display video even in a system that does not have the capacity to allow decoding at the maximum frame rate of a coded stream.

Furthermore, since a TP is prohibited from referring to an LP, and an LP is not coded until the next IRAP after the coding of a TP, the image coding apparatus 100 or the image decoding apparatus can delete an LP picture from the reference frame memory at the time of coding or decoding. By doing so, the size of the reference frame memory can be reduced.

Furthermore, since pictures included in different GOPs do not intermix, the image decoding apparatus can easily extract the GOPs from the coded stream when performing trick play, etc.

Furthermore, since the decoding interval of the pictures is made uniform, simplification of the system can be realized. For example, when reproducing video at the maximum frame rate, it is sufficient that the image decoding apparatus decodes one picture in one time unit, and thus decoding interval does not need to be switched according to the picture.

In this manner, by accelerating the timing for coding the pictures with the highest TemporalId, avoidance of GOP intermixing, reduction of delays, and uniformity of decoding interval can be realized. On the other hand, because the timing for coding the pictures with the largest TemporalId is accelerated, there are fewer reference pictures that can be used by the pictures with the largest TemporalId. Accordingly, there is concern over the deterioration of coding efficiency. However, a picture with a TemporalId other than the largest TemporalId does not refer to a picture with the largest TemporalId. In other words, the frequency at which a picture with the largest TemporalId is referred to by another pictures is low. Therefore, even if the picture quality of pictures with the largest TemporalId deteriorates, the error does not spread to other pictures. As such, even if there are fewer reference pictures with the largest TemporalId, there is little deterioration in overall coding efficiency. In other words, in this embodiment, intermixing of GOPs can be avoided while suppressing coding efficiency deterioration.

In this manner, the image coding apparatus 100 according to this embodiment, can realize the same advantageous effect as the image coding apparatus 100 according to Embodiment 1.

Embodiment 5

In this embodiment, an image decoding apparatus that decodes the coded stream generated by the image coding apparatus 100 according to Embodiment 1 will be described.

<Overall Configuration>

Figure 40:
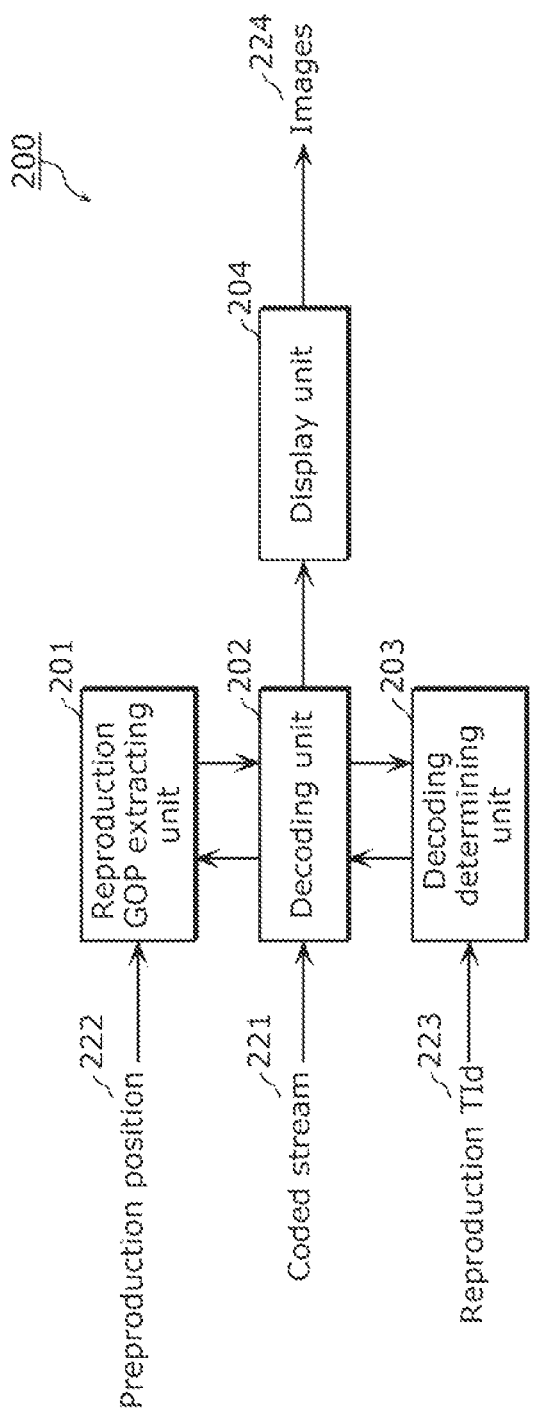
FIG. 40 is a block diagram of an image decoding apparatus according to Embodiment 5.

FIG. 40 is a block diagram illustrating the configuration of an image decoding apparatus 200 according to this embodiment. The image decoding apparatus 200 illustrated in FIG. 40 decodes the coded stream 221 to generate images 224. The coded stream 221 is, for example, the coded stream 124 generated by the image coding apparatus 100 according to Embodiment 1

The image decoding apparatus 200 includes a reproduction GOP extracting unit 201, a decoding unit 202, a decoding determining unit 203, and a display unit 204.

<Operation (as a Whole)>

Figure 41:
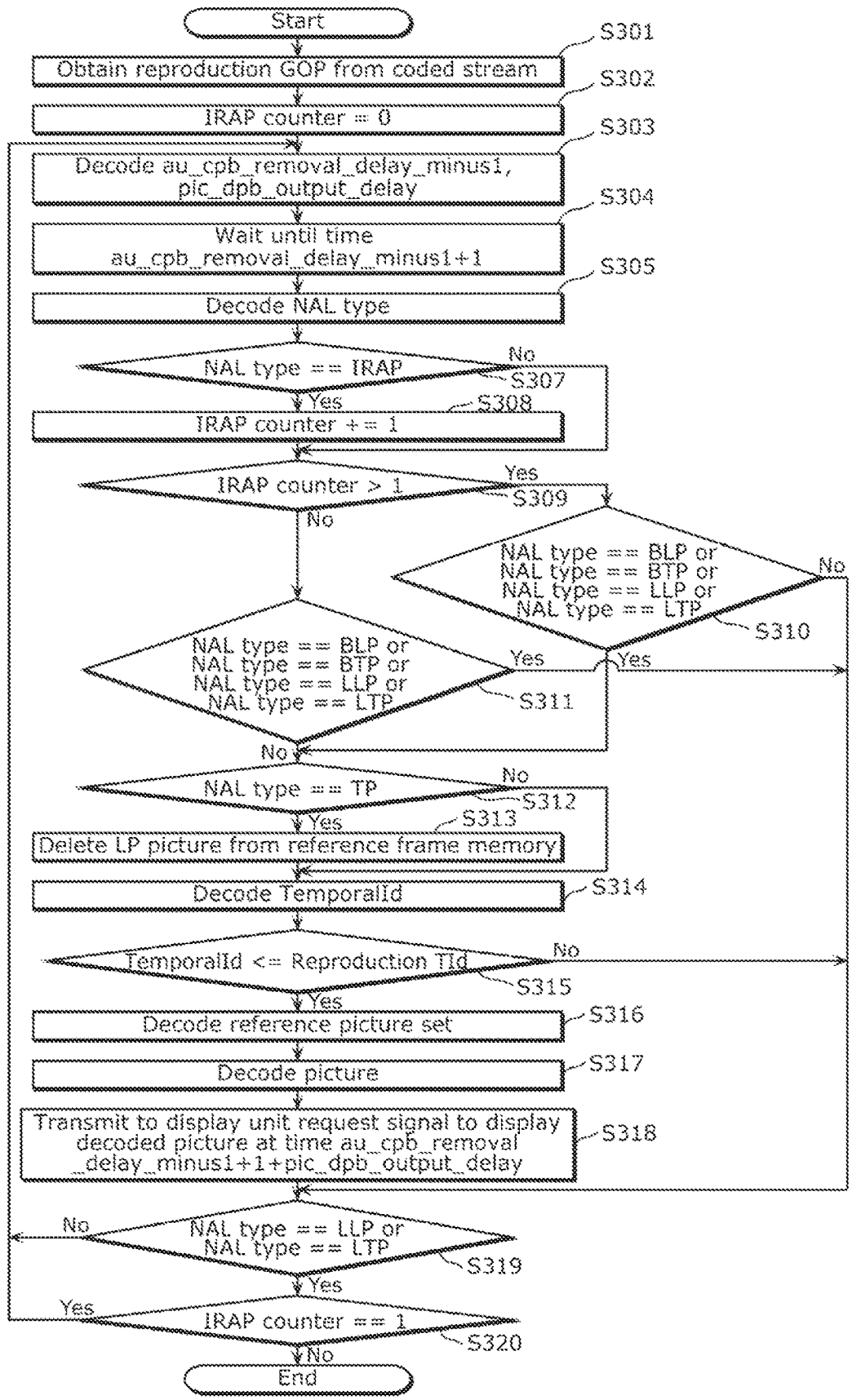
FIG. 41 is a flowchart of an image decoding process according to Embodiment 5.

Next, the flow of the decoding process as a whole will be described with reference to FIG. 41. FIG. 41 is a flowchart of the decoding process according to this embodiment.

First, the reproduction GOP extracting unit 201 extracts a GOP to be reproduced, from coded stream 221 (S301).

Next, the decoding unit 202 sets 0, as an initial value, to the variable called IRAP count (S302).

Next, the decoding unit decodes au_cpb_removal_delay_minus1 and pic_dpb_output_delay from the coded stream 221 (S303), and waits until the time au_cpb_removal_delay_minus1+1 (S304).

Next, the decoding unit 202 decodes the NAL type from the coded stream 221 (S305), and determines whether the NAL type is IRAP (S307). When the NAL type is IRAP (Yes in S307), the decoding unit 202 adds 1 to the IRAP counter (S308).

Next, the decoding determining unit 203 determines whether the IRAP counter is greater than 1 (S309). Furthermore, the decoding determining unit 203 determines whether the NAL type is any of BLP, BTP, LLP, and LTP (S310 and S311).

When the IRAP counter is greater than 1 and the NAL type is none of BLP, BTP, LLP, and LTP (Yes in S309 and No in S310), the image decoding apparatus 200 transfers the process to the next picture without performing the decoding process. Furthermore, when the IRAP counter is less than or equal to 1 and the NAL type is one of BLP, BTP, LLP, and LTP (No in S309 and Yes in S311), the image decoding apparatus 200 does not perform the decoding process, and the process transitions to the next picture. By doing so, the image decoding apparatus 200 determines whether the current picture is included in the reproduction GOP, and does not decode the current picture when the current picture is not included in the reproduction GOP.

Description will be carried out using the example in FIG. 10A and FIG. 10B. Furthermore, the underlined pictures are included in the reproduction GOP. In this case, the coded stream from I32 to B47 is extracted by the reproduction GOP extracting unit 201. According to the above determining, B11, B13, B15, I64, B56, and B52 are not included in the reproduction GOP, and their decoding is skipped.

On the other hand, when the IRAP counter is greater than 1 and the NAL type is one of BLP, BTP, LLP, and LTP (Yes in S309 and Yes in S310), or when the IRAP counter is less than or equal to 1 and the NAL type is none of BLP, BTP, LLP, and LTP (No in S309 and No in S311), the decoding determining unit 203 determines whether the NAL type is TP (S312). When the NAL type is TP (Yes in S312), the decoding determining unit 203 deletes the LP pictures from the reference frame memory (S313). This is because, due to the constraints that a TP picture is prohibited from referring to an LP picture, and that, after a TP picture, an LP picture is not coded until the next IRAP in coding order, no picture refers to an LP picture after a TP picture.

Next, the decoding unit codes the TemporalId (S314). The decoding determining unit 203 determines whether the TemporalId is less than or equal to reproductionTId 223 which is inputted from the outside (S315). When the TemporalId is greater than reproductionTId 223 (No in S315), the image decoding apparatus 200 does not decode the current picture, and shifts the process to the next picture. With this process, temporal scalability can be implemented.

When the TemporalId is less than or equal to reproductionTId 223 (Yes in S315), the decoding unit 202 decodes the reference picture set (S316), and decodes the picture (S317). Next, the decoding unit 202 transmits, to the display unit 204, a request signal for requesting that the decoded picture be displayed at the time au_cpb_removal_delay_minus1+1+pic_dpb_output_delay (S318).

Next, decoding determining unit 203 determines whether the NAL type is one of LLP and LTP and the IRAP counter is 1 (S319 and S320). When the NAL type is one of LLP and LTP and the IRAP counter is not 1 (Yes in S319 and No in S320), the decoding determining unit 203 determines that the last picture in the reproduction GOP has been decoded and the process ends.

Description will be carried out using the example in FIG. 10A and FIG. 10B. The underlined pictures are included in the reproduction GOP. In this case, the coded stream from I32 to B47 is extracted by the reproduction GOP extracting unit 201. The decoding determining unit 203 determines that all the pictures of the reproduction GOP have been processed after the end of the processing of B47 which is an LTP after I64 which is the second IRAP, and the process ends.

When the NAL type is neither LLP nor LTP (No in S319), or when the IRAP counter is 1 (Yes in S320), the process from step S303 onward is performed on the next picture.

<Operation (Reproduction GOP Obtaining)>

Figure 42:
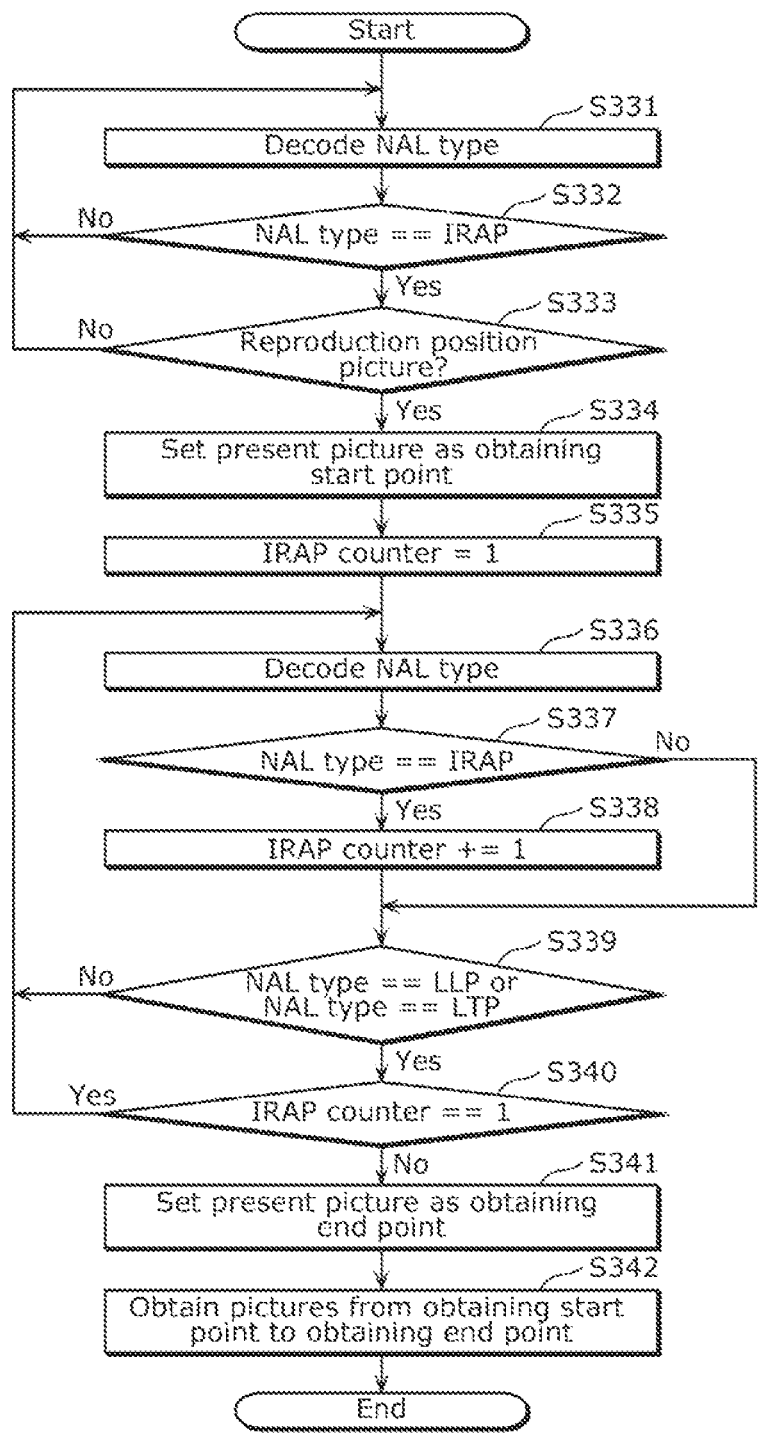
FIG. 42 is a flowchart of a reproduction GOP obtaining process according to Embodiment 5.

Next, the flow of the reproduction GOP obtaining process (S301 in FIG. 41) will be described with reference to FIG. 42. FIG. 42 is a flowchart of the reproduction GOP obtaining process according to this embodiment.

First, the reproduction GOP extracting unit 201 searches the coded stream 221 for the IRAP picture at reproduction position 222 (S331, S332, and S333). Specifically, the reproduction GOP extracting unit 201 decodes the NAL type (S331), determines whether the NAL type is IRAP (S332), and, when the NAL type is IRAP (Yes in S332), determines whether the picture is the picture at reproduction position 222 (S333). The reproduction GOP extracting unit 201 performs this series of processes sequentially from the lead picture in the coded stream 221. Then, the reproduction GOP extracting unit 201 sets the searched-out IRAP picture at reproduction position 222 as the obtaining start point picture (S334).

Next, the reproduction GOP extracting unit 201 initializes the IRAP counter to 1 (S335).

Next, the reproduction GOP extracting unit 201 decodes the NAL type of the current picture (S336), and determines whether the NAL type is IRAP (S337). When the NAL type is IRAP (Yes in S337), the reproduction GOP extracting unit 201 adds 1 to the IRAP counter (S338).

Furthermore, the reproduction GOP extracting unit 201 determines whether the NAL type is LLP or LTP (S339). Furthermore, the reproduction GOP extracting unit 201 determines whether the IRAP counter is 1 (S340). When the NAL type is LLP or LTP, and the IRAP counter is not 1 (Yes in S339 and No in S340), the reproduction GOP extracting unit 201 ends the search, and sets the current picture as the obtaining end point (S341).

Furthermore, when the NAL type is neither LLP nor LTP (No in S339), or the IRAP counter is 1 (Yes in S340), the reproduction GOP extracting unit 201 continues the search, and performs the process from step S336 onward on the next picture from the obtaining start point.

Next, the reproduction GOP extracting unit 201 obtains, from the coded stream 221, the pictures from the obtaining start point to the obtaining end point, and outputs the obtained pictures to the decoding unit 202 (S342).

Advantageous Effect

As described thus far, the image decoding apparatus 200 according to this embodiment is capable of extracting a specified reproduction GOP from the coded streams illustrated in FIG. 10A, FIG. 10B, FIG. 11, and FIG. 12 according to Embodiment 1, and decoding and reproducing only the pictures included in that GOP. Accordingly, it is possible to obtain the same advantageous effect as in Embodiment 1.

In this manner, the image decoding apparatus 200 according to this embodiment decodes the bitstream (coded stream 221) generated by hierarchically coding a plurality of pictures each belonging to any one of a plurality of hierarchical layers. The image decoding apparatus decodes, from the bitstream, time information (au_cpb_removal_delay_minus1) indicating decoding times of the plurality of pictures. The image decoding apparatus 200 decodes each picture of the plurality of pictures according to the time information, with reference to a picture belonging to a layer that is the same or lower than the layer to which the picture belongs, and without reference to a picture belonging to a layer that is higher than the layer the picture belongs. The time information indicates that the decoding times of low-layer pictures other than highest-layer pictures belonging to the highest hierarchical layer, among the plurality of pictures, are set at equal intervals.

For example, the frame rate of the low-layer pictures is half the frame rate of the plurality of pictures. For example, the frame rate of the low-layer pictures is 60 fps, and the frame rate of the plurality of pictures is 120 fps.

Accordingly, when the frame rate of the pictures in all layers is 120 fps and the frame rate of low-layer pictures is 60 fps for example, the low-layer pictures can be decoded by an image decoding apparatus having a 60-fps decoding capacity. In this manner, the image decoding apparatus 200 is capable of decoding images efficiently.

Embodiment 6

In this embodiment, an image decoding apparatus that decodes the coded stream generated by the image coding apparatus 200A according to Embodiment 2 will be described.

<Overall Configuration>

The configuration of the image coding apparatus according to this embodiment is the same as in Embodiment 5 (FIG. 40), and thus description is omitted.

<Operation (as a Whole)>

Figure 43:
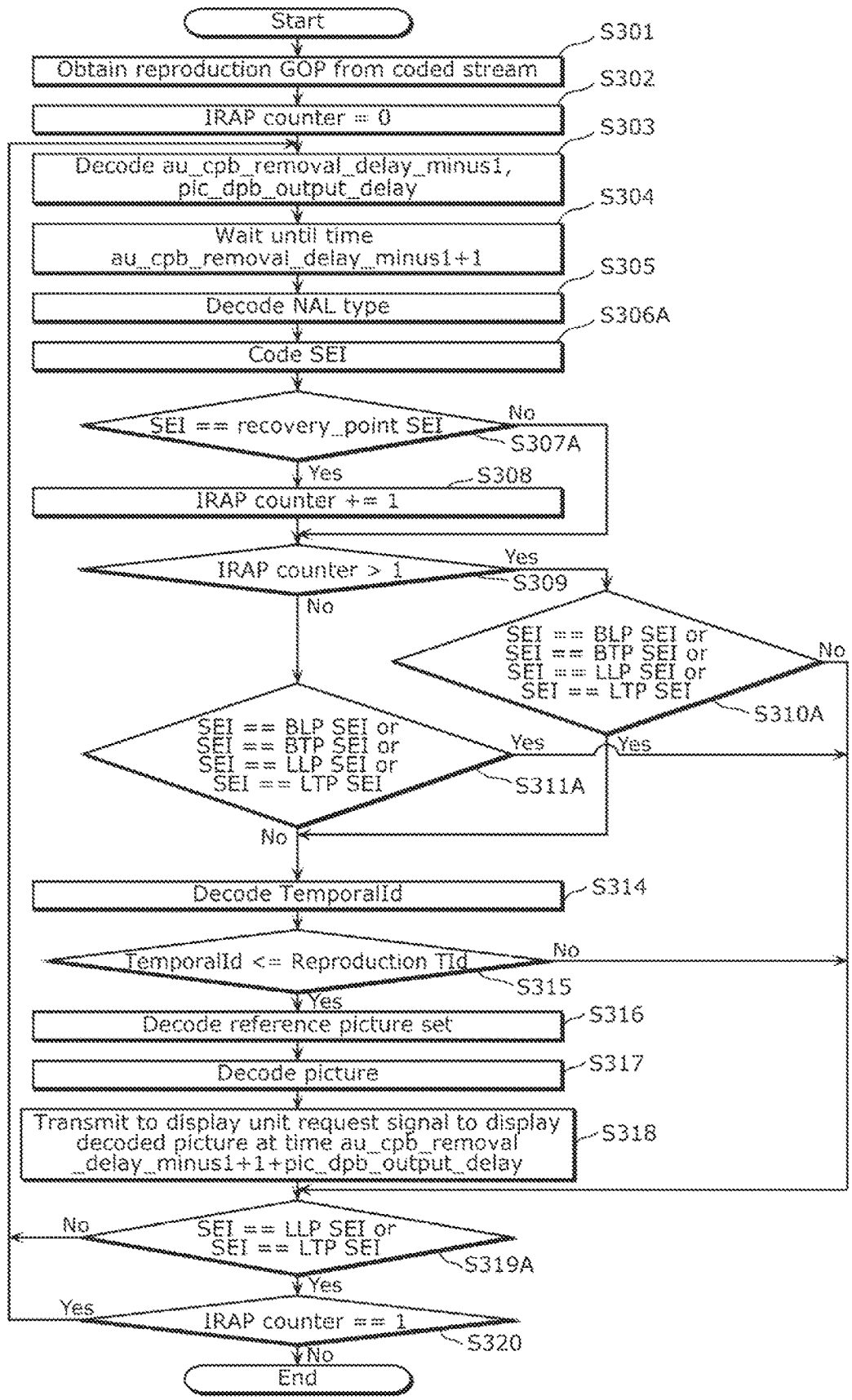
FIG. 43 is a flowchart of an image decoding process according to Embodiment 6.

Next, the flow of the decoding process as a whole will be described with reference to FIG. 43. FIG. 43 is a flowchart of the decoding process according to this embodiment. The process illustrated in FIG. 43 adds step S306A to the process illustrated in FIG. 41. Furthermore, steps S307A, S310A, S311A, and S319A are different from steps S307, S310, S311, and S319. Furthermore, the process illustrated in FIG. 43 does not include steps S312 and S313.

First, the reproduction GOP extracting unit 201 extracts a GOP to be reproduced from coded stream 221 (S301).

Next, the decoding unit 202 sets 0, as an initial value, to the variable called IRAP count (S302).

Next, the decoding unit decodes au_cpb_removal_delay_minus1 and pic_dpb_output_delay from the coded stream 221 (S303), and waits until the time au_cpb_removal_delay_minus1+1 (S304).

Next, the decoding unit 202 decodes the NAL type from the coded stream 221 (S305 and S306A), and determines whether the SEI is recovery_point SEI (5307A). When the SEI is recovery_point SEI (Yes in S307A), the decoding unit 202 adds 1 to the IRAP counter (S308).

Next, the decoding determining unit 203 determines whether the IRAP counter is greater than 1 (S309). Furthermore, the decoding determining unit 203 determines if the SEI is any one of BLP SEI, BTP SEI, LLP SEI, and LTP SEI (S310A and S311A).

When the IRAP counter is greater than 1 and the SEI is none of BLP SEI, BTP SEI, LLP SEI, and LTP SEI (Yes in S309 and No in S310A), the image decoding apparatus 200 transfers the process to the next picture without performing the decoding process. Furthermore, when the IRAP counter is less than or equal to 1 and the SEI is one of BLP SEI, BTP SEI, LLP SEI, and LTP SEI (No in S309 and Yes in S311A), the image decoding apparatus 200 does not perform the decoding process, and the process transitions to the next picture. By doing so, the image decoding apparatus 200 determines whether the current picture is included in the reproduction GOP, and does not decode the current picture when the current picture is not included in the reproduction GOP.

Description will be carried out using the example in FIG. 21A and FIG. 21B. Furthermore, the underlined pictures are included in the reproduction GOP. In this case, the coded stream from I32 to B47 is extracted by the reproduction GOP extracting unit 201. According to the above determining, B11, B13, B15, I64, B56, and B52 are not included in the reproduction GOP, and their decoding is skipped.

When the IRAP counter is greater than 1 and the SEI is one of BLP SEI, BTP SEI, LLP SEI, and LTP SEI (Yes in S309 and Yes in S310A), or when the IRAP counter is less than or equal to 1 and the SEI is none of BLP SEI, BTP SEI, LLP SEI, and LTP SEI (No in S309 and No in S311A), the decoding unit 202 decodes the TemporalId (S314). The decoding determining unit 203 determines whether the TemporalId is less than or equal to reproductionTId 223 which is inputted from the outside (S315). When the TemporalId is greater than reproductionTId 223 (No in S315), the image decoding apparatus 200 does not decode the current picture, and shifts the process to the next picture. With this process, temporal scalability can be implemented.

When the TemporalId is less than or equal to reproductionTId 223 (Yes in S315), the decoding unit 202 decodes the reference picture set (S316), and decodes the picture (S317). Next, the decoding unit 202 transmits, to the display unit 204, a request signal for requesting that the decoded picture be displayed at the time au_cpb_removal_delay_minus1+1+pic_dpb_output_delay (S318).

Next, decoding determining unit 203 determines whether the SEI is one of LLP SEI and LTP SEI and the IRAP counter is 1 (S319A and S320). When the SEI is one of LLP SEI and LTP SEI and the IRAP counter is not 1 (Yes in S319A and No in S320), the decoding determining unit 203 determines that the last picture in the reproduction GOP has been decoded and the process ends.

Description will be carried out using the example in FIG. 21A and FIG. 21B. The underlined pictures are included in the reproduction GOP. In this case, the coded stream from I32 to B47 is extracted by the reproduction GOP extracting unit 201. The decoding determining unit 203 determines that all the pictures of the reproduction GOP have been processed after the end of the processing of B47 which is an LTP SEI after I64 which is the second recovery_point SEI, and the process ends.

When the SEI is neither LLP SEI nor LTP SEI (No in S319A), or when the IRAP counter is 1 (Yes in S320), the process from step S303 onward is performed on the next picture.

<Operation (Reproduction GOP Obtaining)>

Next, the flow of the reproduction GOP obtaining process (S301 in FIG. 43) will be described with reference to FIG.

Figure 44:
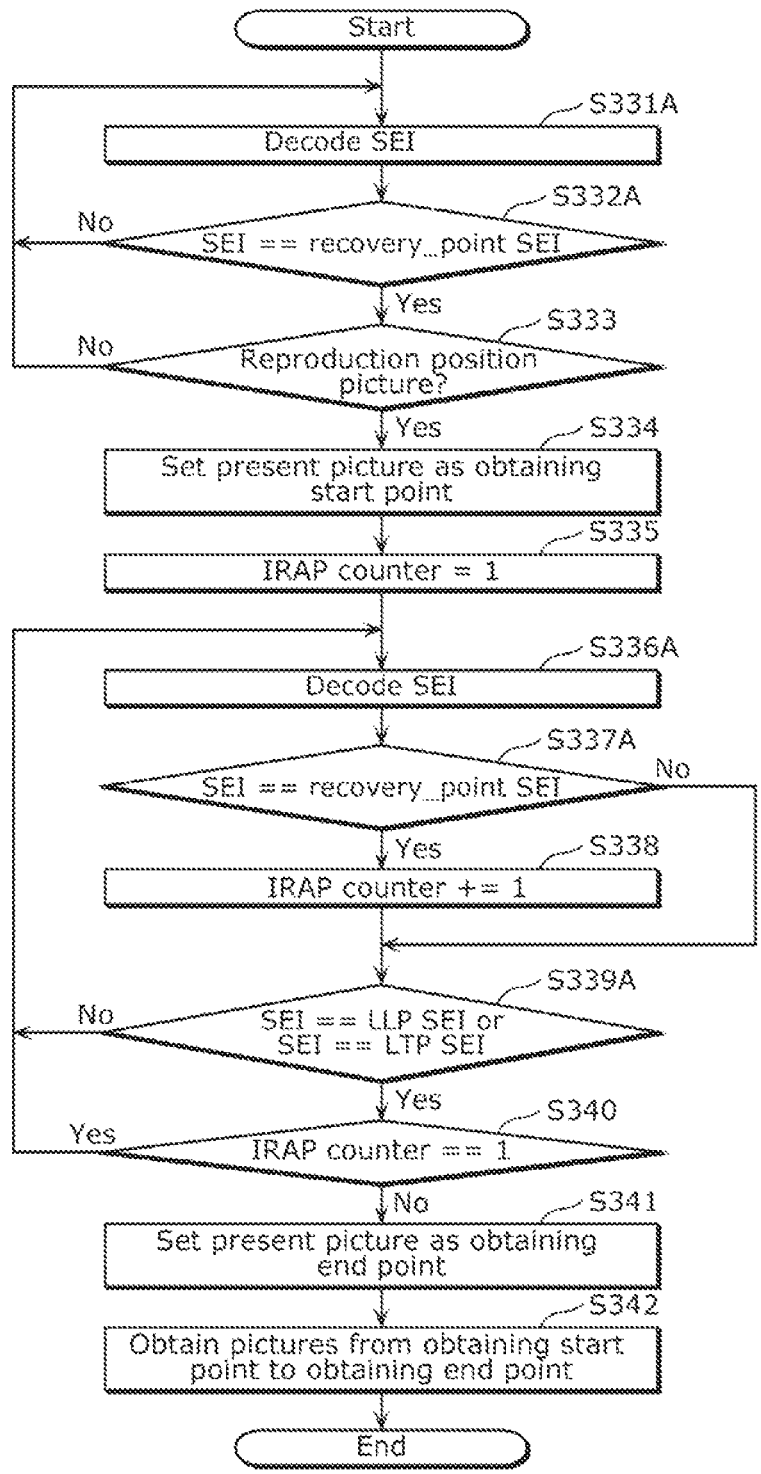
FIG. 44 is a flowchart of a reproduction GOP obtaining process according to Embodiment 6.

44. FIG. 44 is a flowchart of the reproduction GOP obtaining process according to this embodiment. It should be noted that steps S331A, S332A, S336A, S337A, and S339A in the process illustrated in FIG. 44 are different from steps S331, S332, S336, S337, and S339 in the process illustrated in FIG. 42.

First, the reproduction GOP extracting unit 201 searches the coded stream 221 for the recovery_point SEI picture at reproduction position 222 (S331A, S332A, and S333A). Specifically, the reproduction GOP extracting unit 201 decodes the SEI (S331A), and determines whether the SEI is recovery_point SEI (S332A). When the SEI is recovery_point SEI (Yes in S332A), the reproduction GOP extracting unit 201 determines whether the picture is the picture at reproduction position 222 (S333). The reproduction GOP extracting unit 201 performs this series of processes sequentially from the lead picture in the coded stream 221. Then, the reproduction GOP extracting unit 201 sets the searched-out recovery_point SEI picture at reproduction position 222 as the obtaining start point picture (S334).

Next, the reproduction GOP extracting unit 201 initializes the IRAP counter to 1 (S335).

Next, the reproduction GOP extracting unit 201 decodes the SEI of the current picture (S336A), and determines whether the SEI is the recovery_point SEI (S337A). When the SEI is the recovery_point SEI (Yes in S337), the reproduction GOP extracting unit 201 adds 1 to the IRAP counter (S338).

Furthermore, the reproduction GOP extracting unit 201 determines whether the SEI is LLP SEI or LTP SEI (S339A). Furthermore, the reproduction GOP extracting unit 201 determines whether the IRAP counter is 1 (S340). When the SEI is LLP SEI or LTP SEI, and the IRAP counter is not 1 (Yes in S339A and No in S340), the reproduction GOP extracting unit 201 ends the search, and sets the current picture as the obtaining end point (S341).

Furthermore, when the SEI is neither LLP SEI nor LTP SEI (No in S339A), or the IRAP counter is 1 (Yes in S340), the reproduction GOP extracting unit 201 continues the search, and performs the process from step S336A onward on the next picture from the obtaining start point picture.

Next, the reproduction GOP extracting unit 201 obtains, from the coded stream 221, the pictures from the obtaining start point to the obtaining end point, and outputs the obtained pictures to the decoding unit 202 (S342).

Advantageous Effect

As described thus far, the image decoding apparatus 200 according to this embodiment is capable of extracting a specified reproduction GOP from the coded streams illustrated in FIG. 21A, FIG. 21B, FIG. 22, and FIG. 23 according to Embodiment 2, and decoding and reproducing only the pictures included in that GOP. Accordingly, it is possible to obtain the same advantageous effect as in Embodiment 2.

Embodiment 7

In this embodiment, an image decoding apparatus that decodes the coded stream generated by the image coding apparatus 100 according to Embodiment 3 will be described.

<Overall Configuration>

The configuration of the image coding apparatus 200 according to this embodiment is the same as in Embodiment 5 (FIG. 40), and thus description is omitted.

<Operation (as a Whole)>

Figure 45:
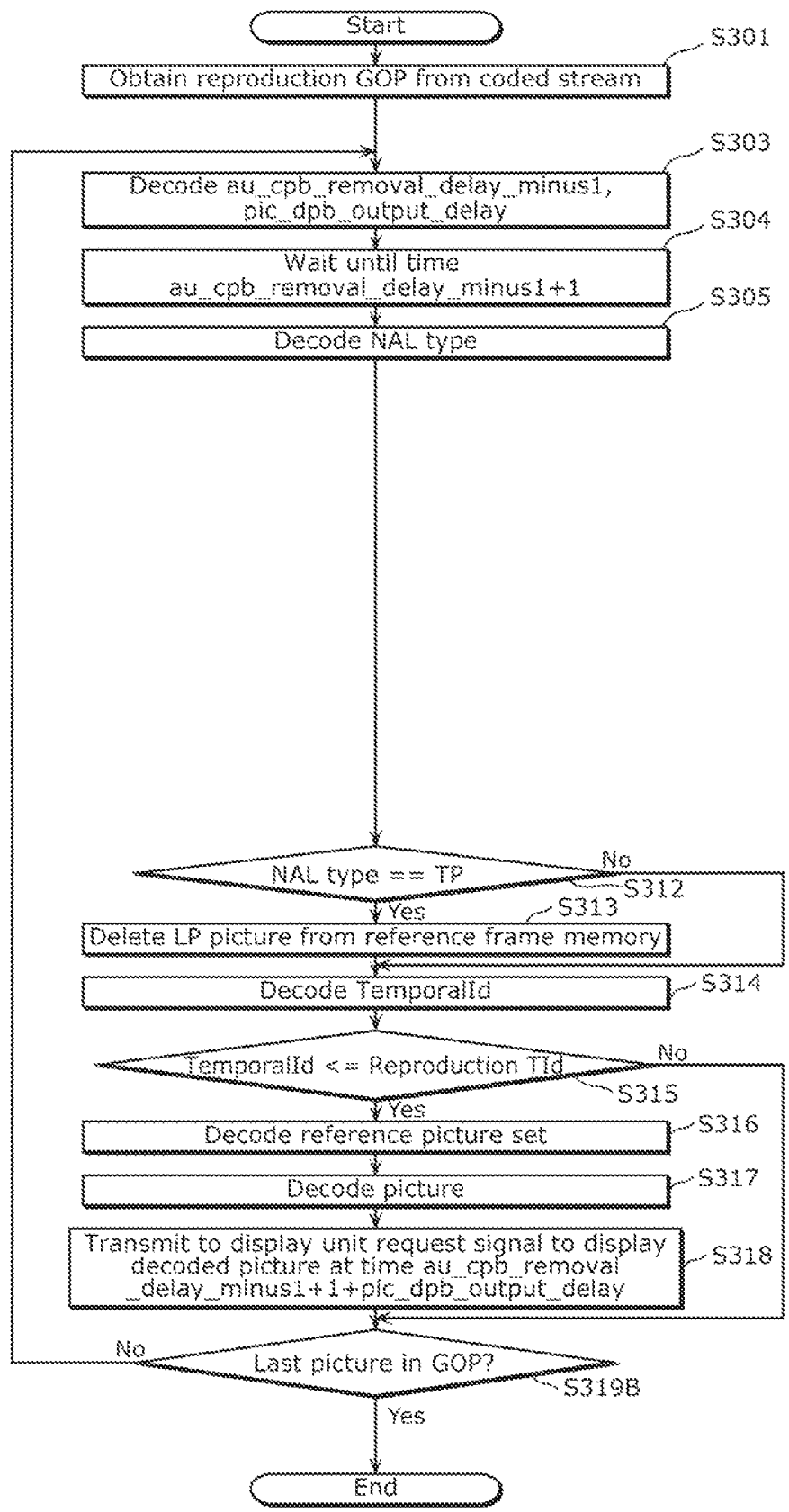
FIG. 45 is a flowchart of an image decoding process according to Embodiment 7.

Next, the flow of the decoding process as a whole will be described with reference to FIG. 45. FIG. 45 is a flowchart of the decoding process according to this embodiment. It should be noted that step S319B in the process illustrated in FIG. 45 is different from step S319 in the process illustrated in FIG. 41. Furthermore, the process illustrated in FIG. 45 does not include steps S302 and S306 to S311. Other than that, the process is the same as in Embodiment 5 (FIG. 41), and thus description is omitted.

In step S319B, the image decoding apparatus 200 determines whether the current picture is the last picture in the GOP (S319B). When the current picture is the last picture in the GOP (Yes in S319B), the image decoding apparatus 200 ends the process. Furthermore, when the current picture is not the last picture in the GOP (No in S319B), the image decoding apparatus 200 performs the process from step S303 onward on the next picture.

<Operation (Reproduction GOP Obtaining)>

Figure 46:
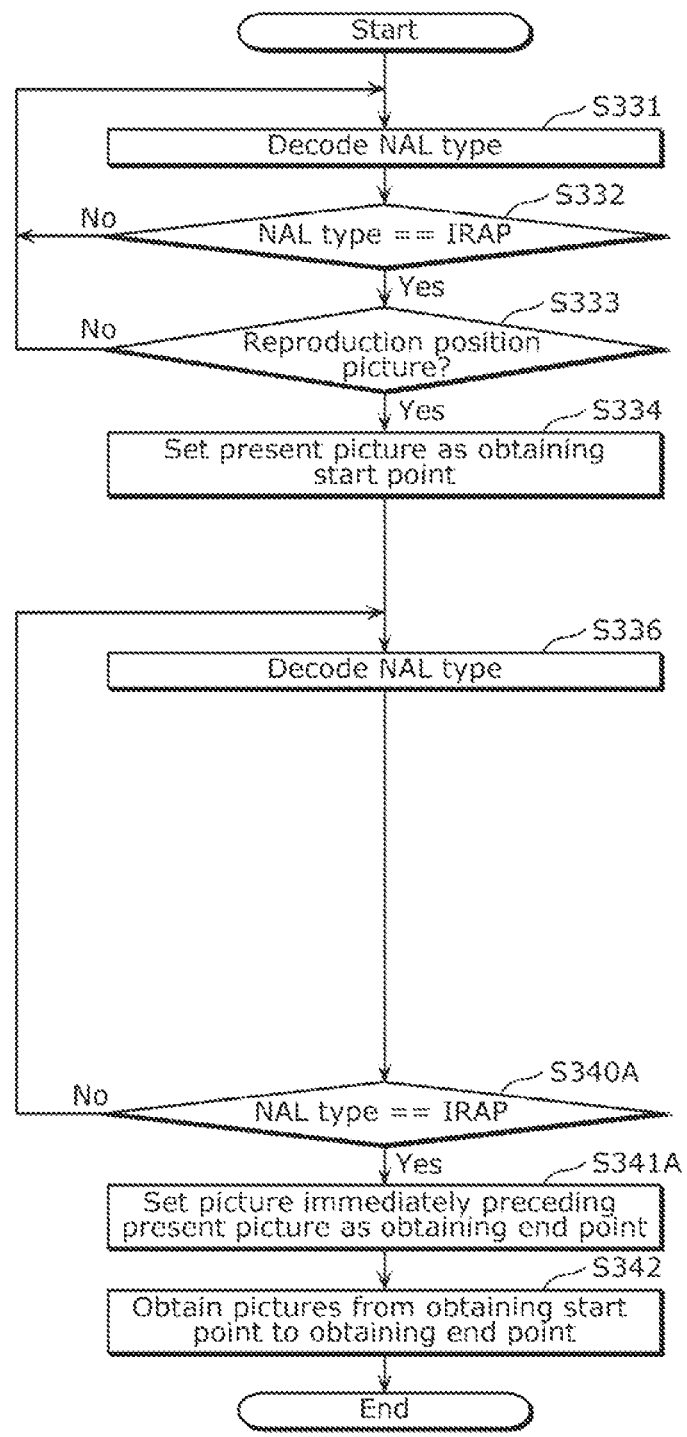
FIG. 46 is a flowchart of a reproduction GOP obtaining process according to Embodiment 7.

Next, the flow of the reproduction GOP obtaining process (S301 in FIG. 45) will be described with reference to FIG. 46. FIG. 46 is a flowchart of the reproduction GOP obtaining process according to this embodiment. It should be noted that steps S340A and S341A in the process illustrated in FIG. 46 are different from steps S340 and S341 in the process illustrated in FIG. 42. Furthermore, the process illustrated in FIG. 46 does not include steps S335 and S337 to S339. Furthermore, steps S331, S332, S333, and S334 are the same as in Embodiment 5 (FIG. 42), and thus description is omitted.

After step S334, the reproduction GOP extracting unit 201 decodes the NAL type (S336), and searches for the IRAP picture (S340A). Specifically, the reproduction GOP extracting unit 201 determines whether the NAL type of the current picture is IRAP (S340A). When the NAL type of the current picture is IRAP (Yes in S340A), the reproduction GOP extracting unit 201 sets the picture immediately preceding the current picture as the obtaining end point picture (S341A).

Next, the reproduction GOP extracting unit 201 obtains, from the coded stream 221, the pictures from the obtaining start point to the obtaining end point, and outputs the obtained pictures to the decoding unit 202 (S342).

When the NAL type of the current picture is not IRAP (No in S340A), the reproduction GOP extracting unit 201 performs the process from step S336 onward on the next picture.

Advantageous Effect

As described thus far, the image decoding apparatus 200 according to this embodiment is capable of extracting a specified reproduction GOP from the coded streams illustrated in FIG. 25A, FIG. 25B, FIG. 26, and FIG. 27 according to Embodiment 3, and decoding and reproducing only the pictures included in that GOP. Accordingly, it is possible to obtain the same advantageous effect as in Embodiment 3.

In this manner, the image decoding apparatus 200 according to this embodiment decodes the bitstream (coded stream 221) generated by hierarchically coding a plurality of pictures each belonging to any one of a plurality of hierarchical layers. The image decoding apparatus decodes, from the bitstream, time information (au_cpb_removal_delay_minus1) indicating decoding times of the plurality of pictures. The image decoding apparatus 200 decodes each of the plurality of pictures according to the time information, with reference to a picture belonging to a layer that is the same or lower than the layer to which the current picture belongs, and without reference to a picture belonging to a layer that is higher than the layer the current picture belongs. The time information indicates that the decoding times of low-layer pictures other than highest-layer pictures belonging to the highest hierarchical layer, among the plurality of pictures, are set at equal intervals.

For example, the frame rate of the low-layer pictures is half the frame rate of the plurality of pictures. For example, the frame rate of the low-layer pictures is 60 fps, and the frame rate of the plurality of pictures is 120 fps.

Accordingly, when the frame rate of the pictures in all layers is 120 fps and the frame rate of low-layer pictures is 60 fps for example, the low-layer pictures can be decoded by an image decoding apparatus having a 60-fps decoding capacity. In this manner, the image decoding apparatus 200 is capable of decoding images efficiently.

In addition, time information (au_cpb_removal_delay_minus1) indicates that the decoding time of a picture preceding a random accessible I-picture in display order is ahead of the decoding time of a picture following the I-picture in display order. With this, the capacity of the reference frame memory of the image decoding apparatus 200 can be reduced.

Furthermore, the plurality of pictures are included in any one of a plurality of groups of pictures (GOPs) each of which includes at least one I-picture and pictures which are consecutive in display order. The decoding times of the plurality of pictures are set so that pictures included in each group of pictures are decoded consecutively, without the intervention of the decoding of a picture included in another group of pictures. Accordingly, the image decoding apparatus 200 can decode images without performing a special process.

Embodiment 8

In this embodiment, an image decoding apparatus that decodes the coded stream generated by the image coding apparatus 100 according to Embodiment 4 will be described.

<Overall Configuration>

The configuration of the image coding apparatus 200 according to this embodiment is the same as in Embodiment 5 (FIG. 40), and thus description is omitted.

<Operation (as a Whole)>

Figure 47:
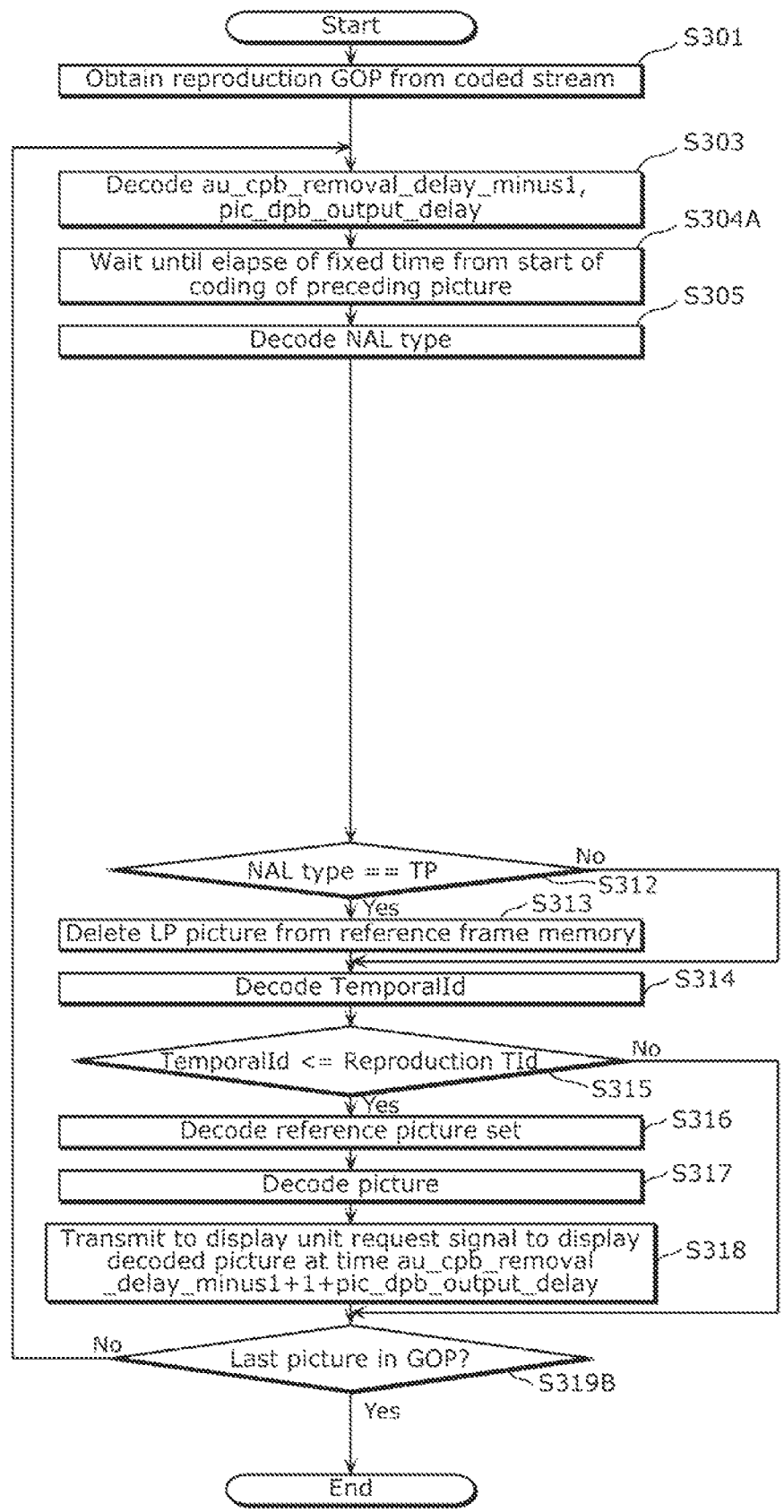
FIG. 47 is a flowchart of an image decoding process according to Embodiment 8.

Next, the flow of the decoding process as a whole will be described with reference to FIG. 47. FIG. 41 is a flowchart of the decoding process according to this embodiment. It should be noted that step S304A in the process illustrated in FIG. 47 is different from step S304 in the process illustrated in FIG. 45. Other than that, the process is the same as in Embodiment 7 (FIG. 45), and thus description is omitted.

In step S304A, the decoding unit 202 waits until a fixed time elapses from the start of decoding of the preceding picture. To describe using the example illustrated in FIG. 34A and FIG. 34B, the decoding unit 202 starts the decoding of B1 after the elapse of 1 time unit from the start of the decoding of I0, and then decodes P16 after the elapse of 1 time unit. In this manner, the decoding unit 202 starts the decoding of pictures at equal intervals.

<Operation (Reproduction GOP Obtaining)>

The flow of the reproduction GOP obtaining process (S301 in FIG. 47) is the same as in Embodiment 7 (FIG. 46), and thus description is omitted.

Advantageous Effect

As described thus far, according to this embodiment, it is possible to extract a specified reproduction GOP from the coded streams illustrated in FIG. 34A, FIG. 34B, FIG. 35, and FIG. 36 according to Embodiment 4, and decode and reproduce only the pictures included in that GOP. Accordingly, it is possible to obtain the same advantageous effect as in Embodiment 4.

Although an image coding apparatus and an image decoding apparatus according to the embodiments have been described thus far, the present disclosure is not limited to such embodiments.

Furthermore, the respective processing units included in the image coding apparatus and the image decoding apparatus according to the above-described embodiments are typically implemented as an LSI which is an integrated circuit. These processing units may be individually configured as single chips or may be configured so that a part or all of the processing units are included in a single chip.

Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In the respective embodiments, the respective structural elements are configured using dedicated hardware, but may also be implemented by executing software programs suited to the respective structural elements. The respective structural elements may be implemented by a program execution unit such as a CPU or a processor reading and executing a software program recorded on a recording medium such as a hard disk or semiconductor memory.

Stated differently, the image coding apparatus and the image decoding apparatus include control circuitry and storage electrically connected to the control circuitry (i.e., accessible from the control circuitry). The control circuitry includes at least one of dedicated hardware and a program executing unit. Furthermore, when the control circuitry includes a program executing unit, the storage records a software program that is executed by the program executing unit.

In addition, the present disclosure may be the aforementioned software program, or a non-transitory computer-readable recording medium on which the aforementioned program is recorded. Furthermore, it should be obvious that the aforementioned program can be distributed via a transmission medium such as the Internet.

Furthermore, the present disclosure may be implemented as a receiving apparatus that receives a coded bitstream (coded stream) generated by the above-described image coding apparatus. Furthermore, the receiving apparatus may include the above-described image decoding apparatus. Furthermore, the present disclosure may be implemented as a transmitting apparatus that transmits the coded bitstream (coded stream) generated by the image coding apparatus.

Moreover, all numerical figures used in the forgoing description are merely examples for describing the present disclosure in specific terms, and thus the present disclosure is not limited to the illustrated numerical figures.

Furthermore, the separation of the function blocks in the block diagrams is merely an example, and plural function blocks may be implemented as a single function block, a single function block may be separated into plural function blocks, or part of functions of a function block may be transferred to another function block. Furthermore, the functions of function blocks having similar functions may be processed, in parallel or by time-sharing, by a single hardware or software.

Furthermore, the sequence in which the steps included in the above-described image coding method and image decoding method are executed is given as an example to describe the present disclosure in specific terms, and thus other sequences are possible. Furthermore, part of the above-described steps may be executed simultaneously (in parallel) with another step.

Furthermore, the processes described in each of the embodiments may be implemented by integrated processing using a single apparatus (system), or may be implemented by distributed processing using plural apparatuses. Furthermore, the computer for executing the above-described program may be a single computer or plural computers. In other words, integrated processing may be performed or distributed processing may be performed.

Although an image coding apparatus and an image decoding apparatus according to one or plural aspects of the present disclosure are described based on the embodiments, the present disclosure is not limited to such embodiments. Various modifications to the present embodiments that can be conceived by those skilled in the art, and forms configured by combining structural elements in different embodiments, without departing from the teachings of the present disclosure are included in the scope of one or more aspects of the present disclosure.

Embodiment 9

The processing described in each of the embodiments can be simply implemented in an independent computer system, by recording, in a recording medium, a program for implementing the configurations of the moving picture coding method (image coding method) and the moving picture decoding method (image decoding method) described in each of the embodiments. The recording medium may be any recording medium as long as the program can be recorded, such as a magnetic disk, an optical disk, a magnetic optical disk, an IC card, and a semiconductor memory.

In addition, applications of the moving picture coding method (image coding method) and the moving picture decoding method (image decoding method) described in each of the embodiments and a system using the same will be described. The system has a feature of having an image coding and decoding apparatus that includes an image coding apparatus using the image coding method and an image decoding apparatus using the image decoding method. Other structural elements in the system can be changed as appropriate in accordance with the situation.

Figure 48:
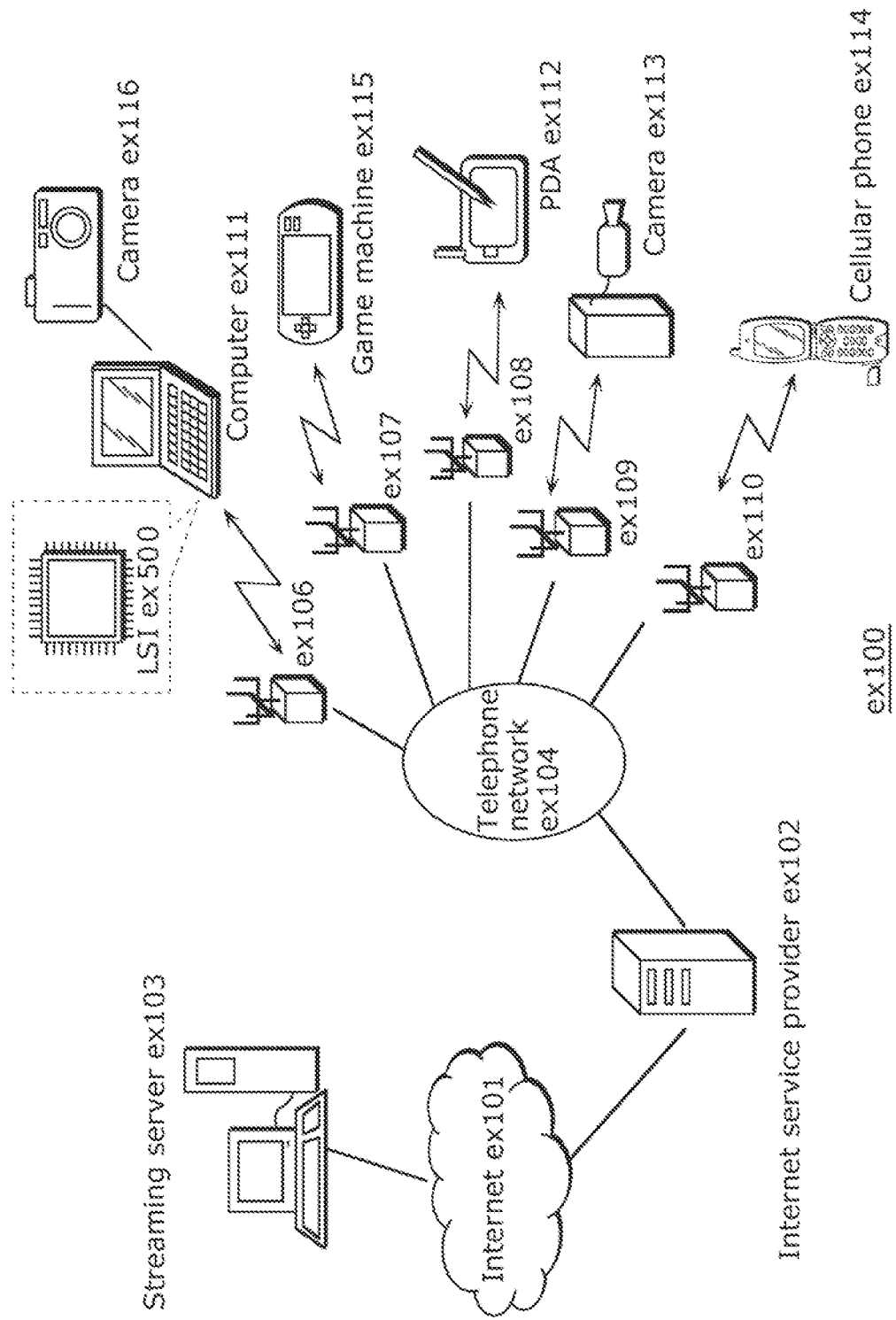
FIG. 48 is a diagram of an overall configuration of a content providing system for implementing content distribution services.

FIG. 48 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 48, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via short distance wireless communication and so on.

The camera ex113 is a device capable of capturing video, such as a digital video camera. A camera ex116 is a device capable of capturing both still images and video, such as a digital camera. Furthermore, the cellular phone ex114 may be a cellular phone operating under any one of standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS) phone.

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of the embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 49:
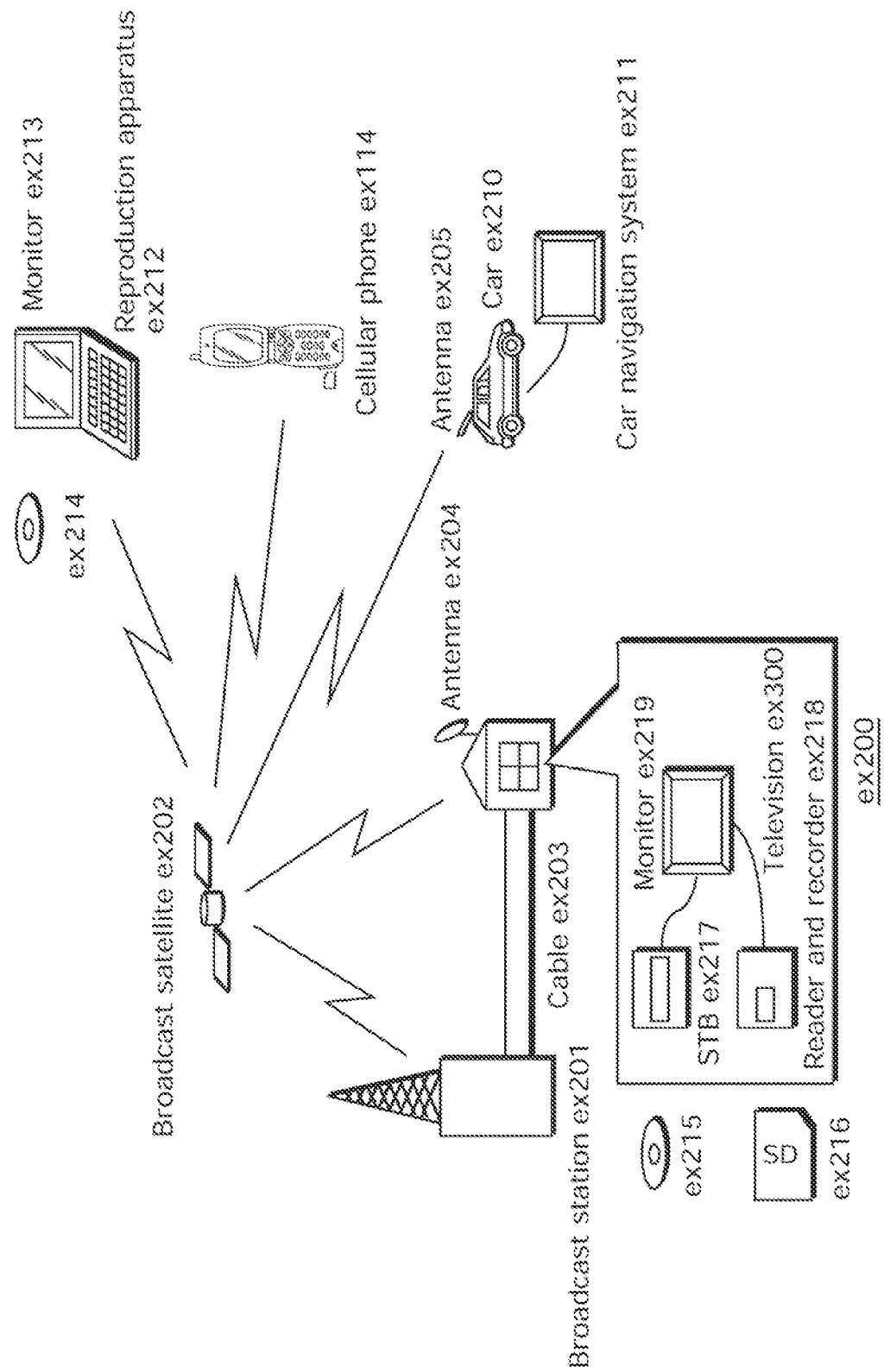
FIG. 49 is a diagram of an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 49. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 50:
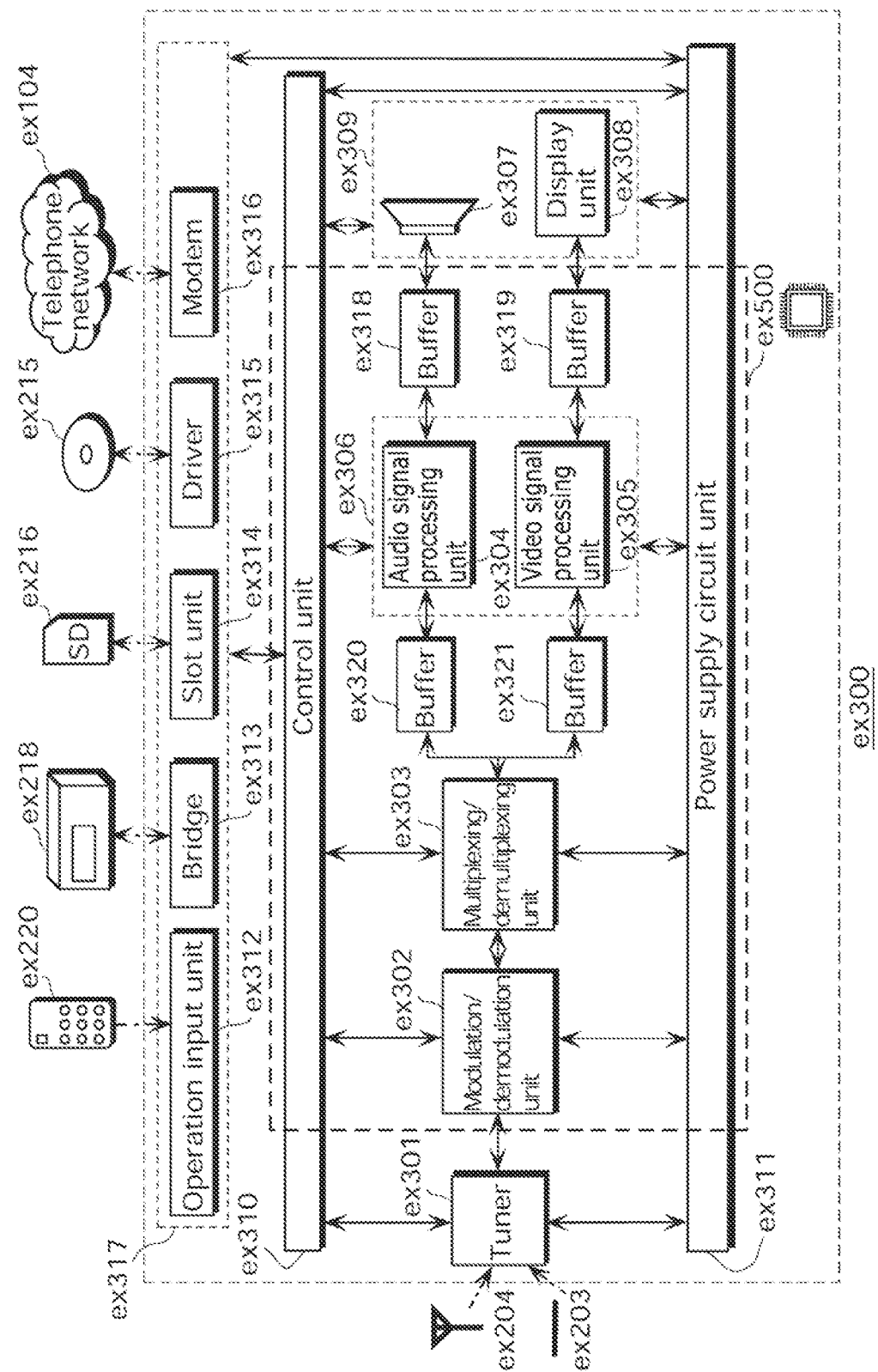
FIG. 50 is a block diagram illustrating an example of a configuration of a television.

FIG. 50 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation.

Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments.

The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 51:
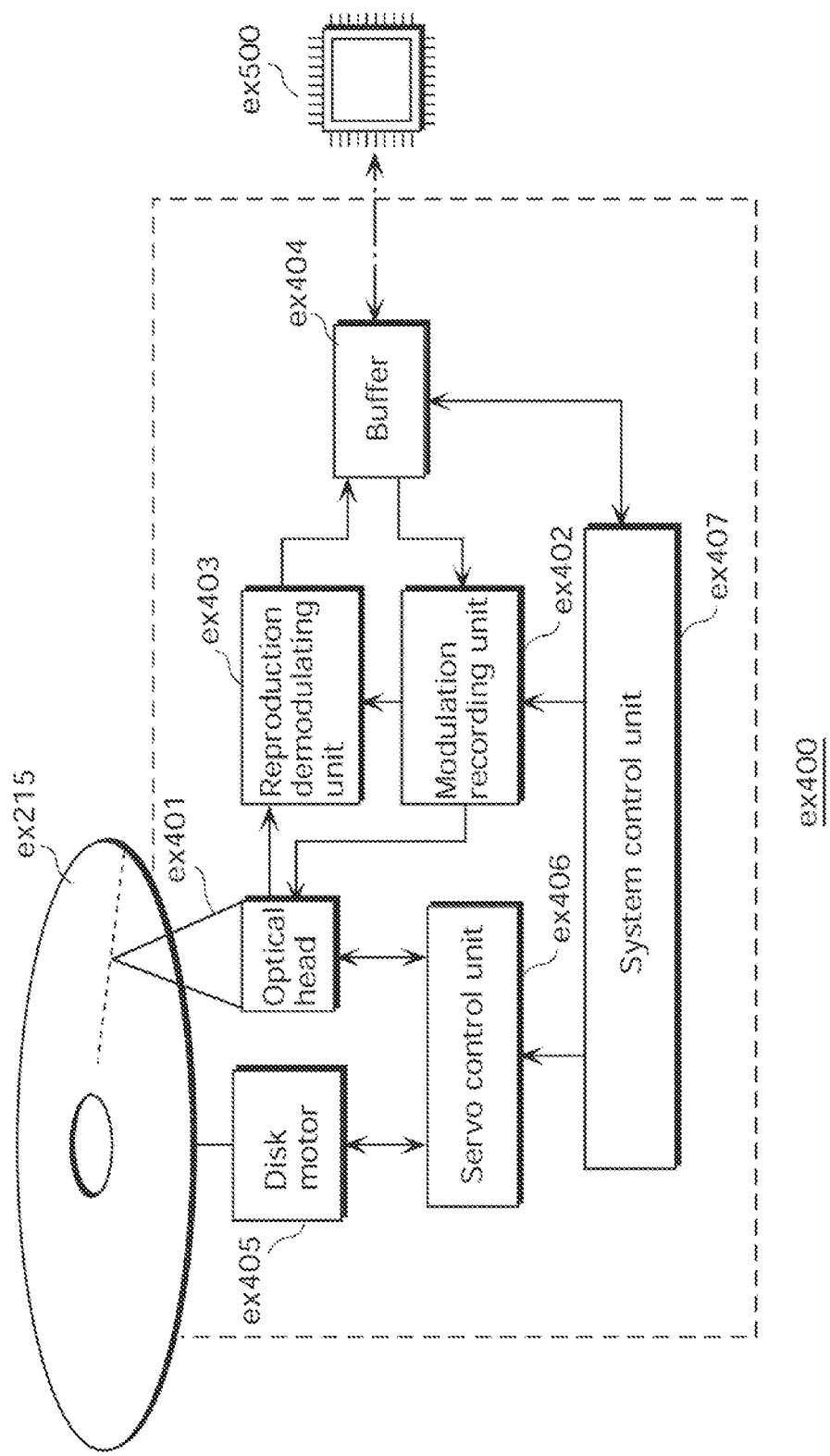
FIG. 51 is a block diagram illustrating an example of a configuration of an information reproducing/recording unit that reads and writes information from or on a recording medium which is an optical disk.

As an example, FIG. 51 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information.

The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 52:
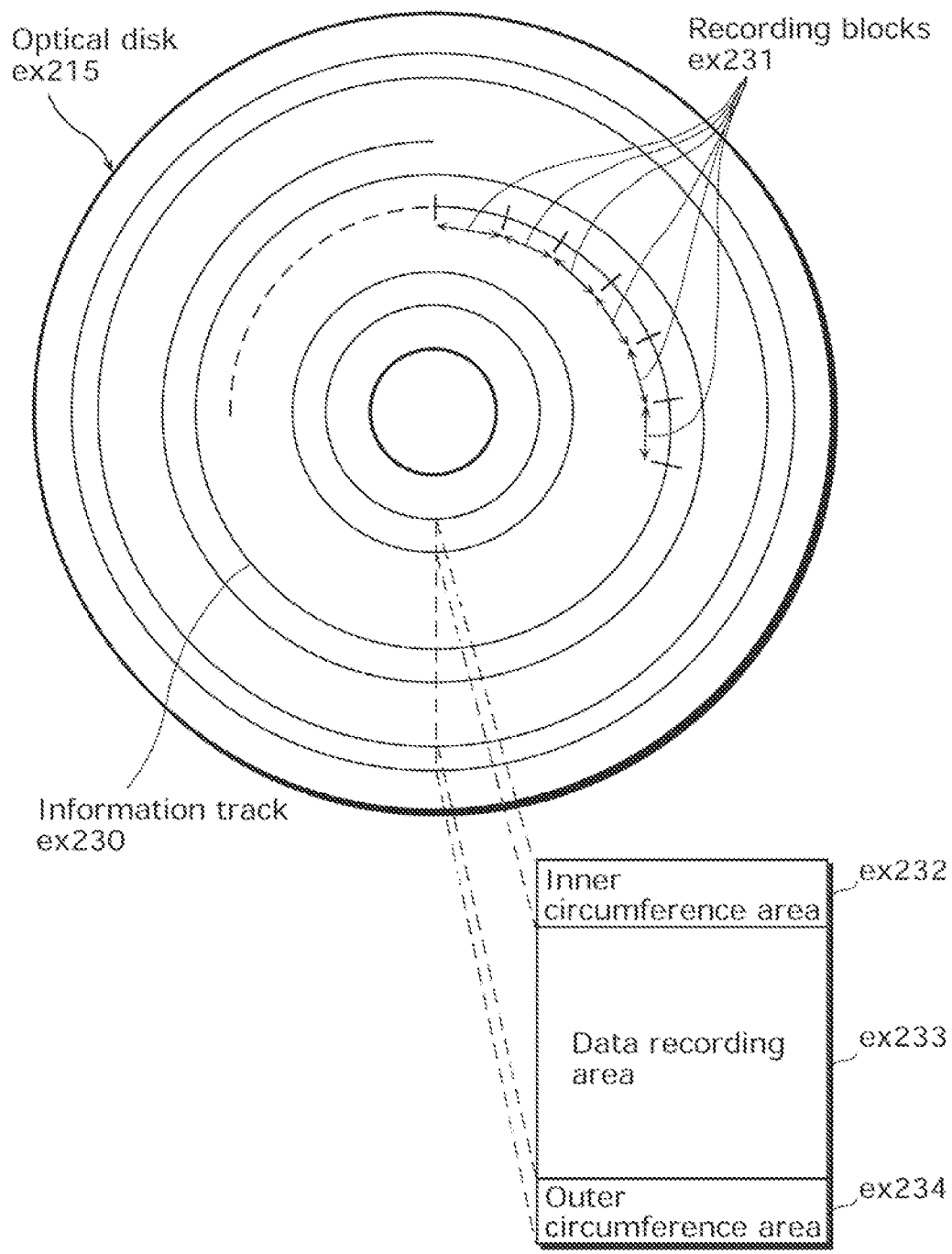
FIG. 52 is a diagram illustrating an example of a structure of a recording medium which is an optical disk.

FIG. 52 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks.

Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 50. The same will be true for the configuration of the computer ex111, the cellular phone ex114, and others.

Figure 53A:
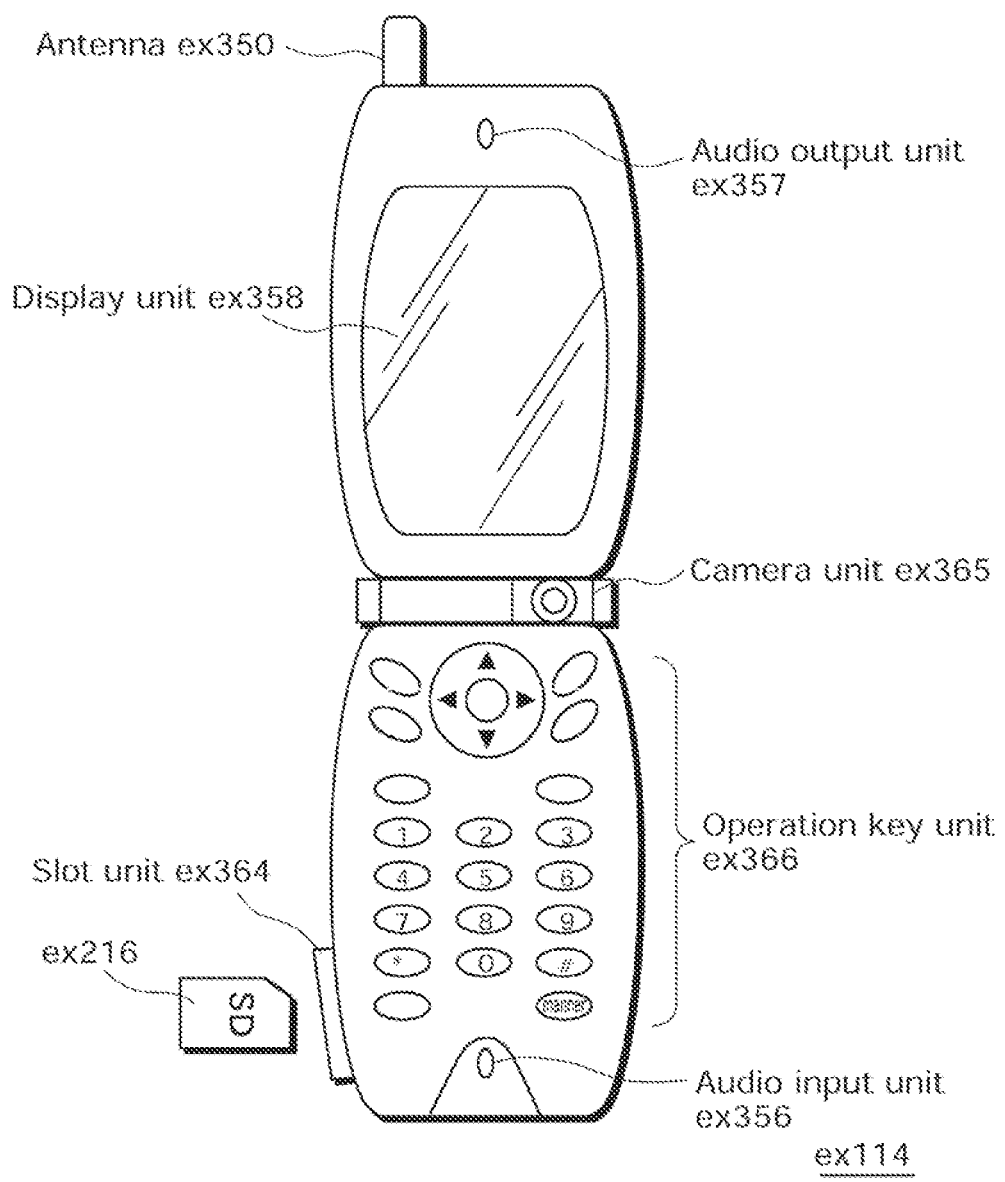
FIG. 53A is a diagram illustrating an example of a cellular phone.

FIG. 53A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 53B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 10

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 54 illustrates a structure of the multiplexed data. As illustrated in FIG. 54, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 55:
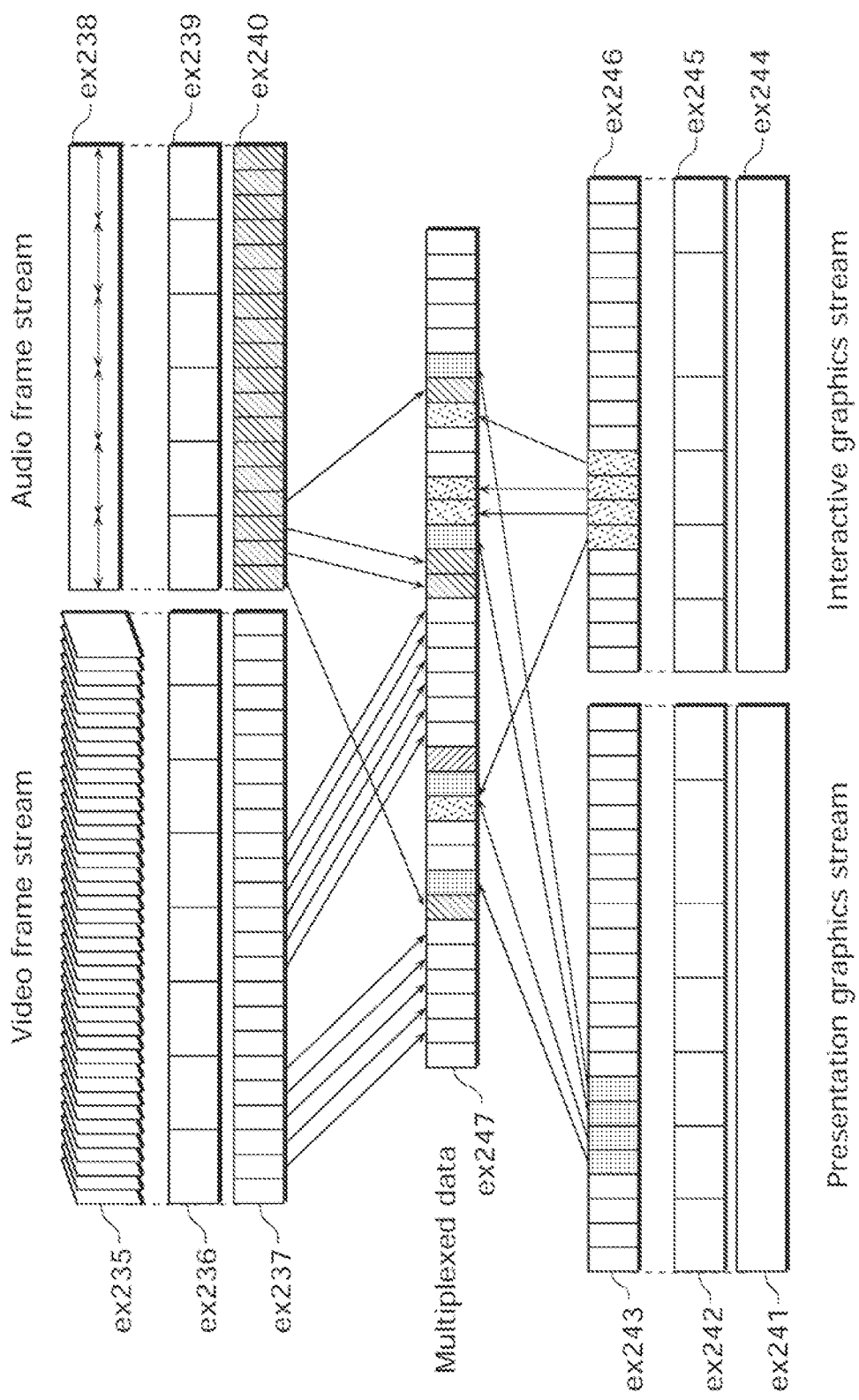
FIG. 55 is a diagram schematically illustrating how each stream is multiplexed in multiplexed data.

FIG. 55 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 56:
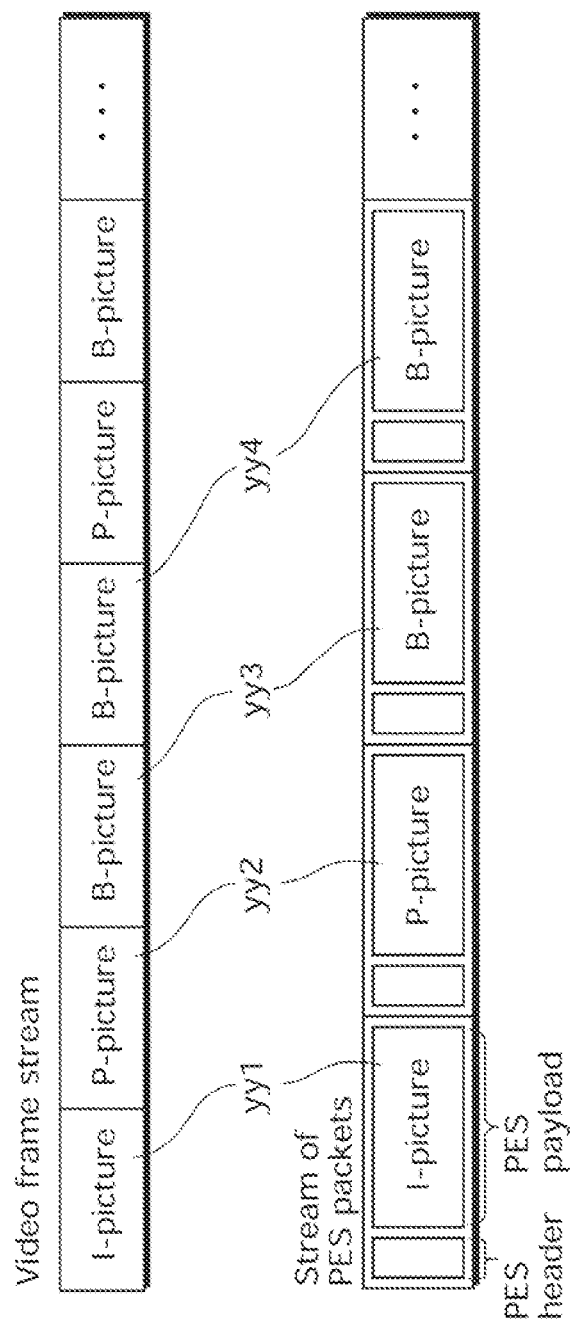
FIG. 56 is a diagram illustrating in more detail how a video stream is stored in a stream of PES packets.

FIG. 56 illustrates how a video stream is stored in a stream of PES packets in more detail. The first bar in FIG. 56 shows a video frame stream in a video stream. The second bar shows the stream of PES packets. As indicated by arrows denoted as yy1, yy2, yy3, and yy4 in FIG. 56, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 57 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 57. The numbers incrementing from the head of the multiplexed data are called source packet numbers (SPNs).

Furthermore, each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 58:
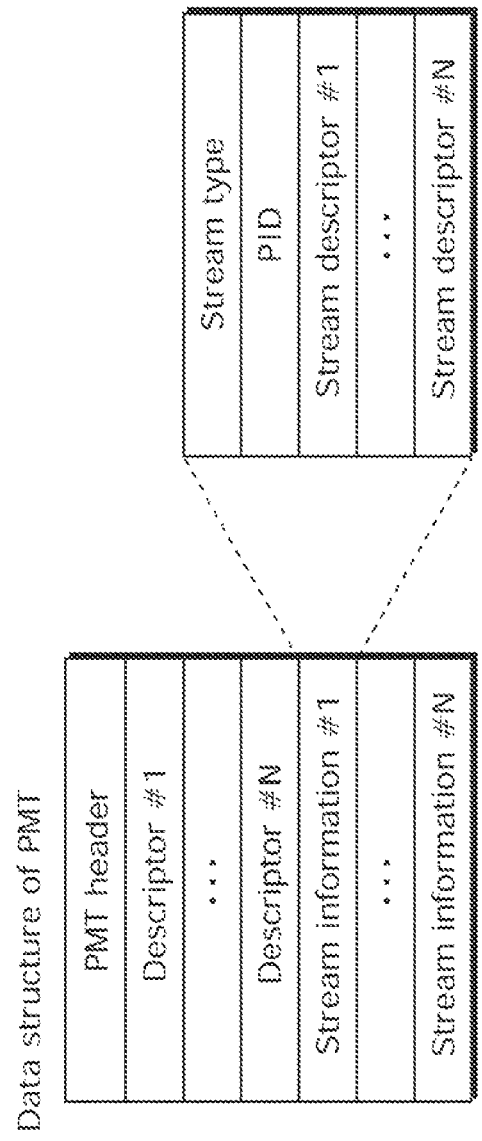
FIG. 58 is a diagram illustrating a data structure of a PMT.

FIG. 58 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 59:
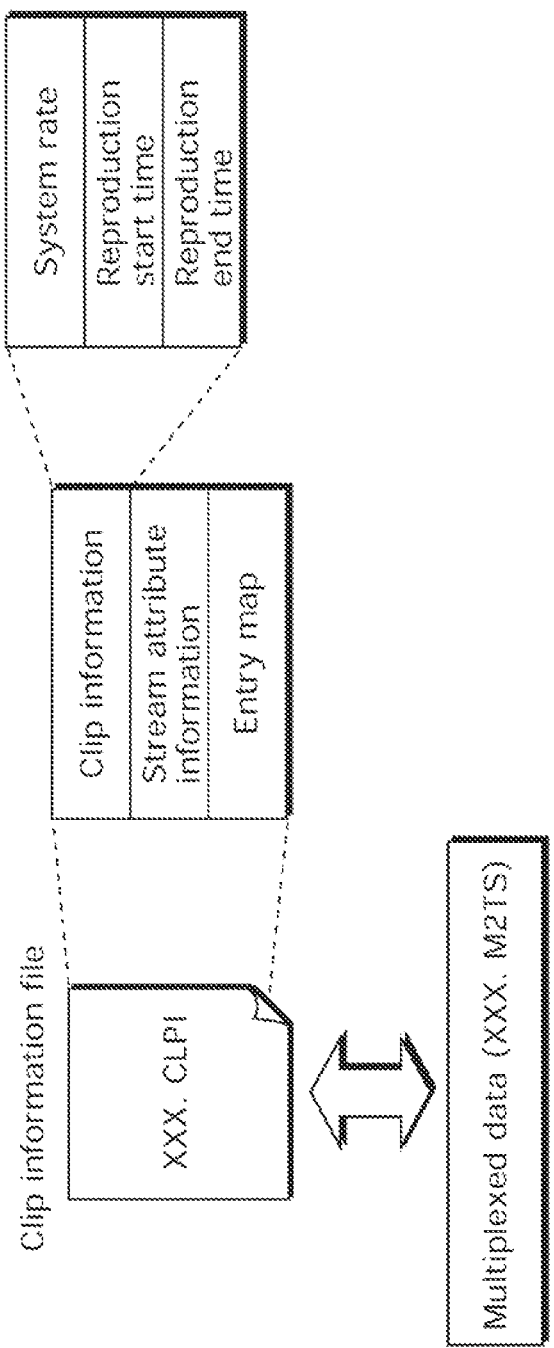
FIG. 59 is a diagram illustrating an internal structure of multiplexed data information.

Each of the multiplexed data information files is management information of the multiplexed data as shown in FIG. 59. The multiplexed data information files are in one to one correspondence with the multiplexed data, and each of the files includes multiplexed data information, stream attribute information, and an entry map.

As illustrated in FIG. 59, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 60:
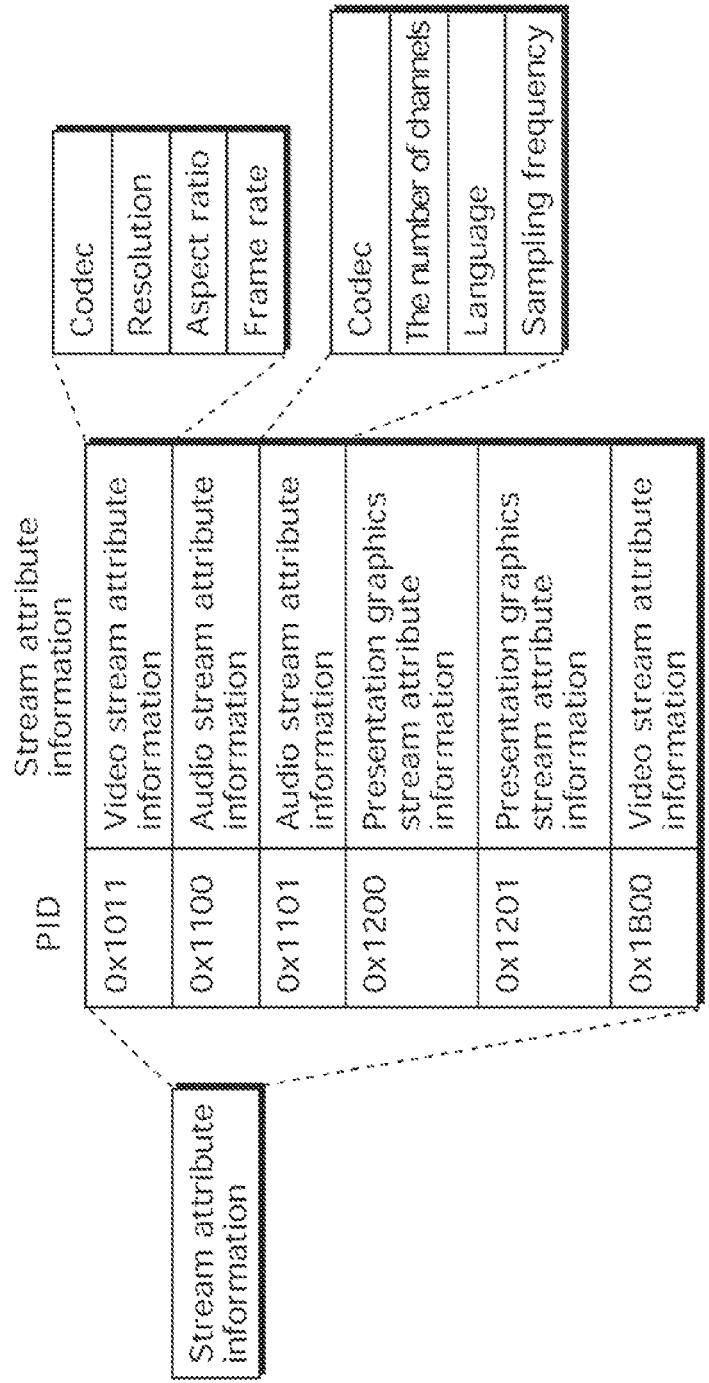
FIG. 60 is a diagram illustrating an internal structure of stream attribute information.

As shown in FIG. 60, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 61:
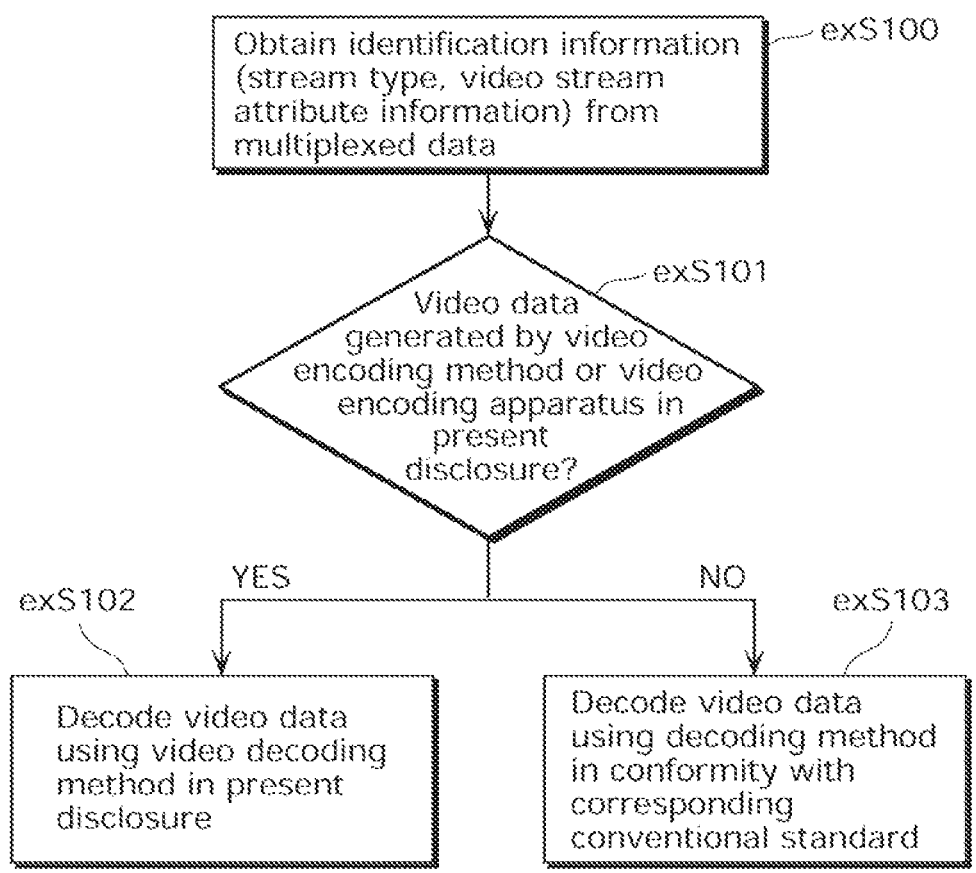
FIG. 61 is a diagram illustrating steps for identifying video data.

Furthermore, FIG. 61 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 11

Figure 62:
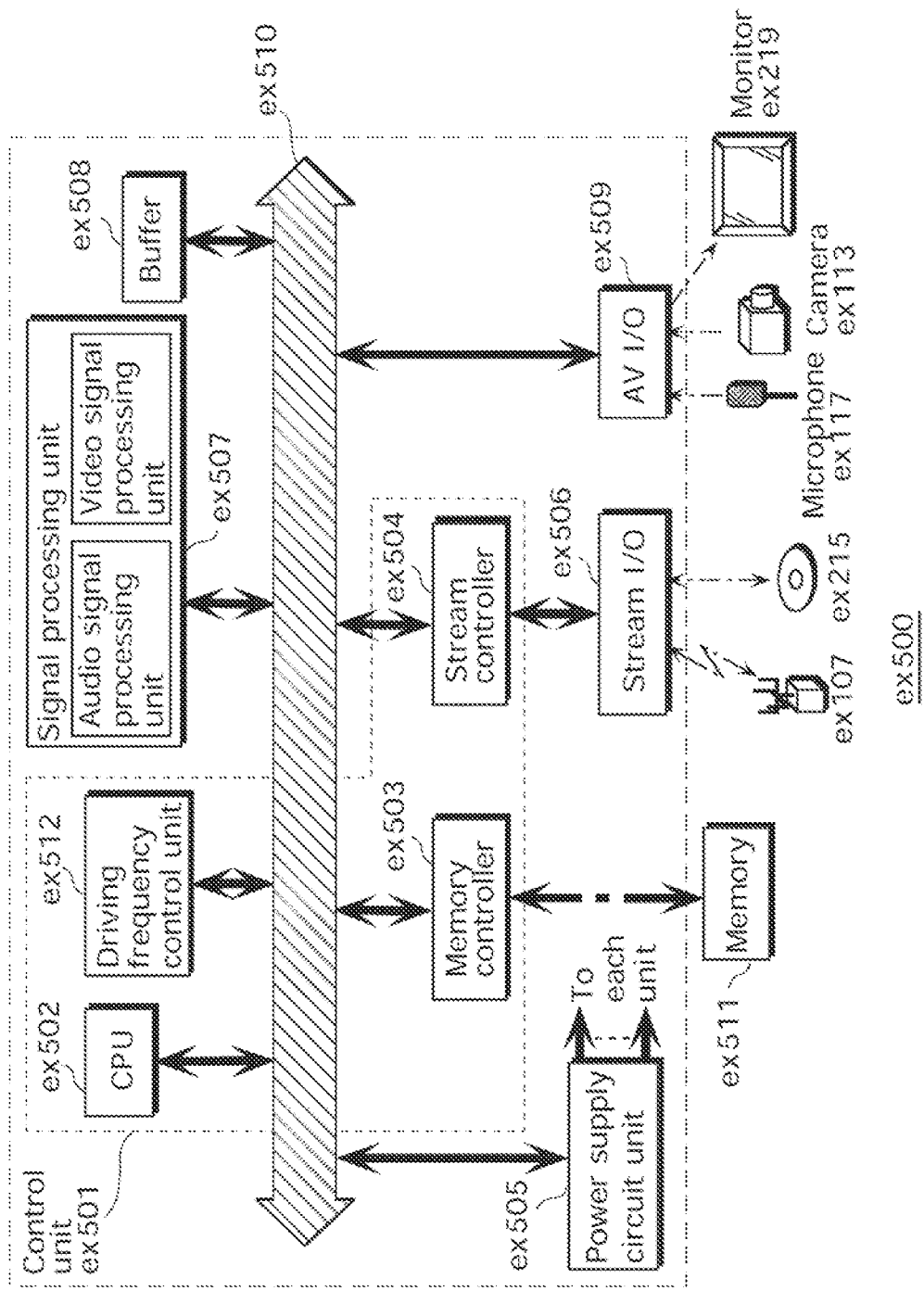
FIG. 62 is a block diagram illustrating an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 62 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A Field Programmable Gate Array (FPGA) that can be programmed after manufacturing LSIs or a reconfigurable processor that allows re-configuration of the connection or configuration of an LSI can be used for the same purpose. Such a programmable logic device can execute the image coding method or the image decoding method described in each of the embodiments, typically by loading or reading from a memory, etc., a program including software or firmware.

In addition, if circuit integration technology replacing LSI appears with the advancement of semiconductor technology or other techniques deriving therefrom, integration of the function blocks may be carried out using such technology. Application of biotechnology, and so on, is a possibility.

Embodiment 12

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 63:
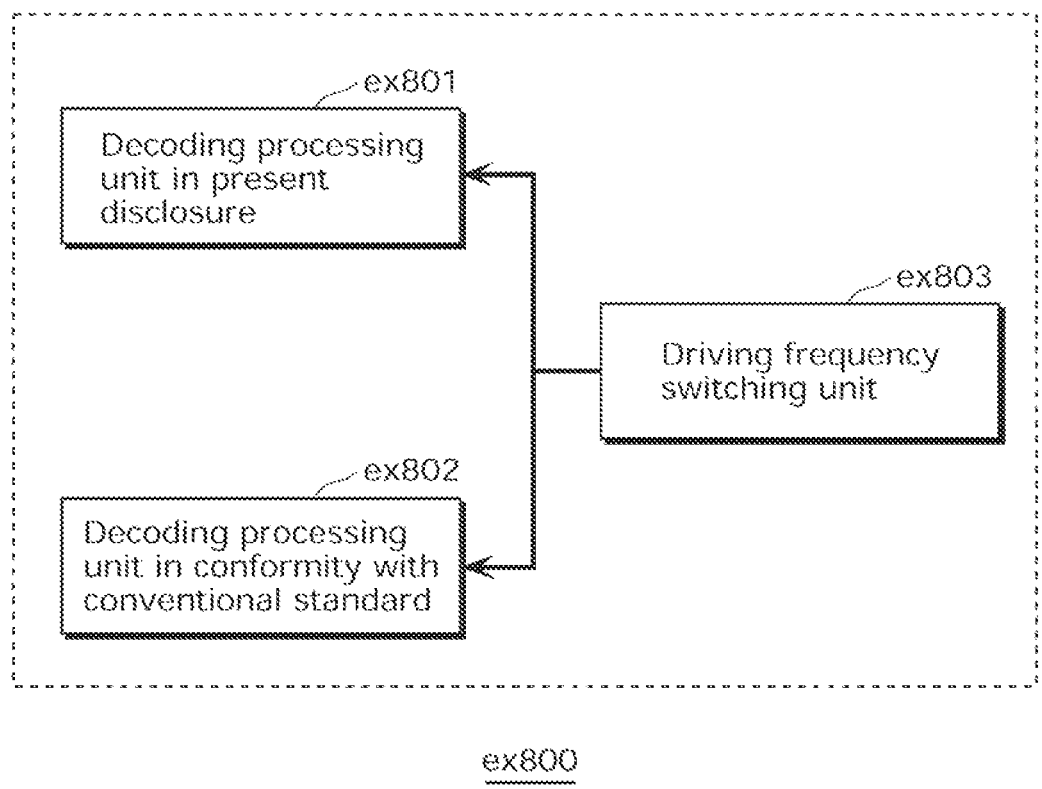
FIG. 63 is a diagram illustrating a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 63 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 62. Here, each of the decoding processing unit ex801 that executes the moving picture decoding method described in each of embodiments and the decoding processing unit ex802 that conforms to the conventional standard corresponds to the signal processing unit ex507 in FIG. 62. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Embodiment 10 is used for identifying the video data. The identification information is not limited to the one described in Embodiment 10 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 65. The driving frequency can be selected by storing the look-up table in the buffer ex508 and in an internal memory of an LSI, and with reference to the look-up table by the CPU ex502.

Figure 64:
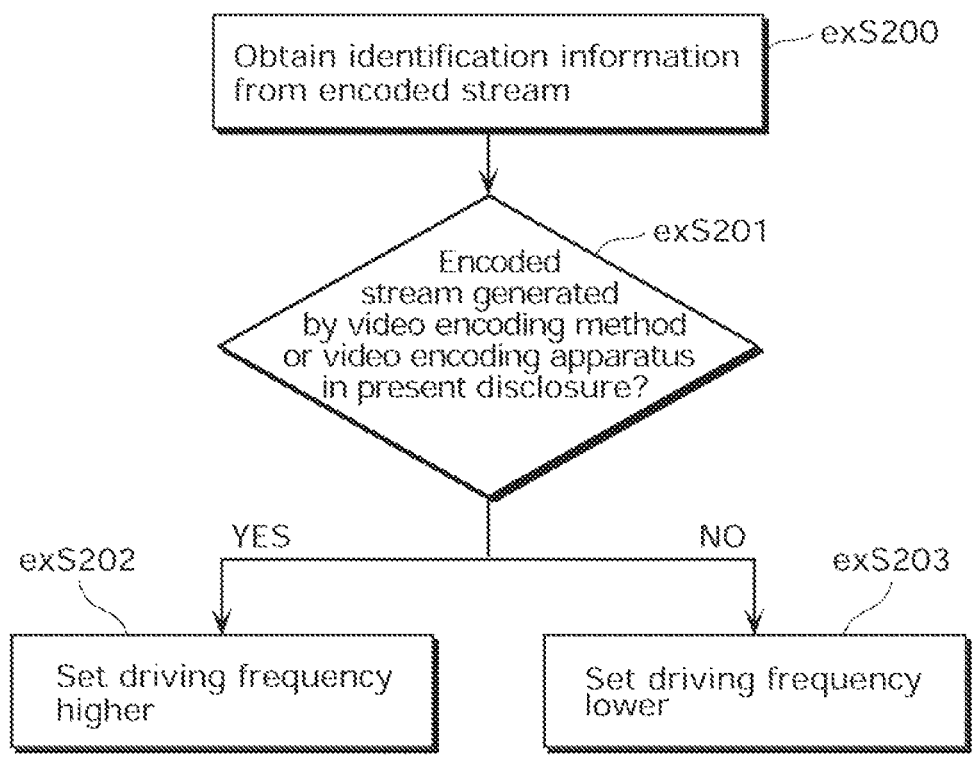
FIG. 64 is a diagram illustrating steps for identifying video data and switching between driving frequencies.

FIG. 64 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 13

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 66A:
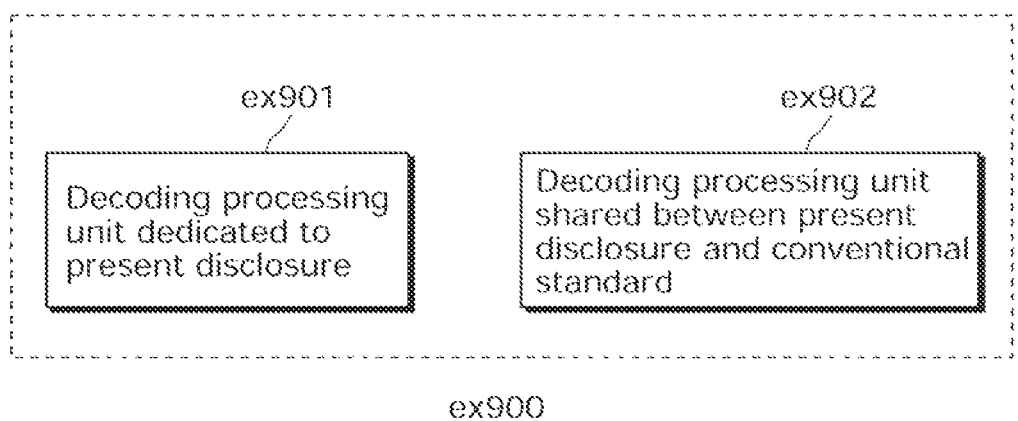
FIG. 66A is a diagram illustrating an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 66A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present disclosure and does not conform to MPEG-4 AVC. In particular, since an aspect of the present disclosure is characterized by hierarchical coding, it is possible, for example, for the dedicated decoding processing unit ex901 to be used for hierarchical coding, and for the decoding processing unit to be shared by any or all of the other processing, such as entropy decoding, inverse quantization, deblocking filtering, and motion compensation. The decoding processing unit for implementing the moving picture decoding method described in each of embodiments may be shared for the processing to be shared, and a dedicated decoding processing unit may be used for processing unique to that of MPEG-4 AVC.

Figure 66B:
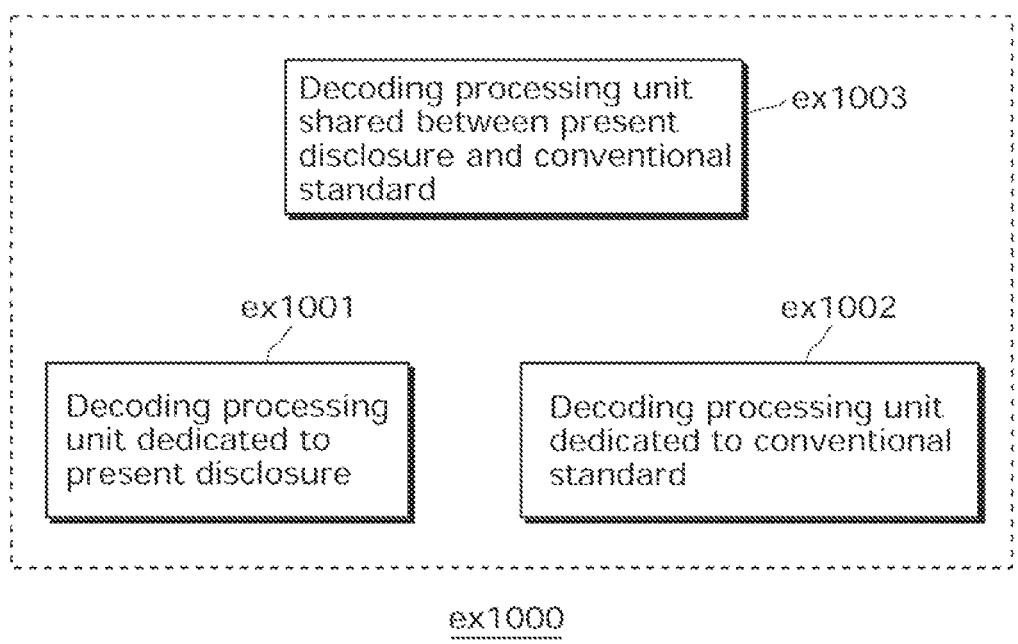
FIG. 66B is a diagram illustrating another example of a configuration for sharing a module of a signal processing unit.

Furthermore, ex1000 in FIG. 66B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure can be applied to an image coding method, an image decoding method, an image coding apparatus, and an image decoding apparatus. Furthermore, the present disclosure can be used in various applications such as data storage, transfer, or communication. For example, the present disclosure can be used in information display devices and image-capturing devices such as a television, a digital video recorder, a car navigation system, a cellular phone, a digital still camera, a digital video camera, and so on.

The invention claimed is:

1. An encoding device that generates a bitstream, the encoding device comprising:
   circuitry; and
   memory, wherein
   using the memory, the circuitry:
   obtains pictures arranged in display order, the pictures including I pictures, P pictures, and B pictures corresponding to Intra Coded Frames, Predicted Frames, and Bi-directional Predicted Frames of High Efficiency Video Coding (HEVC) standard, respectively;
   associates Temporal IDs defined in the HEVC standard with the pictures arranged in the display order such that a largest Temporal ID is associated with highest B pictures among the B pictures and any one of smaller Temporal IDs is associated with the I pictures, the P pictures, and lower B pictures among the B pictures;
   reorders the pictures to change the display order to encoding order such that the highest B pictures and the pictures having any one of the smaller Temporal IDs are alternately arranged in the encoding order, and the B pictures having the highest Temporal IDs are time shifted so as to be outputted after reference frames not having the highest temporal IDs;
   encodes the pictures arranged in the encoding order to output encoded pictures arranged in the encoding order; and
   generates the bitstream including the encoded pictures arranged in the encoding order.

2. A decoding device that decodes a bitstream, the decoding device comprising:
   circuitry; and
   memory, wherein
   using the memory, the circuitry:
   obtains the bitstream including encoded pictures arranged in encoding order, the encoded pictures including encoded I pictures, encoded P pictures, and encoded B pictures corresponding to Intra Coded Frames, Predicted Frames, and Bi-directional Predicted Frames of High Efficiency Video Coding (HEVC) standard, respectively,
   Temporal IDs defined in the HEVC standard being associated with the encoded pictures such that a largest Temporal ID is associated with highest encoded B pictures among the encoded B pictures and any one of smaller Temporal IDs is associated with the encoded I pictures, the encoded P pictures, and lower encoded B pictures among the encoded B pictures, the highest B pictures and pictures having any one of the smaller Temporal IDs being alternately arranged in the encoding order;

decodes the encoded pictures arranged in the encoding order to generate pictures arranged in the encoding order, the B pictures having the highest Temporal IDs being time shifted such that, during the decoding, the B pictures having the highest Temporal IDs are inputted after reference frames not having the highest temporal IDs; and reorders the pictures to change the encoding order to display order to display the pictures.

\* \* \* \* \*